United States Patent
Ito et al.

(10) Patent No.: US 8,279,942 B2
(45) Date of Patent: Oct. 2, 2012

(54) IMAGE DATA PROCESSING APPARATUS, IMAGE DATA PROCESSING METHOD, PROGRAM FOR IMAGE DATA PROCESSING METHOD, AND RECORDING MEDIUM RECORDING PROGRAM FOR IMAGE DATA PROCESSING METHOD

(75) Inventors: Yoshiyuki Ito, Tokyo (JP); Tetsuya Fukushima, Kanagawa (JP); Yukio Yanagita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1560 days.

(21) Appl. No.: 11/789,613

(22) Filed: Apr. 25, 2007

(65) Prior Publication Data
US 2007/0253491 A1 Nov. 1, 2007

(30) Foreign Application Priority Data

Apr. 27, 2006 (JP) ................................. 2006-122890

(51) Int. Cl.
H04N 7/12 (2006.01)
H04N 11/12 (2006.01)
(52) U.S. Cl. ............................. 375/240.26; 375/240.24
(58) Field of Classification Search .............. 375/240.24
See application file for complete search history.

(56) References Cited

U.S. PATENT DOCUMENTS

| 5,696,698 | A | | 12/1997 | Herluison et al. | |
|---|---|---|---|---|---|
| 5,801,775 | A | * | 9/1998 | Ueda | 375/240.15 |
| 6,163,576 | A | * | 12/2000 | Lempel | 375/240.24 |
| 7,630,565 | B2 | * | 12/2009 | Linzer | 382/234 |
| 7,813,431 | B2 | * | 10/2010 | MacInnis | 375/240.24 |
| 2006/0215754 | A1 | * | 9/2006 | Buxton et al. | 375/240.12 |
| 2006/0239353 | A1 | * | 10/2006 | De Haan et al. | 375/240.16 |
| 2007/0086528 | A1 | * | 4/2007 | Mauchly et al. | 375/240.24 |

FOREIGN PATENT DOCUMENTS

| EP | 0 632 662 | 1/1995 |
|---|---|---|
| EP | 1 061 747 | 12/2000 |

(Continued)

OTHER PUBLICATIONS

Cmar R. et al.: "Highly scalable parallel parametrizable architecture of the motion estimator" European Design and Test Conference, 1997. ED&TC 97. Proceedings Paris, France Mar. 17-20, 1997, Los Alamitos, CA, USA,IEEE Comput. Soc, US, Mar. 17, 1997, pp. 208-212, XP002337994 ISBN: 0-8186-7786-4.

(Continued)

*Primary Examiner* — Andy S. Rao
*Assistant Examiner* — Feliciano Mejia
(74) *Attorney, Agent, or Firm* — Frommer Lawrence & Haug LLP; William S. Frommer; Paul A. Levy

(57) ABSTRACT

An image data processing apparatus includes: plural arithmetic processing sections; a main memory; and a cache memory, wherein slices of the image data are sequentially and cyclically assigned to the plural arithmetic processing sections and plural slices to be processed are set as objects of processing, respectively, and the plural arithmetic processing sections process the image data in parallel to establish a consistent relationship of the processing of each slice with processing of the immediately preceding slice, in which the current slice and the immediately preceding slice can be simultaneously processed in parallel so that a reference macroblock of the macroblock in processing in the current slice may partly overlap with a reference macroblock of the macroblock in processing in the immediately preceding slice.

6 Claims, 46 Drawing Sheets

FOREIGN PATENT DOCUMENTS

| | | |
|---|---|---|
| EP | 1 622 391 | 2/2006 |
| JP | 3 167984 | 7/1991 |
| JP | 4 207471 | 7/1992 |
| JP | 2000-115806 | 4/2000 |
| JP | 2001 359107 | 12/2001 |
| JP | 2004 72301 | 3/2004 |
| JP | 2005 295526 | 10/2005 |
| JP | 2006 42143 | 2/2006 |
| JP | 2006-42364 | 2/2006 |
| JP | 2007 312340 | 11/2007 |
| WO | WO 03 107679 | 12/2003 |
| WO | WO 2005 104027 | 11/2005 |
| WO | WO 2005 109205 | 11/2005 |

OTHER PUBLICATIONS

Jen-Chieh Tuan et al.: "On the Data Reuse and Memory Bandwidth Analysis for Full-Search Block-Matching VLSI Architecture" IEEE Transactions on Circuits and Systems for Video Technology, IEEE Service Center, Piscataway, NJ, US, vol. 12, No. 1, Jan. 2002, pp. 61-72 XP011014269 ISSN: 1051-8215.

Lee C L: "Parallel Implementation of Motion-Compensation for HDTV Video Decoder" IEEE Transactions on Consumer Electronics, IEEE Service Center, New York, NY, US, May 1998, pp. 251-255, XP000789832 ISSN: 0098-3063.

* cited by examiner

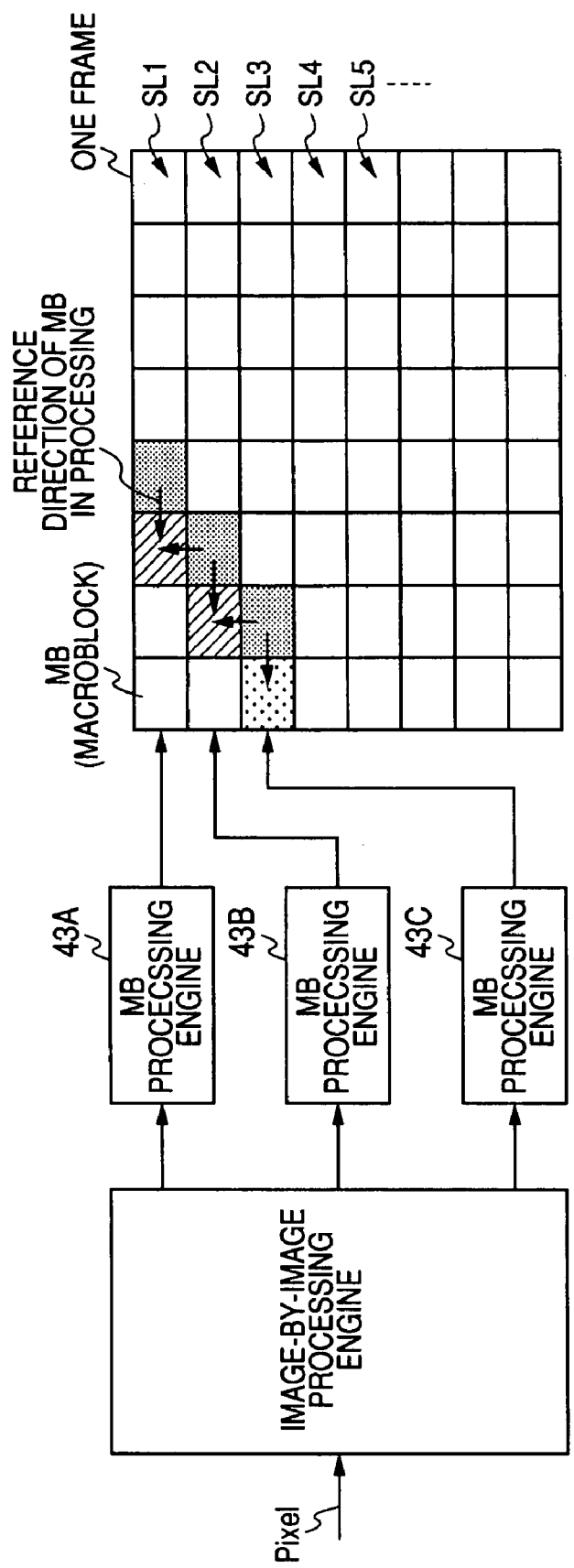

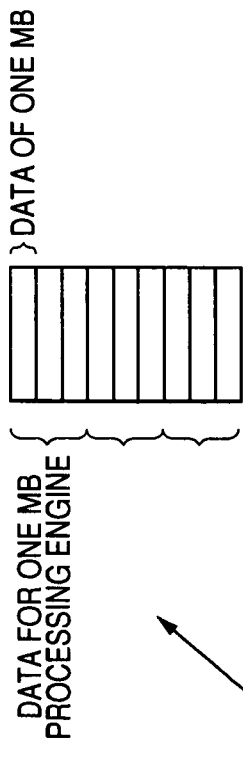
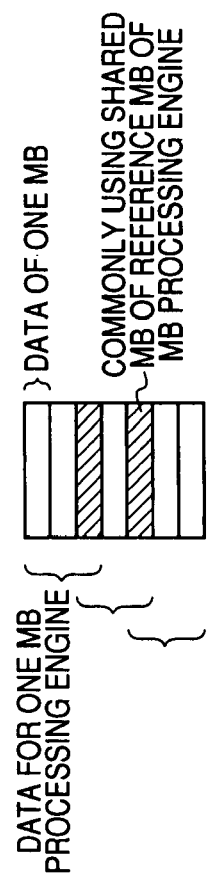
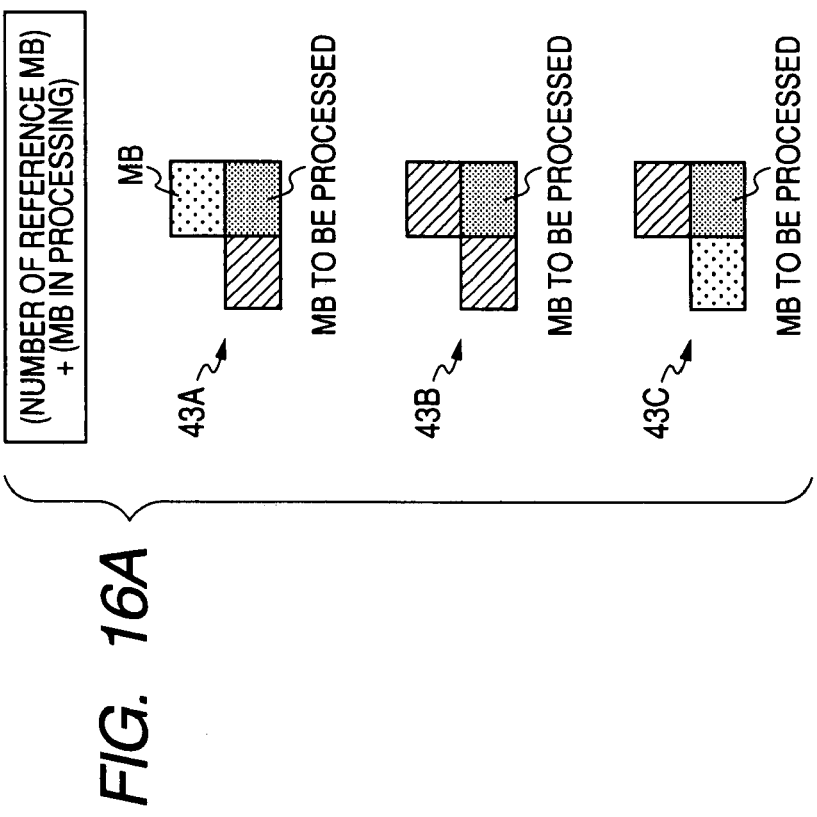

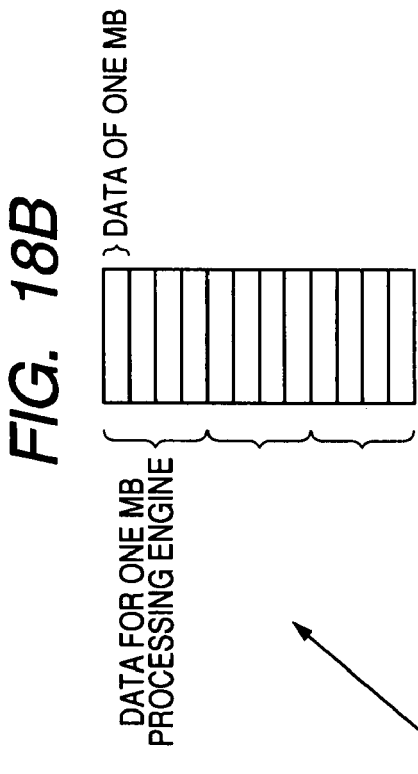
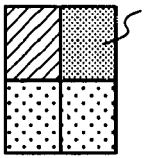

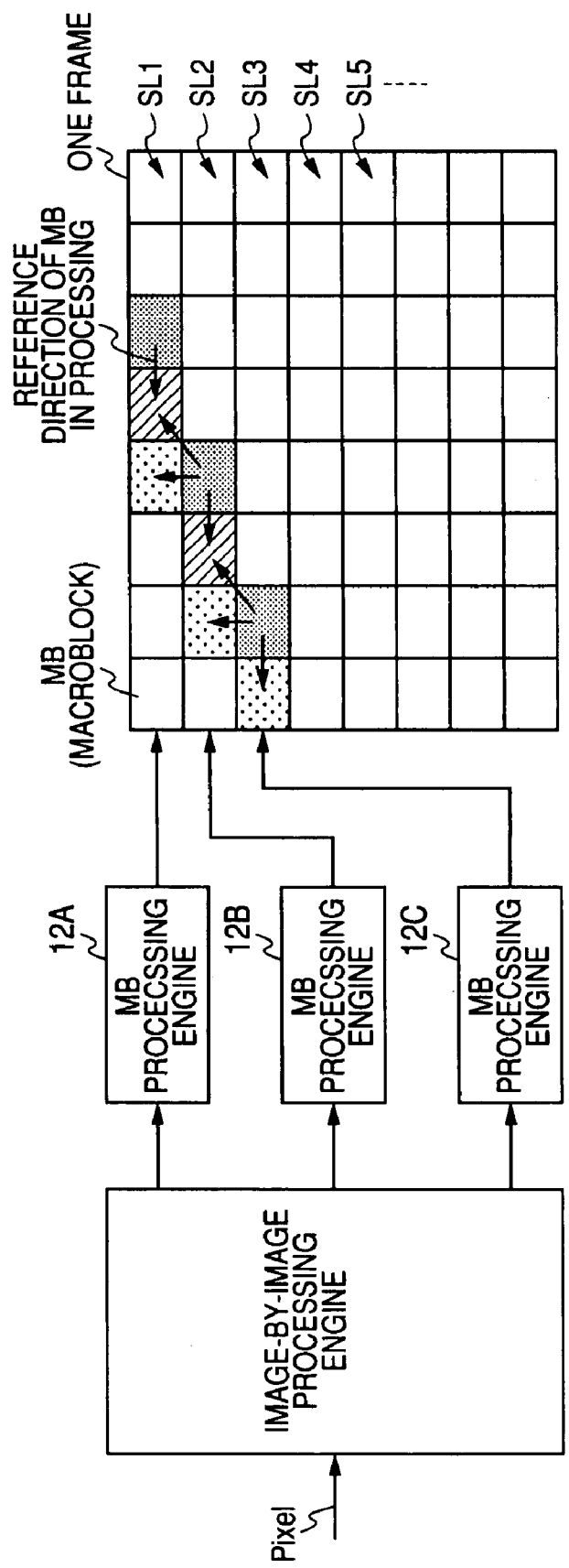

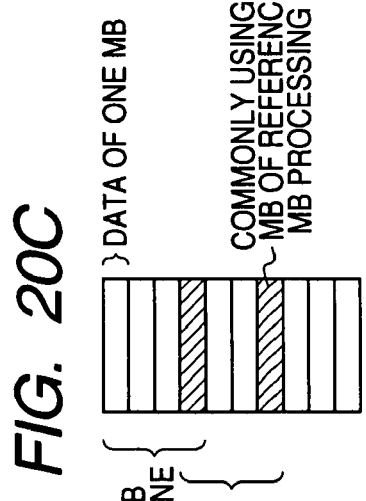

IMAGE DATA PROCESSING APPARATUS, IMAGE DATA PROCESSING METHOD, PROGRAM FOR IMAGE DATA PROCESSING METHOD, AND RECORDING MEDIUM RECORDING PROGRAM FOR IMAGE DATA PROCESSING METHOD

CROSS REFERENCES TO RELATED APPLICATIONS

The present invention contains subject matter related to Japanese Patent Application JP 2006-122890 filed in the Japanese Patent Office on Apr. 27, 2006, the entire contents of which being incorporated herein by reference.

BACKGROUND OF THE INVENTION

1. Field of the Invention

The present invention is applicable to encoding and decoding of video data according to H.264/MPEG-4AVC (ITU-T Rec. H.264 ISO/IEC 14496-10 AVC) standard, for example. The present invention reduces the capacity of a cache memory in a configuration of simultaneously processing image data with plural arithmetic processing means in parallel for encoding processing and decoding processing by sequentially and cyclically assigning slices to plural arithmetic processing sections, simultaneously encoding and decoding image data in parallel by plural arithmetic processing sections, and setting the processing of each slice to establish a relationship in which a reference macroblock of a macroblock in processing in each slice may partly overlap with a reference macroblock of a macroblock in the immediately preceding slice.

2. Background Art

In related art, in various kinds of video equipment, encoding processing and decoding processing are performed on image data of moving images with H.264/MPEG-4AVC (hereinafter, referred to as H.264/AVC), WMV9 (Windows Media Video 9), MPEG-4 (ISO/IEC14496 Information Technology-Generic Coding of Audio-Visual Object), MPEG-2 (ISO/IEC 13818-2 International Standard MPEG-2 Video), MPEG-1 (ISO/IEC 11172-2 International Standard MPEG-1 Video), etc. In these encoding processing and decoding processing, macroblocks are sequentially processed in the raster scan order.

That is, as shown in FIGS. 41A to 41D by the case where a video signal is so-called 4:2:0 as an example, in this type of encoding processing, brightness signal Y and color-difference signals Cr, Cb are divided into 16-pixel×16-pixel and 8-pixel×8-pixel macroblocks, respectively. For the brightness signal Y, discrete cosine transform processing is performed on each 8-pixel×8-pixel block formed by dividing one macroblock into halves in the horizontal direction and the vertical direction, respectively. For the color-difference signals Cr, Cb, discrete cosine transform processing is performed on each macroblock. In H.264/AVC, orthogonal transform processing and discrete Hadamard transform processing are performed on each 4-pixel×4-pixel block formed by further dividing the respective blocks into halves. In this type of encoding processing, quantizing processing and variable length coding processing are performed on the respective coefficient data as discrete cosine transform processing results.

Accordingly, in the type of encoding processing and decoding processing, as shown in FIG. 42A, each macroblock (MB) is identified by a two-dimensional address, a horizontal and vertical address (X,Y). Further, in the type of processing, as shown in FIG. 42B, the horizontal and vertical address (X,Y) is converted into a one-dimensional address for accessing a memory, and image data of the respective macroblocks held in the memory are sequentially processed.

In the processing, transmission efficiency is improved by referring to the processing result of an adjacent macroblock. Specifically, intra prediction of MPEG-1, 2, as shown in FIG. 43, referring to the processing result of an adjacent macroblock (X−1,Y) at the scan start end side of the same slice, the subsequent macroblock (X,Y) is processed. In FIG. 43 and the subsequent drawings, the reference relationships are shown by arrows. As below, the macroblock to be referred to is called a reference macroblock. Accordingly, in the example of FIG. 43, the macroblock (X−1,Y) is the reference macroblock of the macroblock (X,Y). Here, the slice is a unit of processing of slice layers and formed by plural macroblocks continuing in the horizontal direction.

In intra prediction of MPEG-4, as shown in FIG. 44, an adjacent macroblock (X−1,Y) at the scan start end side of the same slice, an adjacent macroblock (X,Y−1) directly above of the immediately preceding slice, and an adjacent macroblock (X−1,Y−1) at the scan start end side of the slice containing the adjacent macroblock (X,Y−1) directly above are set as reference macroblocks of the macroblock (X,Y), and the macroblock (X,Y) is processed by referring to the processing result of the macroblock (X−1,Y), (X,Y−1), or (X−1,Y−1).

In motion vector prediction of MPEG-4, as shown in FIG. 45, an adjacent macroblock (X−1,Y) at the scan start end side of the same slice, an adjacent macroblock (X,Y−1) directly above of the immediately preceding slice, and the adjacent macroblock (X+1,Y−1) at the scan termination end side of the slice containing the adjacent macroblock (X,Y−1) directly above are set as reference macroblocks of the macroblock (X,Y), and the motion vector of the macroblock (X,Y) is predicted by referring to the motion vector of the macroblock (X−1,Y), (X,Y−1), or (X+1,Y−1).

In intra prediction of H.264/AVC, as shown in FIG. 46, an adjacent macroblock (X−1,Y) at the scan start end side of the same slice, an adjacent macroblock (X,Y−1) directly above of the immediately preceding slice, an adjacent macroblock (X−1,Y−1) at the scan start end side of the slice containing the adjacent macroblock (X,Y−1) directly above, and an adjacent macroblock (X+1,Y−1) at the scan termination end side of the slice containing the adjacent macroblock (X,Y−1) directly above are set as reference macroblocks of the macroblock (X,Y), and the macroblock (X,Y) is processed by referring to the processing result of the macroblock (X−1,Y), (X,Y−1), (X−1,Y−1), or (X+1,Y−1).

In motion vector prediction of H.264/AVC, as shown in FIG. 47, similarly to the motion vector prediction of MPEG-4, the adjacent macroblocks (X,Y−1), (X+1,Y−1), and (X−1,Y) are set as reference macroblocks of the macroblock (X,Y), and the motion vector is processed by referring to the motion vector of the macroblock (X,Y−1), (X+1,Y−1), or (X−1,Y).

In deblocking filter processing of H.264/AVC, as shown in FIG. 48, an adjacent macroblock (X−1,Y) at the scan start end side of the same slice and an adjacent macroblock (X,Y−1) directly above of the immediately preceding slice are set as reference macroblocks of the macroblock (X,Y), and the macroblock (X,Y) is processed by referring to the processing result of the macroblock (X,Y−1) or (X−1,Y).

In the above described encoding and decoding processing, encoding processing and decoding processing may be performed by arithmetic processing of an arithmetic processing means such as a central processing unit.

In a data processing system using the arithmetic processing means, high speed processing is realized using a cache memory.

That is, as shown in FIG. 49, in a data processing system 1 using the arithmetic processing means, a cache memory 2 is formed by a memory such as an SRAM that is accessible at a high speed, and a main memory 4 is formed by a memory with lower power consumption than that of the cache memory 2 though the memory is more difficult in high-speed access than the cache memory 2. Further, data containing commands of a data processing means 3 are stored in the main memory 4, and the commands and part of the data stored in the main memory 4 are loaded and held in the cache memory 2. In the cache memory 2, TAG information for management of addresses of the respective data is set and commands and data are stored.

In the data processing system 1, when using the same command and data again, the data processing means 3 first accesses the cache memory 2 as shown by arrow A and searches for desired command and data. When the target command and data are present in the cache memory 2, the device takes out and uses the command and data recorded in the cache memory 2. When the target command and data are not present in the cache memory 2, the device takes out the target command and data from the main memory 4 and uses them as shown by arrow B, and stores the command and data in the cache memory 2. The cache memory 2 may be configured as software within the main memory for data management at a higher speed.

Regarding the configuration for performing encoding processing and decoding processing using an arithmetic processing means, for example, a scheme to reduce the total number of cycles of loading image data as objects of processing from a memory is proposed in JP-A-2006-42364 (patent document 1). Further, a scheme to make the speed of processing image data higher using a cache memory is proposed in JP-A-2000-115806 (patent document 2).

When encoding processing and decoding processing are performed by simultaneously processing image data with plural arithmetic processing means in parallel, the processing speed can be made higher compared to the case of processing image data with one arithmetic processing means. Further, it is conceivable that, when a cache memory is used in a configuration of performing encoding processing and decoding processing by simultaneously processing image data with plural arithmetic processing means in parallel, the processing speed can be made even higher. In this case, if the capacity of the cache memory can be reduced by effectively utilizing the configuration of performing encoding processing and decoding processing by simultaneously processing image data with plural arithmetic processing means in parallel, the circuit size can be reduced and the power consumption can be reduced.

SUMMARY OF THE INVENTION

The present invention has been achieved in view of the above described circumstances, and an advantage of the invention is to propose an image data processing apparatus, an image data processing method, a program for an image data processing method, and a recording medium recording a program for an image data processing method capable of reducing the capacity of a cache memory in a configuration of performing encoding processing and decoding processing by simultaneously processing image data with plural arithmetic processing means in parallel.

An image data processing apparatus according to an embodiment of the invention includes: plural arithmetic processing sections that encode or decode image data in units of macroblocks, respectively; a main memory that accumulates and holds data used for processing of the plural arithmetic processing sections; and a cache memory of the plural arithmetic processing sections that hold part of the data held in the main memory, wherein slices of the image data are sequentially and cyclically assigned to the plural arithmetic processing sections and plural slices are set as objects of processing, respectively, the plural arithmetic processing sections process the data held in the cache memory and simultaneously encode or decode the image data in parallel in a sequence of processing macroblocks of the plural slices as the objects of processing in the order of raster scan to establish a consistent relationship of the processing of each slice with processing of the immediately preceding slice, and the consistent relationship is a relationship in which the current slice and the immediately preceding slice can be simultaneously processed in parallel and the macroblock in processing in the current slice is at the scan start end side by a predetermined number of macroblocks from the macroblock in processing in the immediately preceding slice so that a reference macroblock of the macroblock in processing in the current slice may partly overlap with a reference macroblock of the macroblock in processing in the immediately preceding slice.

An image data processing method of encoding or decoding image data in units of macroblocks according to an embodiment of the invention includes the steps of: storing data in a main memory of storing data necessary for the encoding and decoding in a main memory; storing data in a cache memory of storing the data stored in the main memory in the cache memory; and simultaneously parallel processing of encoding or decoding the image data with plural arithmetic processing means using the data held in the cache memory to simultaneously process plural objects of processing set by sequentially and cyclically assigning slices of the image data in parallel in units of the macroblocks, respectively, wherein the simultaneously parallel processing step encodes or decodes the image data in a sequence of processing macroblocks of the plural slices as the objects of processing in the order of raster scan to establish a consistent relationship of the processing of each slice with processing of the immediately preceding slice, and the consistent relationship is a relationship in which the current slice and the immediately preceding slice can be simultaneously processed in parallel and the macroblock in processing in the current slice is at the scan start end side by a predetermined number of macroblocks from the macroblock in processing in the immediately preceding slice so that a reference macroblock of the macroblock in processing in the current slice may partly overlap with a reference macroblock of the macroblock in processing in the immediately preceding slice.

A program for an image data processing method of encoding or decoding image data in units of macroblocks through execution by arithmetic processing means according to an embodiment of the invention includes the steps of: storing data in a main memory of storing data necessary for the encoding and decoding in a main memory; storing data in a cache memory of storing the data stored in the main memory in the cache memory; and simultaneously parallel processing of encoding or decoding the image data with plural arithmetic processing means using the data held in the cache memory to simultaneously process plural objects of processing set by sequentially and cyclically assigning slices of the image data in parallel in units of the macroblocks, respectively, wherein the simultaneously parallel processing step encodes or decodes the image data in a sequence of processing macroblocks of the plural slices as the objects of processing in the order of raster scan to establish a consistent relationship of the processing of each slice with processing of the immediately preceding slice, and the consistent relationship is a relationship in which the current slice and the immediately preceding slice can be simultaneously processed in parallel and the macroblock in processing in the current slice is at the scan start end side by a predetermined number of macroblocks from the macroblock in processing in the immediately preceding slice so that a reference macroblock of the macroblock in processing in the current slice may partly overlap with a reference macroblock of the macroblock in processing in the immediately preceding slice.

A recording medium in which a program for an image data processing method of encoding or decoding image data in units of macroblocks through execution by arithmetic processing means according to an embodiment of the invention and the program for an image data processing method includes the steps of: storing data in a main memory of storing data necessary for the encoding and decoding in a main memory; storing data in a cache memory of storing the data stored in the main memory in the cache memory; and simultaneously parallel processing of encoding or decoding the image data with plural arithmetic processing means using the data held in the cache memory to simultaneously process plural objects of processing set by sequentially and cyclically assigning slices of the image data in parallel in units of the macroblocks, respectively, wherein the simultaneously parallel processing step encodes or decodes the image data in a sequence of processing macroblocks of the plural slices as the objects of processing in the order of raster scan to establish a consistent relationship of the processing of each slice with processing of the immediately preceding slice, and the consistent relationship is a relationship in which the current slice and the immediately preceding slice can be simultaneously processed in parallel and the macroblock in processing in the current slice is at the scan start end side by a predetermined number of macroblocks from the macroblock in processing in the immediately preceding slice so that a reference macroblock of the macroblock in processing in the current slice may partly overlap with a reference macroblock of the macroblock in processing in the immediately preceding slice.

According to the configuration of the embodiment, the image data can be simultaneously encoded and decoded in parallel by the plural arithmetic processing sections using the cache memory. Further, since the reference macroblock of the macroblock in processing in the current slice partly overlaps with the reference macroblock of the macroblock in processing in the immediately preceding slice, the data stored in the cache memory can be reduced and the capacity of the cache memory can be reduced compared to the case where data of all reference macroblocks of the macroblock in processing are stored.

According to the configuration of the embodiments, the image data can be simultaneously processed in parallel using the cache memory at the simultaneously parallel processing step. Further, since the reference macroblock of the macroblock in processing in the current slice and the reference macroblock of the macroblock in processing in the immediately preceding slice partly overlap, the data stored in the cache memory can be reduced and the capacity of the cache memory can be reduced compared to the case where data of all reference macroblocks of the macroblock in processing are stored.

According to the embodiments of the invention, the capacity of the cache memory can be reduced in the configuration of performing encoding processing and decoding processing by simultaneously processing the image data in parallel with the plural arithmetic processing means.

BRIEF DESCRIPTION OF THE DRAWINGS

FIG. 15 is a schematic diagram for explanation of processing of macroblocks in video equipment of Embodiment 3 of the invention.

FIGS. 16A to 16C are schematic diagrams for explanation of the capacity of a cache memory in the configuration in FIG. 15.

FIGS. 18A to 18C are schematic diagrams for explanation of the capacity of a cache memory in the configuration in FIG. 17.

FIG. 19 is a schematic diagram for explanation of processing of macroblocks in video equipment of Embodiment 5 of the invention.

FIGS. 20A to 20C are schematic diagrams for explanation of the capacity of a cache memory in the configuration in FIG. 19.

DESCRIPTION OF PREFERRED EMBODIMENTS

Figure 2:
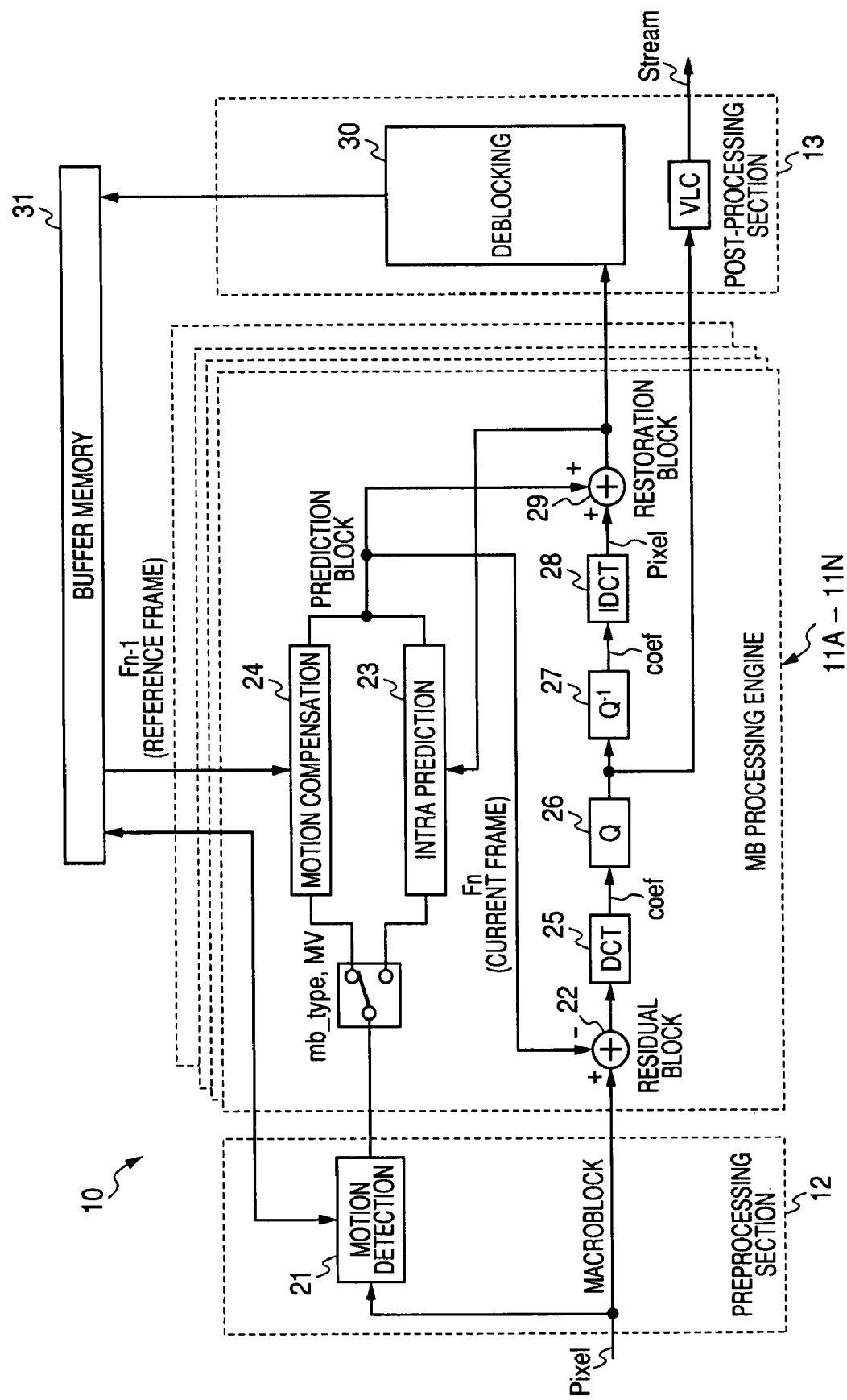
FIG. 2 is a block diagram showing an encoder that is applied to video equipment of Embodiment 1 of the invention.

Hereinafter, embodiments of the present invention will be described in detail by appropriately referring to the drawings.
(1) Configuration of Embodiments FIG. 2 is a block diagram showing an encoder that is applied to video equipment of Embodiment 1 of the invention. The video equipment of the embodiment performs encoding processing on image data with the encoder 10, records the data in a recording medium, and outputs data to a transmission channel. Further, the equipment performs decoding processing on the image data recoded in the recording medium and the coded data input from the transmission channel with a decoder, which will be described later.

Here, the encoder 10 is formed by a so-called multicore processor having plural central processing units, and sequentially inputs image data Pixel of moving images to a buffer memory 31. In FIG. 2, the description of input and output of the image data to the buffer memory 31 is simplified. The encoder 10 is configured so that the plural central processing units can respectively access the buffer memory 31. The encoder 10 performs encoding processing on the image data Pixel stored in the buffer memory 31 by arithmetic processing of the plural central processing units according to the method of H.264/AVC, and outputs coded data Stream.

In the encoder 10, functional blocks of macroblock processing engines (MB processing engines) 11A to 11N for processing macroblocks with the respective central processing units, respectively, are formed. Further, in the encoder 10, function blocks of a preprocessing section (ME) 12 and a post-processing section (VLC) 13 are formed by a main central processing unit that controls the entire operation. Programs of the encoder 10 are installed in the video equipment in advance and provided, however, they may be recorded instead in various recording media such as optical disk, magnetic disk, memory card and provided, or downloaded via a network such as Internet and provided.

Here, the preprocessing section 12 is a functional block of processing the image data Pixel together in advance in units of frames before processing by the macroblock processing engines 11A to 11N. Specifically, the preprocessing section 12 detects optimum prediction mode and motion vector with a motion detection circuit 21 with respect to reference frames stored in the buffer memory 31 at the time of inter prediction.

The macroblock processing engines 11A to 11N are function blocks processable in parallel of processing the image data Pixel in units of macroblocks, respectively. The macroblock processing engines 11A to 11N create predicted values in response to the optimum prediction mode and motion vector set in the preprocessing section 12, performs encoding processing on the image data of the respective macroblocks, and outputs output data coef.

That is, the macroblock processing engines 11A to 11N input the image data Pixel in units of macroblocks from the buffer memory 31 to a subtraction circuit 22. The subtraction circuit 22 generates difference data between a predicted value generated in an intra prediction circuit 23 and the image data Pixel sequentially input when performing intra encoding, and generates difference data between a predicted value generated in a motion compensation circuit 24 and the image data Pixel when performing inter encoding.

A discrete cosine transform circuit (DCT) 25 performs orthogonal transform processing on the difference data output from the subtraction circuit 22 and outputs coefficient data. A quantization circuit (Q) 26 quantizes the coefficient data on a predetermined quantization scale and outputs the data. The macroblock processing engines 11A to 11N output data coef of the quantization circuit 26 to the post-processing section 13.

An inverse quantization circuit ($Q^{-1}$) 27 performs inverse quantization processing on the output data coef of the quantization circuit 26, and decodes the coefficient data input to the quantization circuit 26. An inverse discrete cosine transform circuit (IDCT) 28 performs inverse discrete cosine transform processing on the output data of the inverse quantization circuit 27, and decodes the difference data input to the discrete cosine transform circuit 25. An addition circuit 29 adds the predicted value generated by the intra prediction circuit 23 or the motion compensation circuit 24 to the difference data decoded in the inverse discrete cosine transform circuit 28, and decodes the input data Pixel of a deblocking filter 30 or the intra prediction predictor 23.

The intra prediction circuit 23 outputs a predicted value when performing intra encoding using the image data Pixel of the current frame Fn decoded by the addition circuit 29. The motion compensation circuit 24 inputs the image data Pixel decoded by the addition circuit 29 and held in the buffer memory 31 as image data of reference frame Fn−1, and outputs a predicted value when performing inter encoding using the image data of the reference frame Fn−1.

The macroblock processing engines 11A to 11N selectively outputs the predicted value of the intra prediction circuit 23 to the subtraction circuit 22 to encode the image data Pixel in the optimum prediction mode of intra prediction for I picture. For others than I picture, the engines output the predicted values of the intra prediction circuit 23 and the motion compensation circuit 24 to the subtraction circuit 22 to encode the image data Pixel in the optimum prediction mode with a smaller amount of codes of the optimum prediction mode of intra prediction and the optimum prediction mode of inter prediction. The macroblock processing engines 11A to 11N may perform processing in the prediction mode with sub-macroblocks formed by dividing one macroblock into plural blocks as units of processing, as the optimum prediction mode. In this case, the engines sequentially performs encoding processing on the sub-macroblocks that configure one macroblock, and then, finally performs encoding processing on the image data Pixel in units of macroblocks.

The post-processing section 13 inputs the output data coef of the macroblock processing engines 11A to 11N in a certain order. The section performs variable length coding processing on the input data coef with a variable length coding circuit (VLC), and then, adds information of quantization scale, macroblock type (mb type), etc. and output coded data Stream. Further, the section performs filtering processing on the image data output from the macroblock processing engines 11A to 11N with the deblocking filter (deblocking) 30 to remove block distortion, and then, stores the data as the reference frame Fn−1 in the buffer memory 31.

Figure 3:
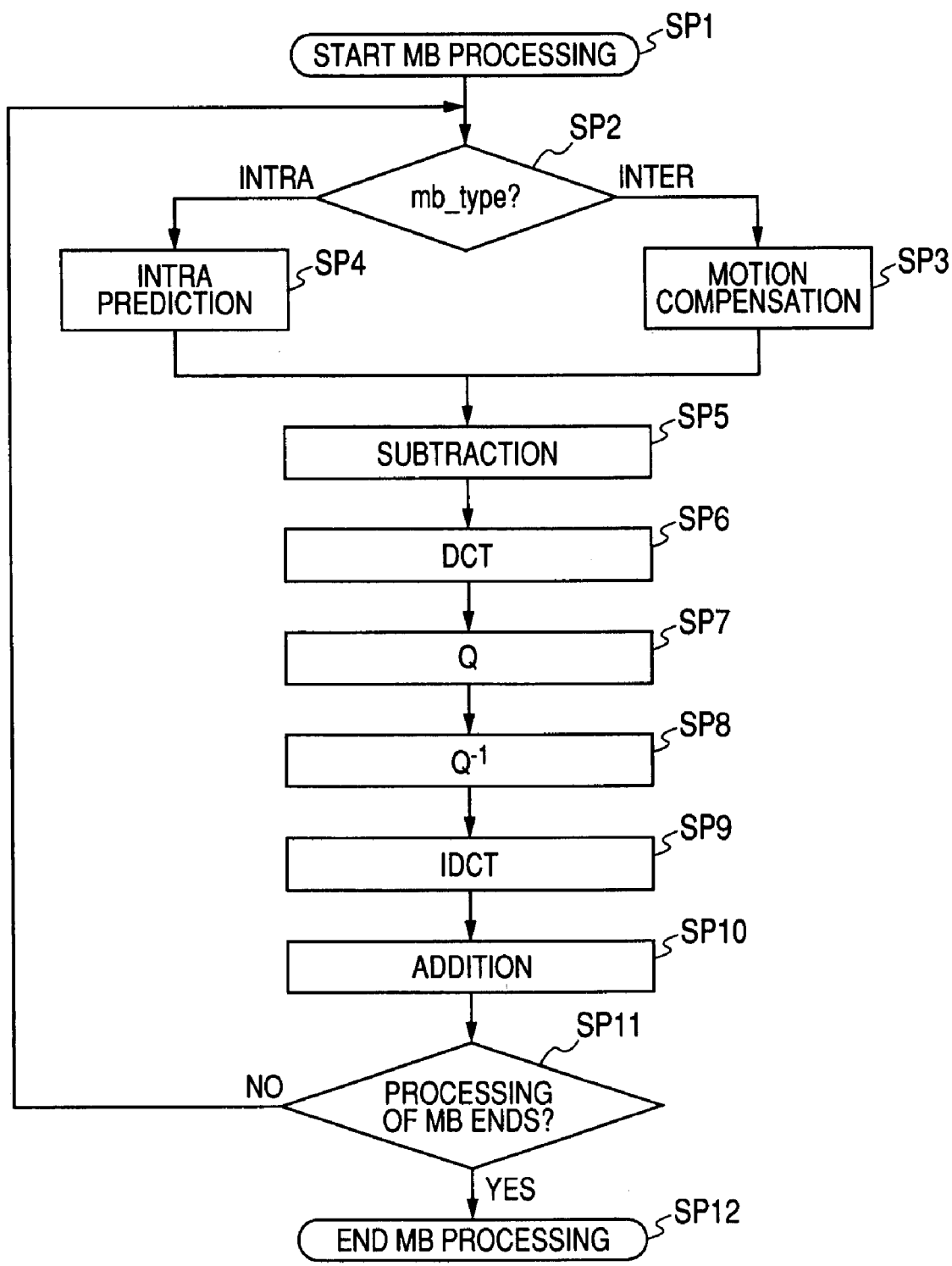
FIG. 3 is a flowchart showing a processing procedure of the respective macroblock processing engines of the encoder in FIG. 2.

FIG. 3 is a flowchart showing a processing procedure of the respective macroblock processing engines 11A to 11N. The respective macroblock processing engines 11A to 11N execute the processing procedure shown in FIG. 3 under control of the main central processing unit.

That is, when the respective macroblock processing engines 11A to 11N start the processing procedure, the engines move from step SP1 to step SP2, and determine inter prediction or intra prediction based on the macroblock type notified from the preprocessing section 12. Here, the macroblock processing engines 11A to 11N move from step SP2 to step SP3 and calculate predicted values using the motion compensation circuit 24 in the case of inter prediction, while they move from step SP2 to step SP4 and calculate predicted values using the intra prediction circuit 23 in the case of intra prediction.

Subsequently, the macroblock processing engines 11A to 11N calculate difference data by the subtraction circuit 22 at step SP5, and then, at the subsequent step SP6, transform the difference data into coefficient data by the discrete cosine transform circuit 25. Further, at the subsequent step SP7, the engines perform quantization processing on the coefficient data by the quantization circuit 26 and output processing results to the post-processing section 13. Furthermore, the macroblock processing engines 11A to 11N execute quantization processing at the subsequent step SP8, and execute inverse discrete cosine transform processing at the subsequent step SP9. At the subsequent step SP10, the engines add the predicted values to the results of inverse discrete cosine transform processing and decode original image data.

The macroblock processing engines 11A to 11N output the decoded image data to the post-processing section 13, and determine whether there is another macroblock to be processed or not at the subsequent step SP11. Here, when there is another macroblock to be processed, the macroblock processing engines 11A to 11N return from step SP11 to step SP2 and start processing of the subsequent macroblocks. Contrary, when there is no other macroblock to be processed, the macroblock processing engines 11A to 11N move from step SP11 to step S12 and end the processing procedure.

Figure 4:
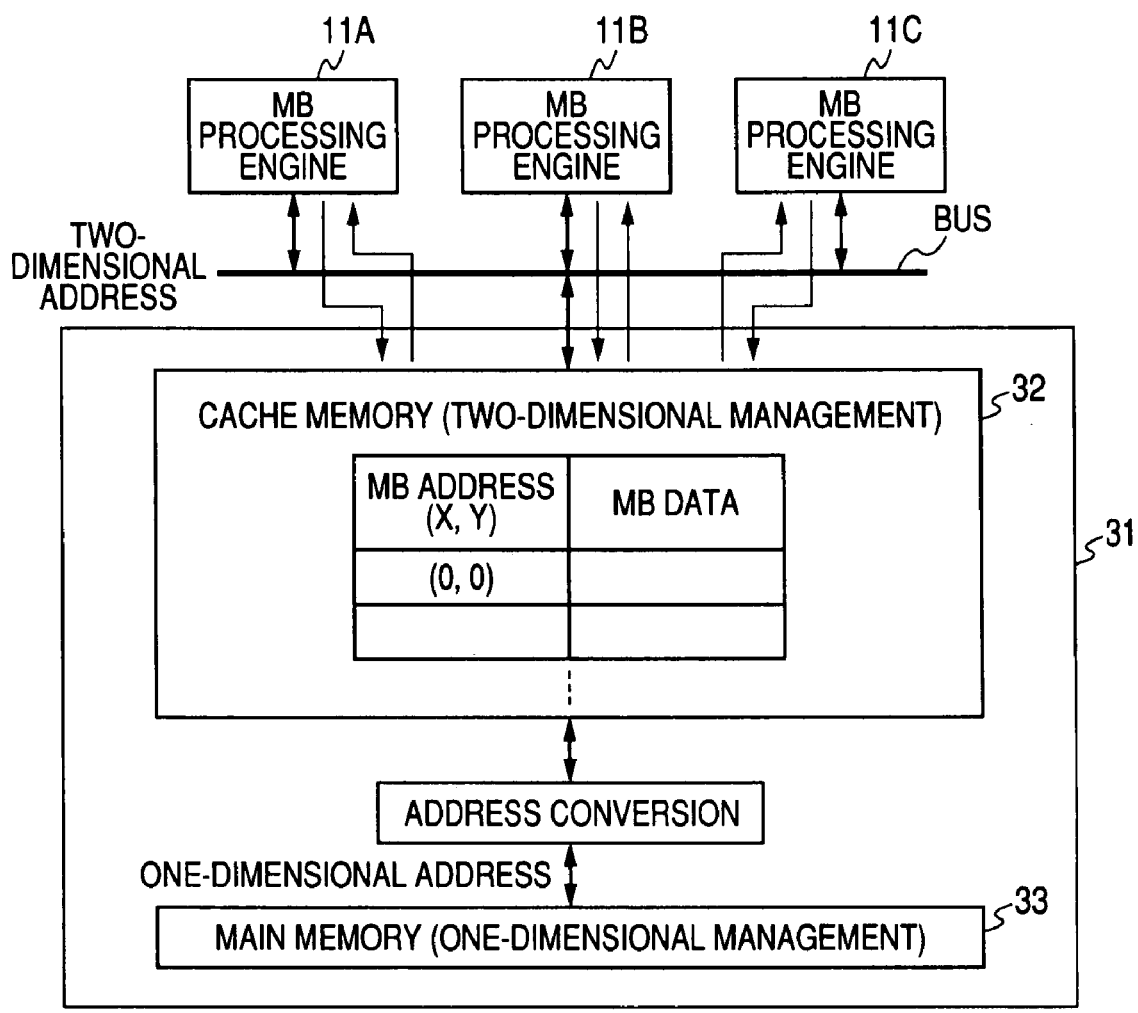
FIG. 4 is a block diagram showing a relationship between the macroblock processing engines and a buffer memory with respect to image data for intra prediction.

FIG. 4 is a block diagram showing a relationship between the macroblock processing engines 11A to 11N and the buffer memory 31 with respect to the image data of intra prediction. In FIG. 4 and the description as below, the case where the number of the macroblock processing engines 11A to 11N is three will be described. Here, the respective macroblock processing engines 11A to 11C are formed to be independently accessible to the buffer memory 31 via a bus (BUS).

In the buffer memory 31, a cache memory 32 is formed by a memory such as an SRAM that is accessible at a high speed, and a main memory 33 is formed by a small memory with lower power consumption than that of the cache memory 32 though the memory is more difficult in high-speed access than the cache memory 32. Further, the buffer memory 31 stores and holds in the main memory 33 the image data of the current frame used for intra prediction in the macroblock processing engines 11A to 11C, the image data of the reference frame used for motion compensation, and the image data to be processed input from the preprocessing section 12. While the macroblock processing engines 11A to 11C process one macroblock under control of the main central processing unit, the buffer memory loads the image data of the macroblocks to be subsequently processed by the macroblock processing engines 11A to 11C and the reference macroblocks and holds the data in the cache memory 32. The image data of the immediately preceding macroblock of the image data of the reference macroblocks is stored in the cache memory 32 together when the image data completed in processing of the corresponding macroblock processing engines 11A to 11C are stored in the main memory 33.

Figure 5:
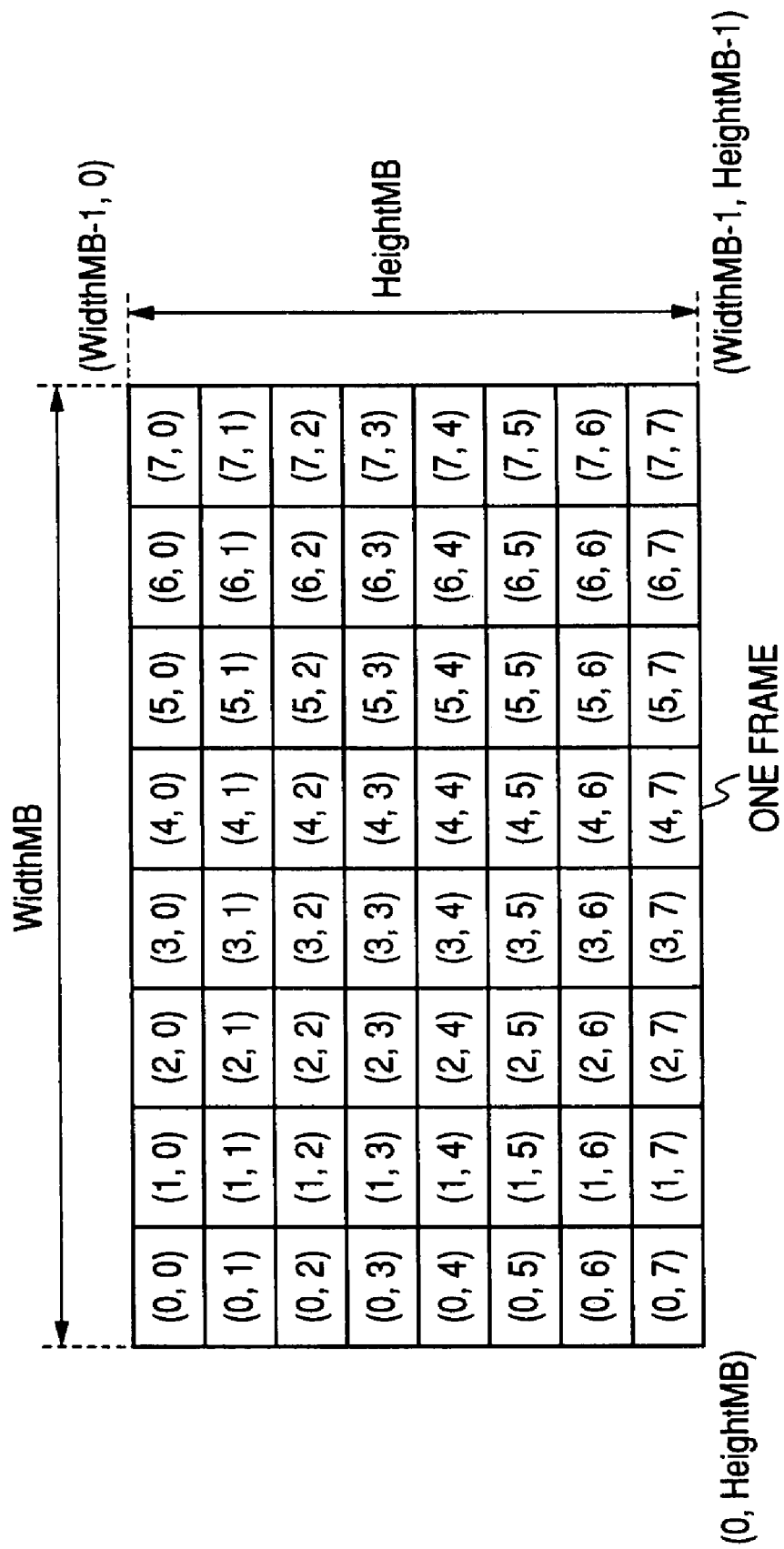
FIG. 5 is a chart showing addresses of macroblocks.

Further, as shown in FIG. 5, the buffer memory 31 sets two-dimensional addresses (X,Y) in the horizontal direction and the vertical direction that identify the positions of the respective macroblocks with reference to the raster scan start position for the image data of the respective macroblocks, and holds the image data of the current frame and the image data processed by the preprocessing section 12 in the cache memory 32 in units of macroblocks. In this regard, the buffer memory 31 stores the image data of the respective macroblocks with one-dimensional addresses in memory space in the main memory 33. Accordingly, when loading the image data from the main memory 33 and storing the data in the cache memory 32, the buffer memory 31 address-converts the two-dimensional address of the macroblock to which the image data to be stored in the cache memory 32 belongs into the one-dimensional address of the main memory 33, and loads the image data from the main memory 33.

Figure 6:
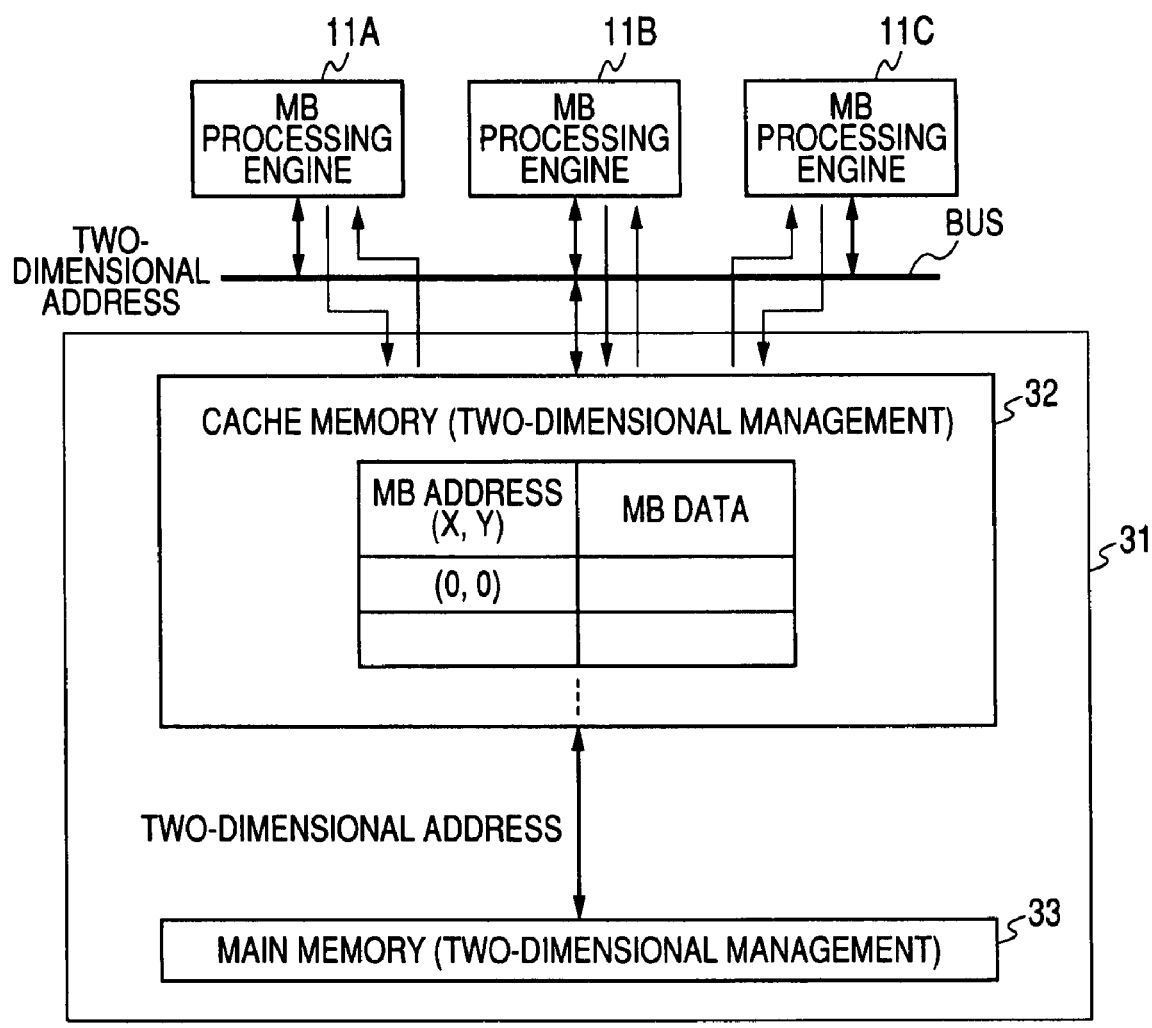
FIG. 6 is a block diagram showing another example of the configuration in FIG. 4.
Figure 7:
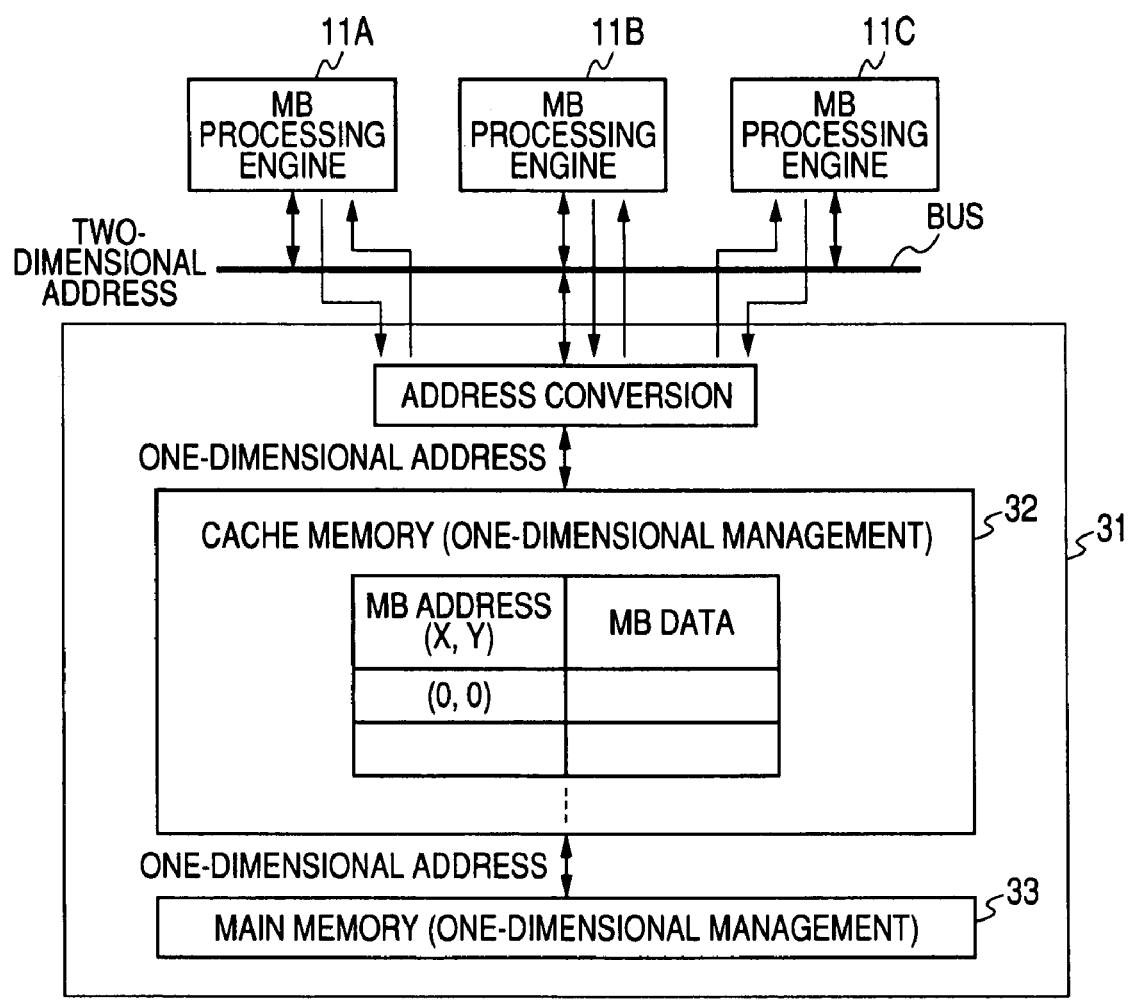
FIG. 7 is a block diagram showing another example of the configuration in FIG. 4 different from the example in FIG. 6.
Figure 8:
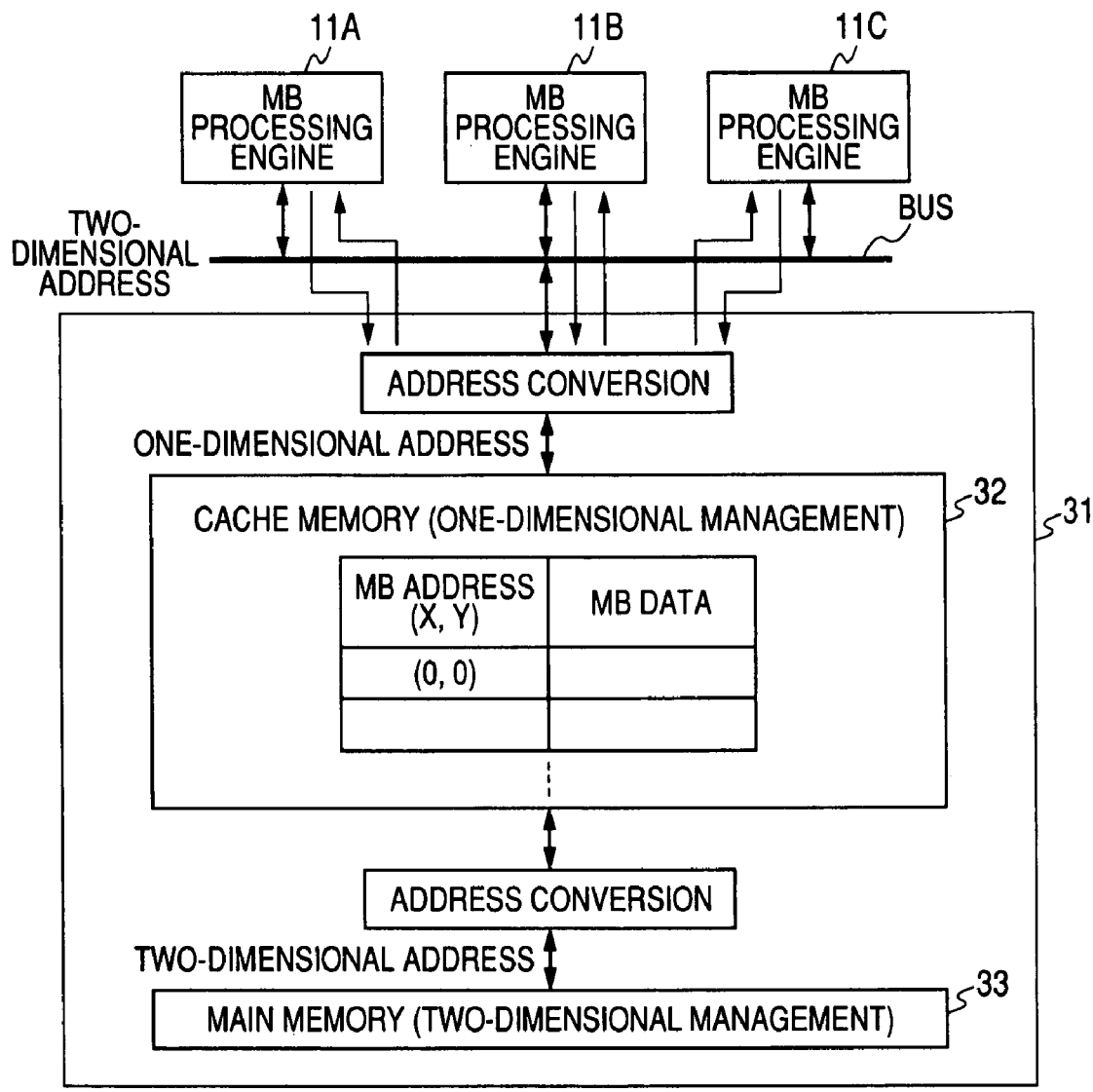
FIG. 8 is a block diagram showing another example of the configuration in FIG. 4 different from the examples in FIGS. 6 and 7.

In the method of accessing the buffer memory 31, as shown in FIG. 6 in comparison to FIG. 4, the two-dimensional addresses may be also applied to the address management of the main memory 33 and the address conversion processing when loading the data from the main memory 33 to the cache memory 32 may be omitted. Further, as shown in FIG. 7 in comparison to FIG. 4, the address management of the cache memory 32 may be executed with the one-dimensional addresses and the address conversion processing when loading the data from the main memory 33 to the cache memory 32 may be omitted. Note that, in this case, when the buffer memory 31 is accessed, the address conversion processing of converting the two-dimensional addresses into one-dimensional addresses is necessary. Furthermore, as shown in FIG.

8 in comparison to FIG. 4, the address management may be performed with two-dimensional addresses at the cache memory 32, and the address management may be performed with one-dimensional addresses at the main memory 33.

Figure 1:
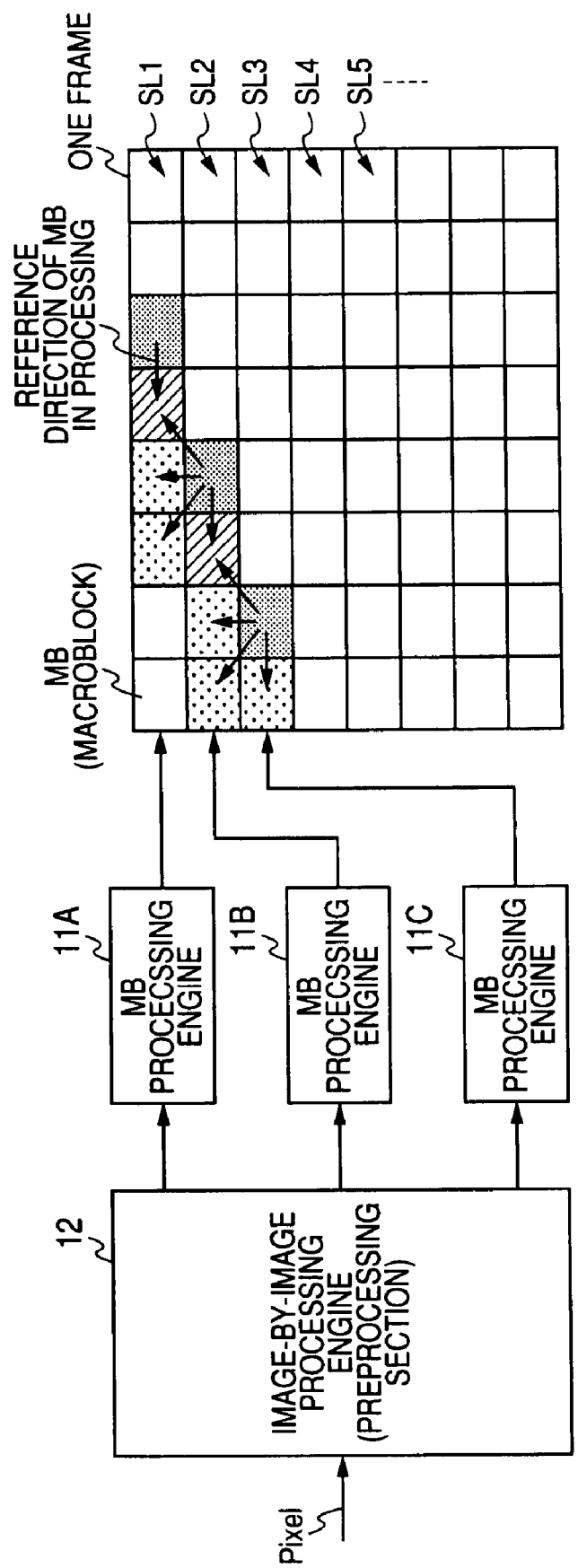
FIG. 1 is a schematic diagram for explanation of a processing sequence of macroblock processing engines in an encoder of Embodiment 1 of the invention.

FIG. 1 is a schematic diagram for explanation of a processing sequence of macroblocks of these macroblock processing engines 11A to 11C. The macroblock processing engines 11A to 11C sequentially process image data in units of macroblocks under control of a main central processing unit (not shown). Here, the main central processing unit sequentially and cyclically assigns slices that form one frame to the respective macroblock processing engines 11A to 11C from the raster scan start end side. Accordingly, in the example shown in FIG. 1, the first slice SL1 in the vertical direction is assigned to the first macroblock processing engine 11A, and the subsequent second slice SL2 is assigned to the subsequent second macroblock processing engine 11B. Further, the subsequent third slice SL3 is assigned to the third macroblock processing engine 11C, and the subsequent fourth slice SL4 is assigned to the first macroblock processing engine 11A.

The respective macroblock processing engines 11A to 11C sequentially process the macroblocks of the plural slices that have been assigned to the engines, respectively, in the order of the raster scan in synchronization. Furthermore, the respective macroblock processing engines 11A to 11C start the processing of the respective slices with timing delayed by a predetermined number of macroblocks with respect to the processing of the macroblock processing engines 11A to 11C in the immediately preceding slices so that the processing of the reference macroblocks of the macroblock to be processed has been completed and the image data to which the macroblock in processing refers to has been stored in the buffer memory 31 at the time of starting the processing of the respective macroblocks.

Figure 9:
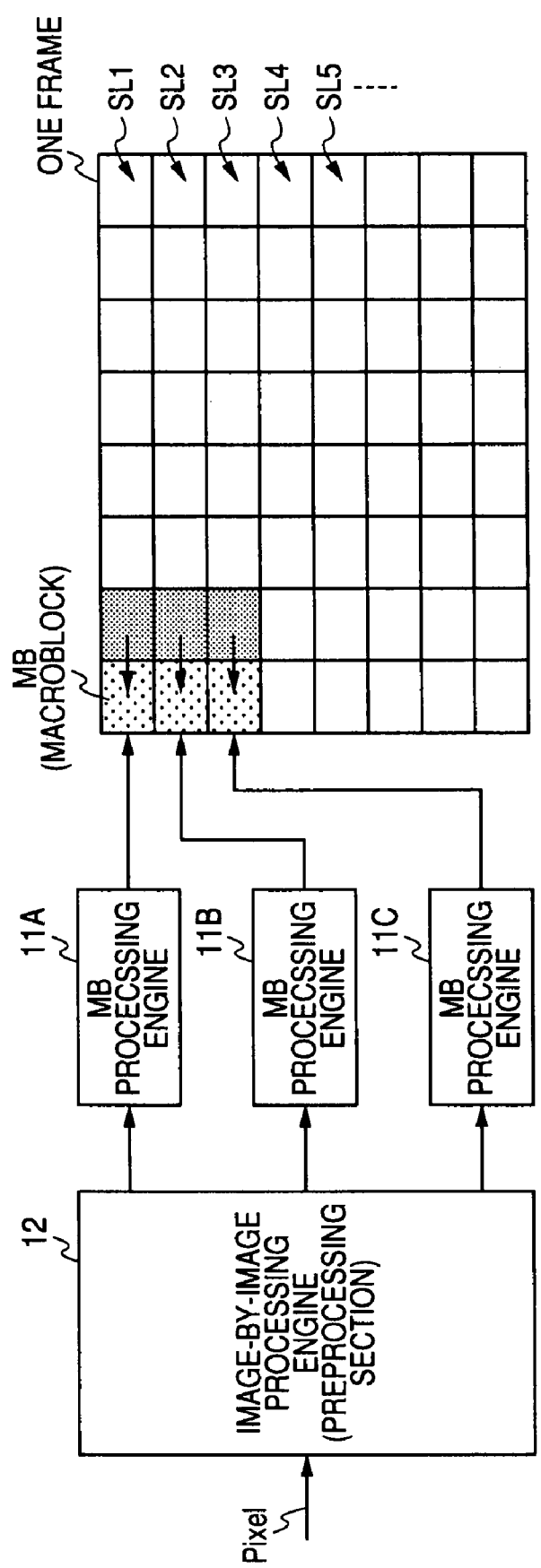
FIG. 9 is a schematic diagram for explanation of processing of intra prediction of MPEG-1, 2.
Figure 43:
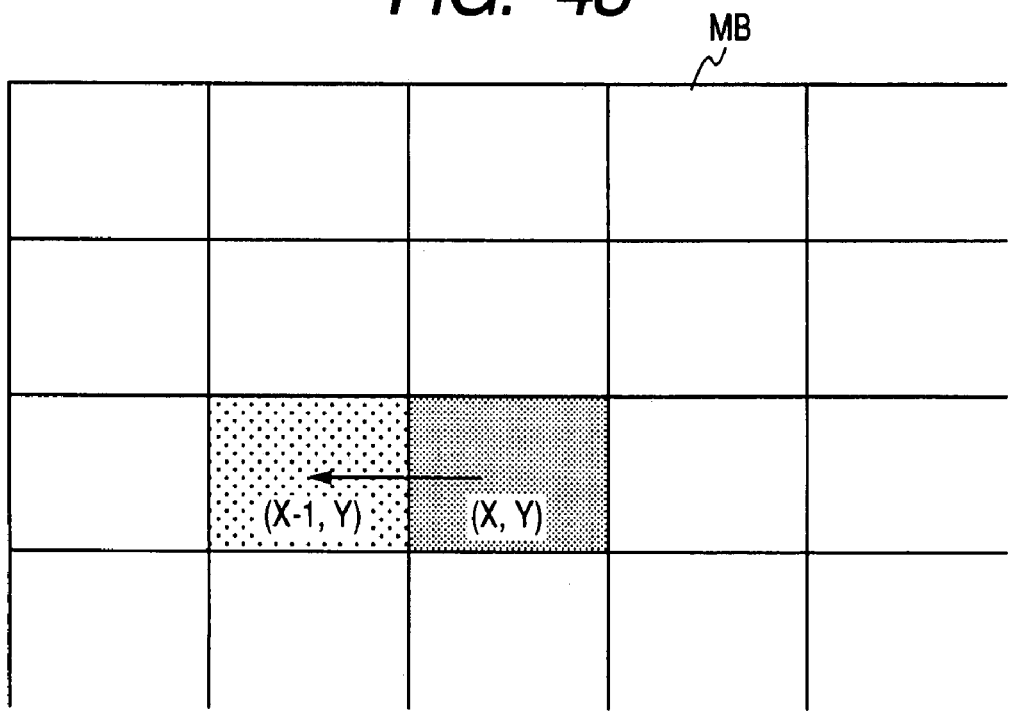
FIG. 43 is a schematic diagram for explanation of reference macroblocks in intra prediction of MPEG-1,2.

That is, as shown in FIG. 9, in intra prediction of MPEG-1, 2, as described above with respect to FIG. 43, since the reference macroblock is only the adjacent macroblock immediately preceding at the scan start side end in the same slice, when the respective slices are processed independently by the respective macroblock processing engines 11A to 11C, regardless of the slice to be processed, the encoding processing of the macroblocks can be performed with reference to the encoded image data of the current frame only by sequentially processing the macroblocks in the raster scan direction. Therefore, in MPEG-1, 2, the encoding processing of image data of one frame can be simultaneously performed in parallel by the plural macroblock processing engines 11A to 11C without any consideration of timing of the processing in the respective slices.

Figure 46:
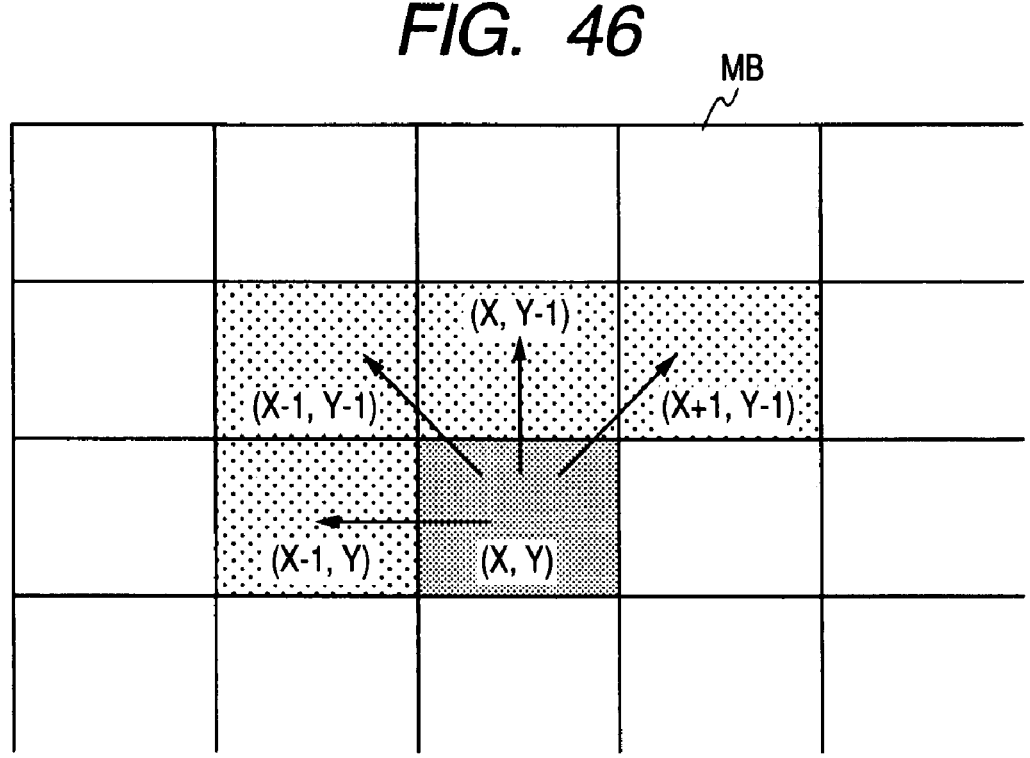
FIG. 46 is a schematic diagram for explanation of reference macroblocks in intra prediction of H.264/AVC.
Figure 47:
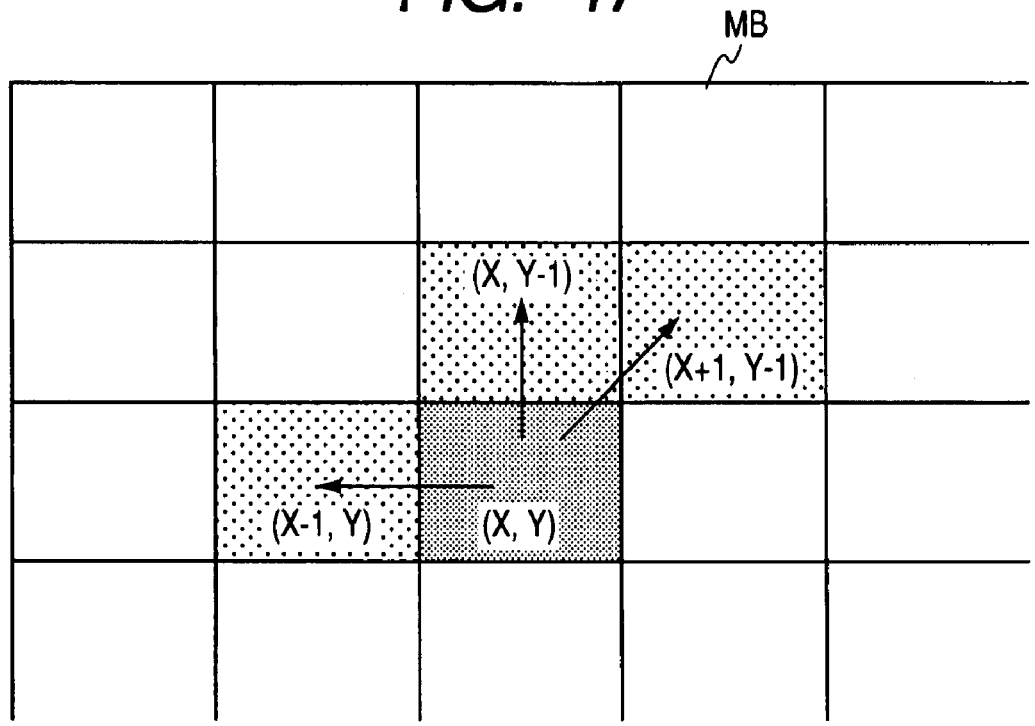
FIG. 47 is a schematic diagram for explanation of reference macroblocks in motion vector prediction of MPEG-4.

However, in the encoding processing of the embodiment, the image data is encoded according to the method of H.264/AVC. In the intra prediction of H.264/AVC, as described above with respect to FIG. 46, not only the adjacent macroblock (X−1,Y) at the scan start end side of the same slice but also the adjacent macroblocks (X,Y−1), (X−1,Y−1), and (X+1,Y−1) of the immediately preceding slice are the reference macroblocks of the macroblock (X,Y). Therefore, when the macroblocks of the respective slices are simultaneously performed in parallel by the plural macroblock processing engines 11A to 11C without any consideration of the processing of the preceding and subsequent slices as is the cases of MPEG-1, 2, the respective macroblock processing engines 11A to 11C will have waiting time for waiting the completion of processing of the reference macroblocks in the immediately preceding slice. Thus, in this case, it may be impossible to efficiently process the macroblocks at a high speed.

In order to eliminate the waiting time, it is necessary that the processing of the reference macroblocks has been completed in the immediately preceding slice before the processing of one slice is started.

Here, in the intra prediction of H.264/AVC, since the reference macroblocks of the immediately preceding slice are the macroblock (X,Y−1) directly above and the preceding and subsequent macroblocks (X−1,Y−1) and (X+1,Y−1) of the macroblock (X,Y−1) directly above, if two or more macroblocks from the raster scan start end side have been processed in the immediately preceding slice, processing of the subsequent slice can be started.

In this embodiment, the respective macroblock processing engines 11A to 11C process the macroblocks of the plural slices assigned to the respective engines in the order of raster scan in synchronization, and thereby, with respect to the processing of the macroblock processing engines 11A to 11C in the immediately preceding slices, start the processing of the respective slices with timing delayed by a predetermined number of macroblocks and simultaneously perform encoding processing on the image data in parallel.

Further, in the embodiment, the processing start point of the subsequent slice is set relative to the processing in the immediately preceding slice so that the reference macroblocks of the macroblock in processing in the immediately preceding slice and the reference macroblocks of the macroblock in processing in the subsequent slice may partly overlap, and thus, the number of the processing results of the macroblock to be referred to is set as minimum as possible.

More specifically, the position relationship of the macroblocks as objects of processing in the continuous slices is set so that the horizontal position of the macroblock in processing of each slice may be the position at the scan start end side relative to the macroblock in processing in the immediately preceding slice with one macroblock in between, and the macroblocks of the respective slices are sequentially processed. Therefore, in the example of FIG. 1, as reference relationships shown by arrows, in the first slice, the processing result of the fifth macroblock from the left end is referred to by the same slice and the subsequent slice, and, in the subsequent slice, the processing result of the third macroblock from the left end is referred to by the same slice and the subsequent slice.

Figure 10:
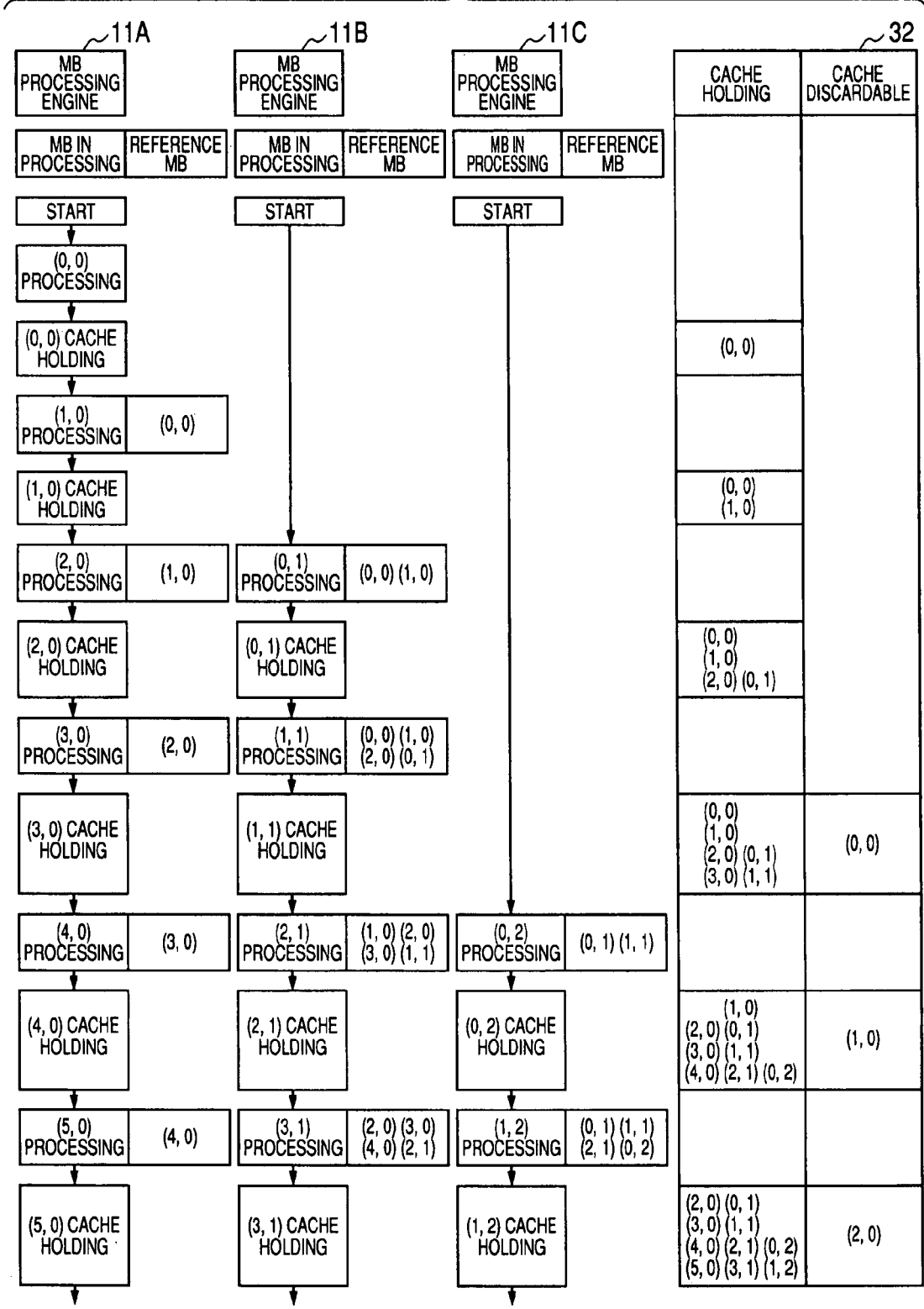
FIG. 10 is a schematic diagram showing processing of macroblocks by the processing in FIG. 1.

Therefore, the respective macroblock processing engines 11A to 11C sequentially process the macroblocks in the sequence shown in FIG. 10. That is, in the macroblock processing engines 11A to 11C, the first macroblock processing engine 11A starts processing of the first slice and processes the macroblock (0,0). Further, subsequently, the first macroblock processing engine 11A processes the subsequent macroblock (1,0) with reference to the processing result of the macroblock (0,0).

When the processing of the subsequent macroblock (1,0) is completed, in the subsequent slice, the second macroblock processing engine 11B starts processing because the processing of two macroblocks at the raster scan start end side is completed in the immediately preceding slice. That is, the first and second macroblock processing engines 11A and 11B subsequently process the macroblocks (2,0) and (0,1), respectively. Further, the first and second macroblock processing engines 11A and 11B subsequently process the macroblocks (3,0) and (1,1), respectively.

Here, When the processing of the macroblock (1,1) is completed, in the subsequent slice, the third macroblock processing engine 11C starts processing because the processing of two macroblocks at the raster scan start end side is completed in the immediately preceding slice. That is, the first, second, and third macroblock processing engines 11A, 11B, and 11C subsequently process the macroblocks (4,0), (2,1), and (0,2), respectively. Further, the first, second, and third macroblock processing engines 11A, 11B, and 11C subsequently process the macroblocks (5,0), (3,1), and (1,2), respectively.

Thus, assuming that the macroblock processing engines 11A to 11C simultaneously process macroblocks in parallel, the buffer memory 31 stores the decoded image data of the current frame Fn and the image data to be processed input from the preprocessing section 12 in the main memory 33, and in accordance with the macroblocks to be processed of the macroblock processing engines 11A to 11C, sequentially loads the image data of the macroblocks to be processed and the image data of the current frame Fn of the reference macroblocks from the main memory 33 to the cache memory 32.

That is, in the example of FIG. 7, in the case where the first macroblock processing engine 11A processes the first macroblock (0,0), the buffer memory loads and holds the corresponding image data of the macroblock (0,0) input from the preprocessing section 12 in advance in the cache memory 32. Further, in the case where the first macroblock processing engine 11A processes the subsequent macroblock (1,0), the buffer memory loads and holds the corresponding image data of the macroblock (1,0) input from the preprocessing section 12 in advance and the image data of the current frame Fn of the macroblock (0,0) processed just before in the cache memory 32.

In the case where the second macroblock processing engine 11B subsequently starts processing, the buffer memory loads and holds the image data of the macroblocks (2,0) and (0,1) to be processed by the first and second macroblock processing engines 11A and 11B and the image data of the current frame Fn of the reference macroblocks (0,0) and (1,0) in the cache memory 32 in advance. Further, the buffer memory subsequently loads and holds the image data of the macroblocks (3,0) and (1,1) to be processed by the first and second macroblock processing engines 11A and 11B and the image data of the current frame Fn of the reference macroblocks (0,0), (1,0), (2,0) and (0,1) in the cache memory 32. The buffer memory discards the data that is no longer necessary to be referred to in the processing of subsequent macroblocks from the cache memory 32.

The cache memory 32 is configured to have the minimum necessary memory capacity to be adaptable for the processing of the macroblock processing engines 11A to 11C as described above using FIG. 1. Here, as shown in FIGS. 11A to 11C, when the three macroblock processing engines 11A to 11C process the macroblocks, respectively, the respective macroblock processing engines 11A to 11C process the macroblocks using one of the maximum four reference macroblocks, respectively (FIG. 11A). Accordingly, as shown in FIG. 11B, if simply calculated, capacity M obtained by (amount of image data of one macroblock)×(number of macroblocks to be processed (1)+the maximum number of reference macroblocks (4))×(number of macroblock processing engines 11A to 11C) is minimum necessary for the cache memory 32. However, in the embodiment, the reference macroblocks are set to overlap between the slice in processing and the immediately preceding slice, and thereby, the capacity (M−N) obtained by subtracting capacity N corresponding the overlapping number of macroblocks from the capacity M is minimum necessary for the cache memory 32.

Therefore, the capacity of the cache memory 32 is set to the minimum necessary capacity (M−N), and the capacity is reduced compared to the case where the reference macroblocks are set not to overlap between the slice to be processed and the immediately preceding slice.

Figure 12:
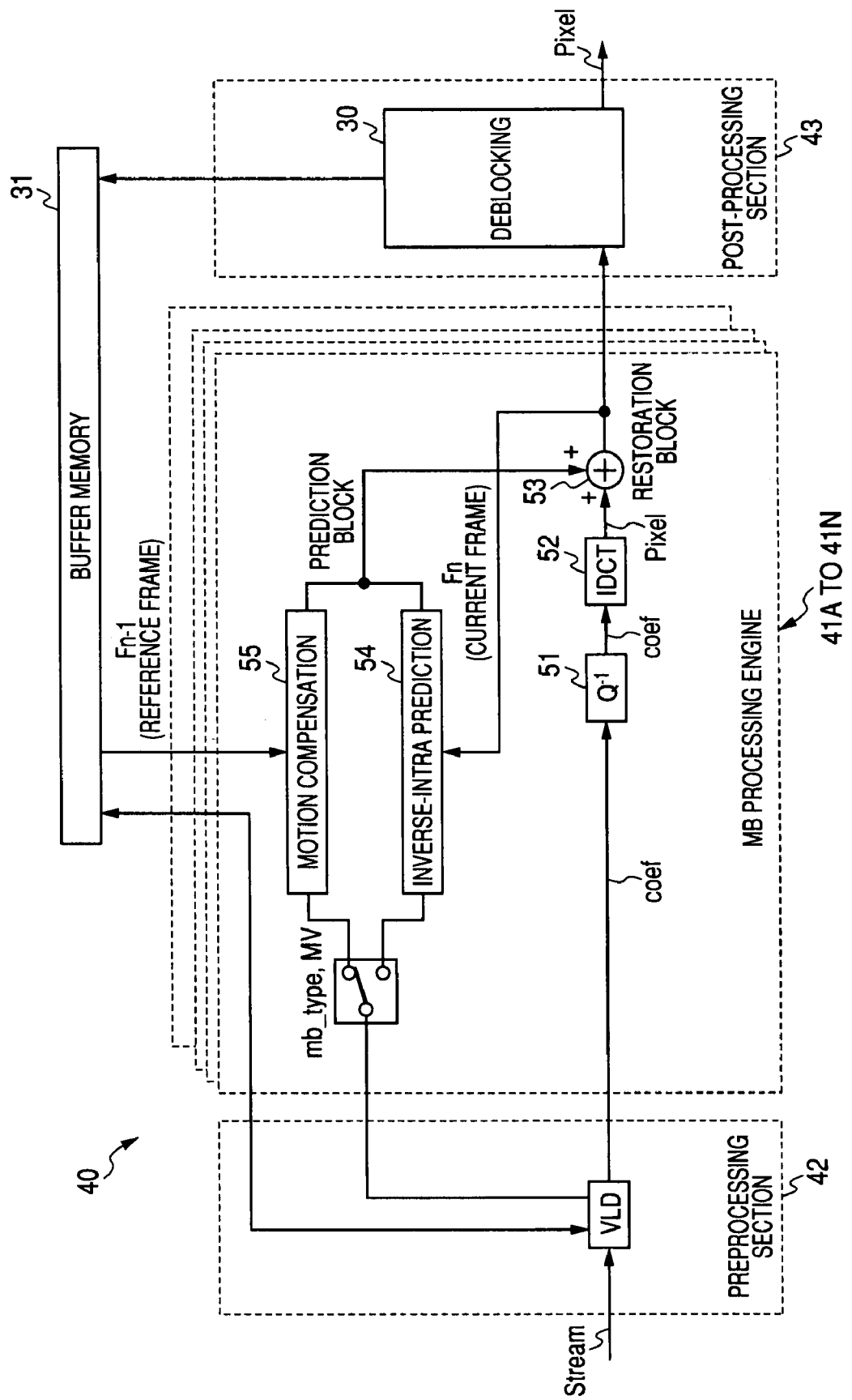
FIG. 12 is a block diagram showing a decoder that is applied to the video equipment of Embodiment 1 of the invention.

FIG. 12 is a block diagram showing a decoder that is applied to the video equipment of Embodiment 1 of the invention in comparison to FIG. 2. The decoder 40 is configured by replacing the program for encoder to be executed by the plural central processing units that form the above described encoder 10 with respect to FIG. 2 with a program for decoder. The decoder 40 decodes the image data Pixel from the coded data Stream generated by the encoder 10 in FIG. 2.

Here, in the decoder 40, functional blocks of macroblock processing engines (MB processing) 41A to 41N for processing macroblocks are formed with the respective central processing units, respectively. Further, in the decoder 40, function blocks of a preprocessing section (VLD) 42 and a post-processing section (deblocking) 43 are formed by a main central processing unit that controls the entire operation.

Here, the preprocessing section 42 is a functional block of processing the coded data Stream together in advance in units of frames before processing by the macroblock processing engines 41A to 41N. Specifically, the preprocessing section 42 is a configuration corresponding to the post-processing section 13 of the encoder 10, and performs variable length decoding processing on the coded data Stream output from the post-processing section 13 and decodes the input data coef of the macroblock processing engines 41A to 41N.

The macroblock processing engines 41A to 41N are configurations corresponding to the macroblock processing engines 11A to 11N of the encoder 10, and function blocks processable in parallel of respectively processing the output data coef of the preprocessing section 42 in units of macroblocks and outputting the image data Pixel.

That is, the macroblock processing engines 41A to 41N input the output data coef of the preprocessing section 42 in units of macroblocks from the buffer memory 31 to an inverse quantization circuit ($Q^{-1}$) 51. Here, the inverse quantization circuit 51 performs inverse quantization processing on the output data coef of the preprocessing section 42 on the quantization scale set in the coded data Stream, and inputs the data to an inverse discrete cosine transform circuit 52. The inverse discrete cosine transform circuit (IDCT) 52 performs inverse discrete cosine transform processing on the output data of the inverse quantization circuit 51. An addition circuit 53 adds the inverse predicted value generated by an inverse intra prediction circuit 54 or a motion prediction compensation circuit 55 to the decoded difference data and decodes the image data Pixel.

The inverse intra prediction circuit 54 outputs an inverse predicted value of intra prediction using the image data Pixel of the current frame Fn decoded by the addition circuit 53. The motion compensation circuit 55 inputs the image data Pixel decoded by the addition circuit 53 via the buffer memory 31 as image data of reference frame Fn−1, and outputs a predicted value of inverse inter prediction using the image data.

The post-processing section 43 performs block filtering processing on the output data Pixel from the macroblock processing engines 41A to 41N and removes block distortion. Further, the section outputs the image data Pixel from which the block distortion has been removed and stores the data as the reference frame in the buffer memory 31.

Figure 13:
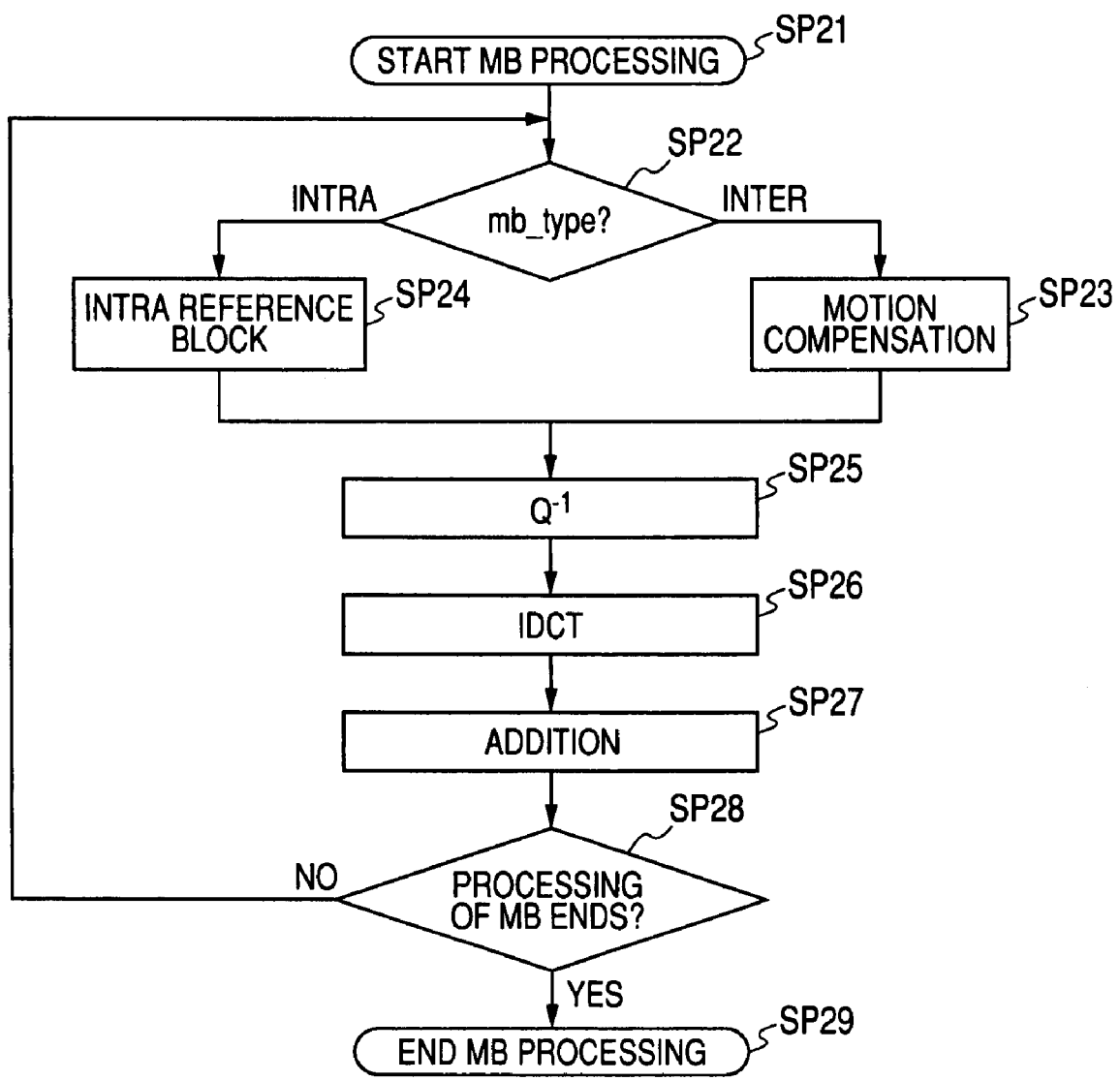
FIG. 13 is a flowchart showing a processing procedure of the respective macroblock processing engines of the decoder in FIG. 12.

FIG. 13 is a flowchart showing a processing procedure of the respective macroblock processing engines 41A to 41N. The respective macroblock processing engines 41A to 41N execute the processing procedure shown in FIG. 13 under control of the main central processing unit.

That is, when the respective macroblock processing engines 41A to 41N start the processing procedure, the engines move from step SP21 to step SP22, and determines inverse inter prediction or inverse intra prediction based on the macroblock type notified from the preprocessing section 42. Here, the macroblock processing engines 41A to 41N move from step SP22 to step SP23 and calculate inverse predicted value using the motion compensation circuit 55 in the case of inverse inter prediction, while they move from step SP22 to step SP24 and calculate inverse predicted values using the inverse intra prediction circuit 54 in the case of inverse intra prediction.

Subsequently, the macroblock processing engines 41A to 41N perform inverse quantization processing on the coded data Stream input from the preprocessing section 42 at step SP25, and then, perform inverse discrete cosine transform processing at the subsequent step SP26. Further, at the subsequent step SP27, the engines add the inverse predicted values to the results of inverse discrete cosine transform processing and decode original image data Pixel. The macroblock processing engines 41A to 41N output the decoded image data to the post-processing section 43, and determine whether there is another macroblock to be processed or not at the subsequent step SP28. Here, when there is another macroblock to be processed, the macroblock processing engines 41A to 41N return from step SP28 to step SP22 and start processing of the subsequent macroblocks. Contrary, when there is no other macroblock to be processed, the macroblock processing engines 41A to 41N move from step SP28 to step S29 and end the processing procedure.

As is the case of the macroblock processing engines 11A to 11N of the encoder 10, the macroblock processing engines 41A to 41N start the processing of each slice with timing delayed relative to the immediately preceding slice so that the macroblock in processing of each slice may be at the scan start end side relative to the macroblock in processing in the immediately preceding slice with one macroblock in between and the reference macroblocks may partly overlap between the slice in processing and the immediately preceding slice, and thereby, simultaneously process the continuous slices in parallel.

Further, as in the case of the encoder 10, the buffer memory 31 caches the image data of the macroblocks to be processed and the reference macroblocks of the respective macroblock processing engines 41A to 41N from the memory 33 and holds the data in the cache memory 32, and, when accessed by the respective macroblock processing engines 41A to 41N, outputs the image data held in the cache memory 32.

(2) Operation of Embodiments

In the above described configuration, in the video equipment of the embodiments, coded data Stream is generated by encoding image data Pixel output from a tuner or an optical disk device, for example, with the encoder 10 (FIG. 2), and the coded data Stream is recorded in a recording medium or output to a transmission channel. In the opposite way, the image data Pixel is generated by decoding the coded data Stream reproduced from the recording medium or the coded data Stream input from the transmission channel with the decoder 40 (FIG. 12), and the image data Pixel is output to a monitor device or the like.

In the video equipment, the encoder 10 and the decoder 40 are formed by loading the programs corresponding to a so-called multicore processor having plural central processing units. Further, with the programs, the encoder 10 and the decoder 40 are formed for performing pipeline processing on image data Pixel and coded data Stream in preprocessing, processing of the respective macroblocks, and post-processing.

That is, in the encoder 10 (FIG. 2), the preprocessing section 12 performs preprocessing on the sequentially input image data Pixel, the subsequent plural macroblock processing engines 11A to 11N generate difference data and perform orthogonal transform processing and quantization processing on the data, and the subsequent post-processing section 13 converts the data into coded data Stream (FIG. 2). Further, in the decoder 40 (FIG. 12), the preprocessing section 42 performs variable length encoding processing on the coded data Stream, the subsequent macroblock processing engines 41A to 41N perform inverse quantization processing, inverse orthogonal transform processing, etc. to convert the data into the image data Pixel, and the subsequent post-processing section 43 performs filtering processing on the data (FIG. 12).

Through the pipeline processing of the preprocessing, processing of the respective macroblocks, and post-processing, the encoder 10 and the decoder 40 perform the encoding processing and decoding processing at a higher speed than those of the case where image data is sequentially processed with one arithmetic processing device.

However, the simple pipeline processing of the processes wastes power because there is waiting time in some of the processes. Accordingly, in the encoder 10 and the decoder 40, the macroblock processing engines 11A to 11N and 41A to 41N are assigned to the processing of the respective macroblocks with the heaviest load of the processes of the pipeline processing with reference to the other macroblocks, and the plural macroblock processing engines 11A to 11N and 41A to 41N sequentially and simultaneously process the macroblocks in parallel (FIGS. 4 and 5).

Further, since the buffer memory 31 that temporarily holds the image data is cacheably configured by the cache memory 32 and the main memory 33 and the plural macroblock processing engines 11A to 11N and 41A to 41N cache the image data necessary for processing, the processing speed is further improved (FIGS. 4 and 5).

However, in the processing of by the macroblock processing engines 11A to 11N and 41A to 41N, the respective macroblocks are processed with reference to the reference macroblocks on which encoding and decoding processing has been completed, and the reference macroblocks are immediately before in the same slice as that of the macroblock to be processed. Accordingly, in the encoder 10 and the decoder 40, the slices as objects of processing are sequentially and cyclically assigned to the respective macroblock processing engines 11A to 11N and 41A to 41N from the start end side of raster scan, and the respective macroblock processing engines 11A to 11N and 41A to 41N sequentially process the macroblocks of the slices as objects of processing, respectively.

However, further, in the processing of by the macroblock processing engines 11A to 11N and 41A to 41N, the reference macroblock also exists in the immediately preceding slice. Therefore, if the processing is performed by simply assigning the respective slices to the plural macroblock processing engines 11A to 11N and 41A to 41N, respectively, as is the case of MPEG-1, 2 (FIG. 9), there is waiting time for waiting the completion of the processing of the reference macroblocks in the immediately preceding slices in the plural macroblock processing engines 11A to 11N and 41A to 41N, and data processing is hardly performed at a high speed.

Accordingly, in the encoder 10 and the decoder 40, when the respective macroblocks of the slice as objects of processing are processed, the timing of processing start of the respective slices is set to be delayed relative to that of the immediately preceding slice so that the processing of the corresponding reference macroblocks existing in the immediately preceding slice may be completed. Thus, the plural macroblock processing engines 11A to 11N and 41A to 41N can simultaneously process the respective macroblocks in parallel (FIG. 1).

Further, in the caching using the buffer memory 31, the image data of the macroblocks to be processed of the respective macroblock processing engines 11A to 11N and 41A to 41N and the image data of the reference macroblocks are set as objects of processing, and the processing speed is improved while the increase in the capacity of the cache memory 32 is prevented (FIG. 10).

However, when the image data of the macroblocks to be processed and the image data of the reference macroblocks are simply held and cached in the cache memory 32, a capacity corresponding to the number obtained by multiplying the sum of the number of the macroblocks (1) and the number of the reference macroblocks by the number of the macroblock processing engines 11A to 11N and 41A to 41N is necessary for the cache memory 32 (FIGS. 11A and 11B).

Accordingly, in the encoder 10 and the decoder 40, the macroblocks are set so that part of the reference macroblocks of the macroblock in processing in the immediately preceding slice and part of the reference macroblocks of the macroblock in processing in the subsequent slice may overlap, more specifically, the macroblock in processing of the slice as the object of processing may be at the raster scan start end relative to the macroblock in processing in the immediately preceding slice with one macroblock in between in the horizontal view, and the macroblocks in the respective slices are processed (FIG. 1).

Consequently, in the encoder 10 and the decoder 40, the capacity of the cache memory 32 can be reduced by as much as the overlapping reference macroblocks, the power consumption can be reduced, and the entire shape can be made smaller compared to the case where the image data of the macroblock to be processed and the image data of the reference macroblock are simply held and cached in the cache memory 32.

(3) Effects of Embodiment

According to the above described configuration, the slices are sequentially and cyclically assigned to the plural macroblock processing engines and encoding processing and the decoding processing are simultaneously performed in parallel by the plural arithmetic processing devices, and the timing of processing start of the respective slices is set so that the reference macroblock of the macroblock in processing in each slice and the reference macroblock of the macroblock in processing in the immediately preceding slice may partly overlap. Therefore, in the configuration in which encoding processing and the decoding processing are performed by simultaneously processing the image data in parallel by the plural arithmetic processing devices, the capacity of the cache memory can be reduced. Thus, the entire power consumption can be reduced and the configuration can be simplified and downsized.

Further, since the capacity of the cache memory is set to the capacity corresponding to the number obtained by subtracting the number of overlapping reference macroblocks from the multiplication value of the sum of the value "1" as the number of macroblocks to be processed by one arithmetic processing device and the maximum number of reference macroblocks by the number of arithmetic processing devices, the capacity of the cache memory can be set to minimum necessary.

Embodiment 2

Figure 14:
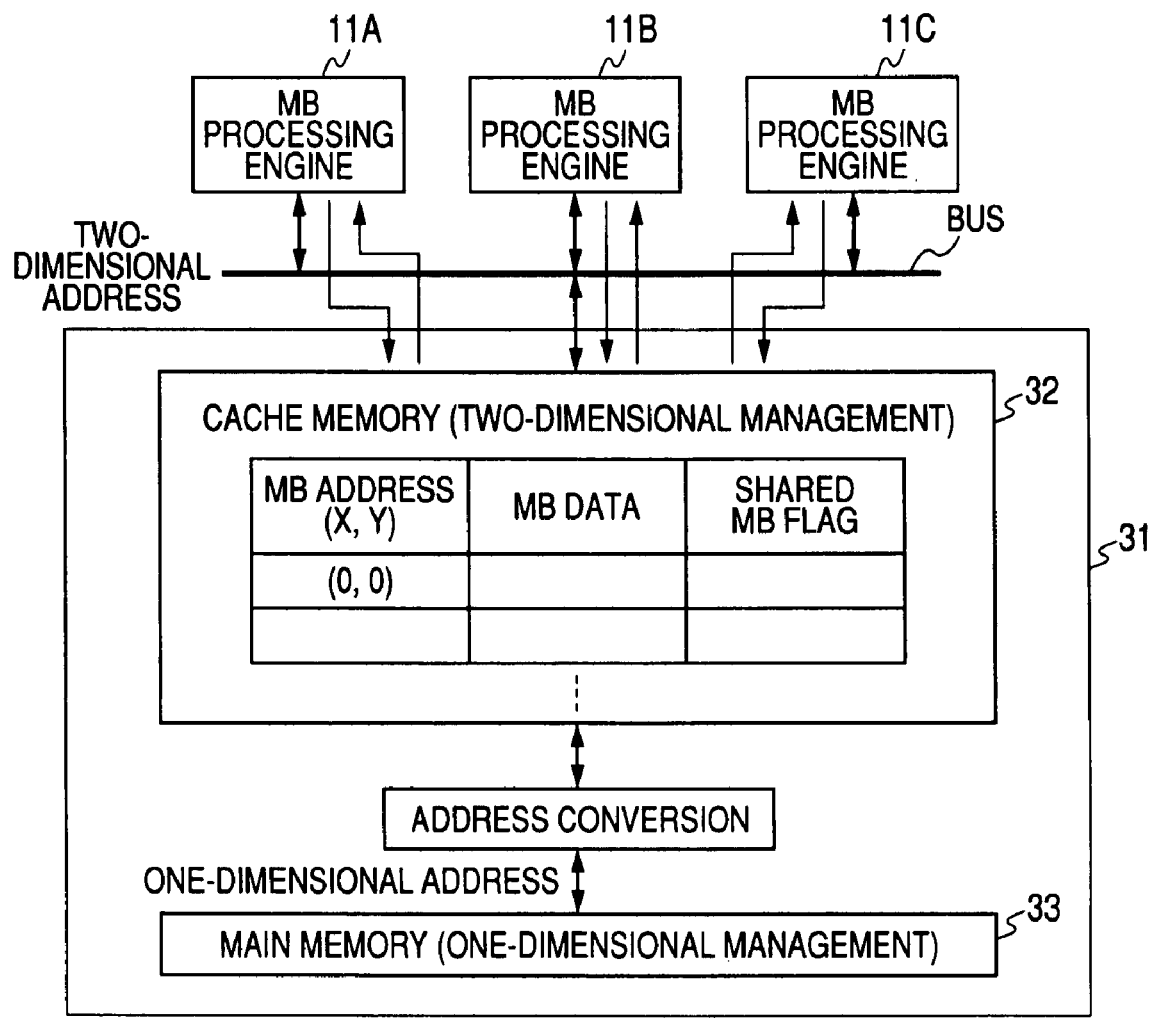
FIG. 14 is a block diagram showing a configuration of a buffer memory in video equipment of Embodiment 2 of the invention.
Figure 17:
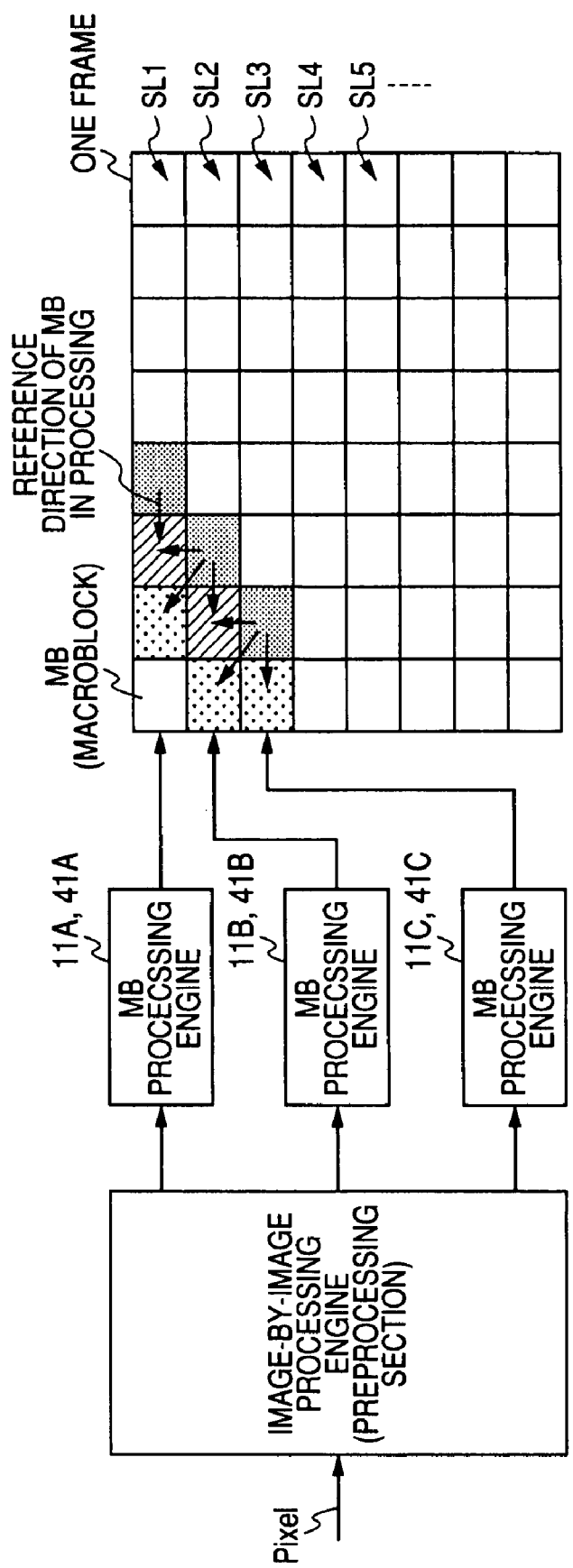
FIG. 17 is a schematic diagram for explanation of processing of macroblocks in video equipment of Embodiment 4 of the invention.

FIG. 14 is a schematic diagram showing a configuration of a buffer memory in video equipment of Embodiment 2 of the invention in comparison to FIG. 4. In this embodiment, shared flags are set for the data of the respective macroblocks stored in the cache memory 32, and the reference macroblocks overlapping among the plural macroblocks to be processed are identified by the shared flags. Further, the reference macroblocks for which the shared flags have been set adjust the conflicting accesses from the macroblock processing engines 11A to 11C and 41A to 41C.

The setting of flags may be executed for the macroblock processing engines 11A to 11C and 41A to 41C, and may be performed with a scheduler for separately managing flags. The encoder and decoder of the embodiment have the same configurations as those of Embodiment 1 except for the configuration relating to the flags.

The same effect as that of Embodiment 1 can be obtained by setting the flags as in the embodiment and controlling the accesses from the plural arithmetic processing devices.

Embodiment 3

Figure 11:
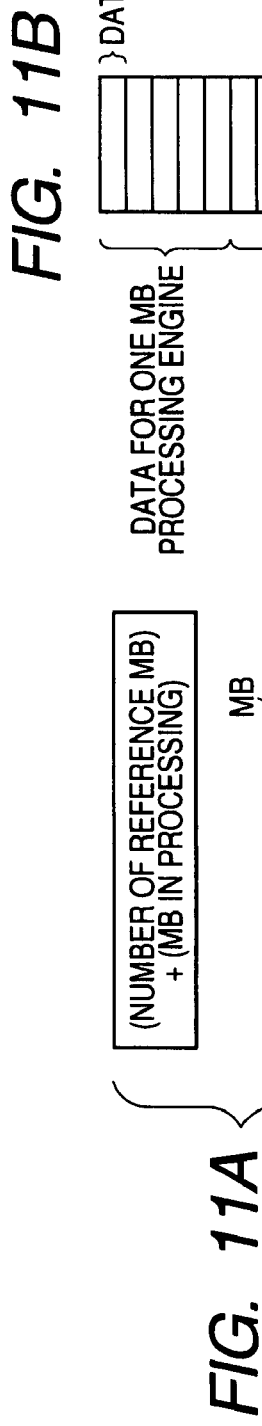
FIGS. 11A to 11C are schematic diagrams for explanation of the capacity of a cache memory.

FIGS. 15 and 16A to 16C are schematic diagrams for explanation of processing of macroblocks in video equipment of Embodiment 3 of the invention in comparison to FIGS. 1 and 11. In this embodiment, the post-processing section 13 described in Embodiment 1 is configured by plural macroblock processing engines 43A, 43B, and 43C for post-processing. The encoder and decoder of the embodiment have the same configurations as those of the encoder and decoder of Embodiment 1 except for the post-processing section 13 configured by the plural macroblock processing engines 43A, 43B, and 43C for post-processing.

Here, slices are sequentially and cyclically assigned to the respective macroblock processing engines for post-processing 43A, 43B, and 43C as is the case of the macroblock processing engines 11A to 11N and 41A to 41N in Embodiment 1, and the plural slices respectively assigned are sequentially processed in the order of raster scan. Further, the engines execute deblock filtering processing using the cache memory, respectively. Furthermore, in the respective slices, the timing of scan start is set so that the reference macroblocks of the immediately preceding slices and the reference macroblocks of the macroblocks in processing may partly overlap.

Figure 48:
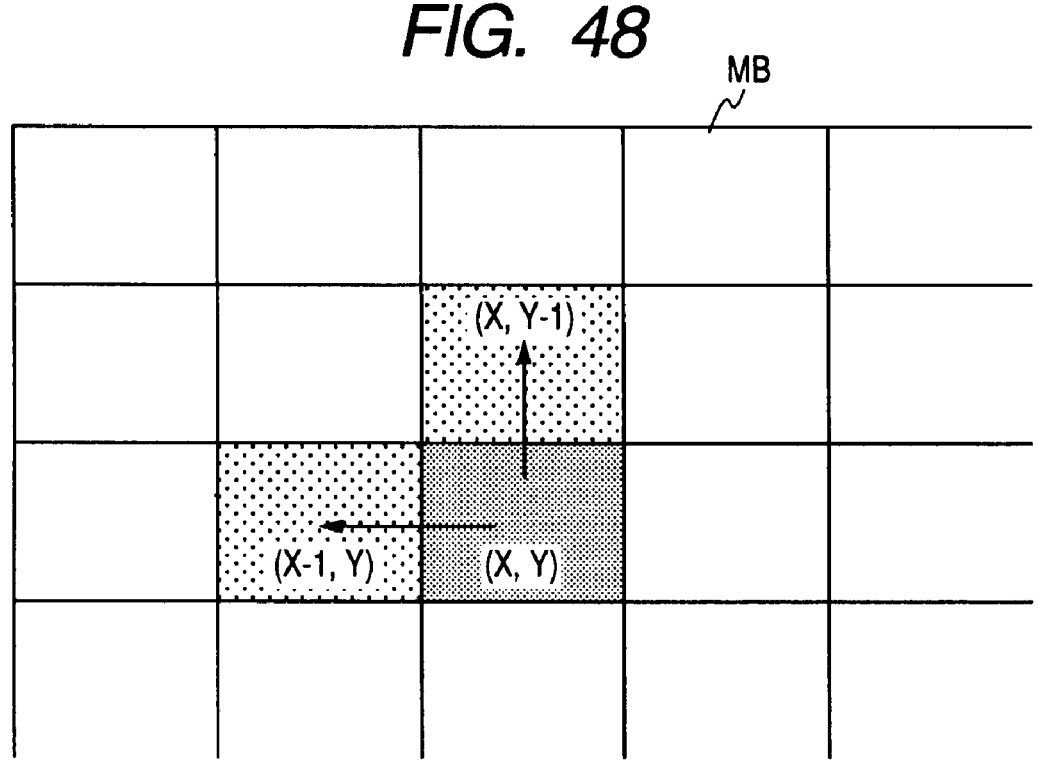
FIG. 48 is a schematic diagram for explanation of reference macroblocks in deblocking filter processing of H.264/AVC.
Figure 49:
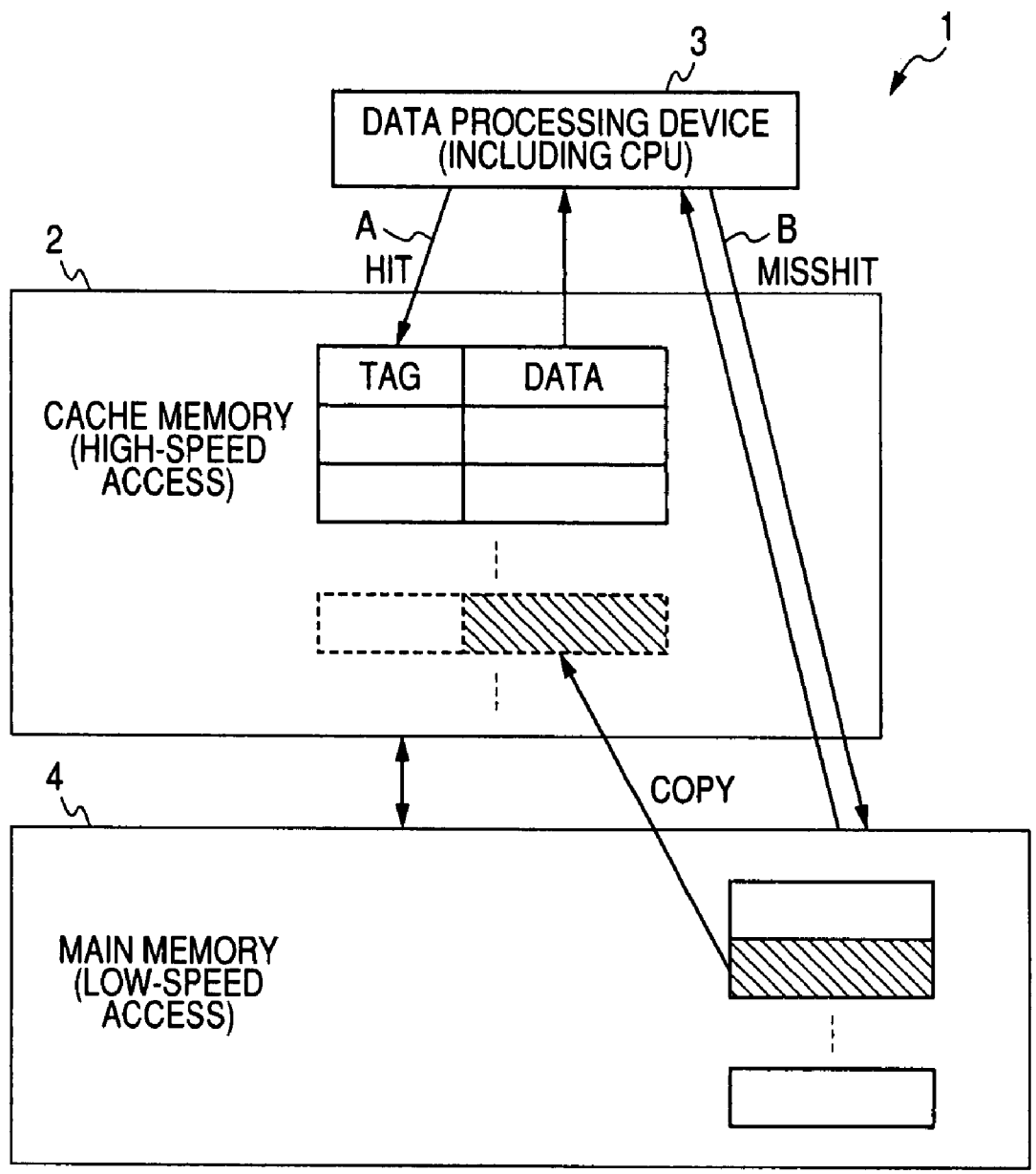
FIG. 49 is a schematic diagram for explanation of caching.

Here, in the deblocking filter processing of H.264/AVC, as described with respect to FIG. 48, the adjacent macroblock (X−1,Y) at the scan start end side of the same slice and the adjacent macroblock (X,Y−1) directly above of the immediately preceding slice are set as reference macroblocks of the macroblock (X,Y), and the macroblock (X,Y) is processed by referring to the processing result of the macroblock (X,Y−1) or (X−1,Y).

Accordingly, in the embodiment, the macroblock in processing in each slice is set to be the adjacent macroblock at the raster scan start end side relative to the macroblock in processing in the immediately preceding slice in the horizontal view. Therefore, in each macroblock, the reference macroblock directly above overlaps with the reference macroblock of the immediately preceding slice, and the plural arithmetic processing sections simultaneously process the macroblocks in parallel with the cache memory capacity reduced by the overlapping reference macroblocks in the embodiment.

According to the embodiment, since the plural arithmetic processing devices simultaneously perform processing in parallel also in the filtering processing of post-processing and the reference macroblock in processing in each slice is set to partly overlap with the reference macroblock of the macroblock in processing of the immediately preceding slice, the capacity of the cache memory can be reduced and the image data can be processed at a higher speed.

Embodiment 4

FIGS. 17 and 18A to 18C are schematic diagrams for explanation of processing of macroblocks in video equipment of Embodiment 4 of the invention in comparison to FIGS. 1 and 11A to 11C. In this embodiment, image data is encoded and decoded in MPEG-4. The encoder and decoder of the embodiment have the same configurations as those of the encoder and decoder of Embodiment 1 except for the configuration related to formats.

Figure 44:
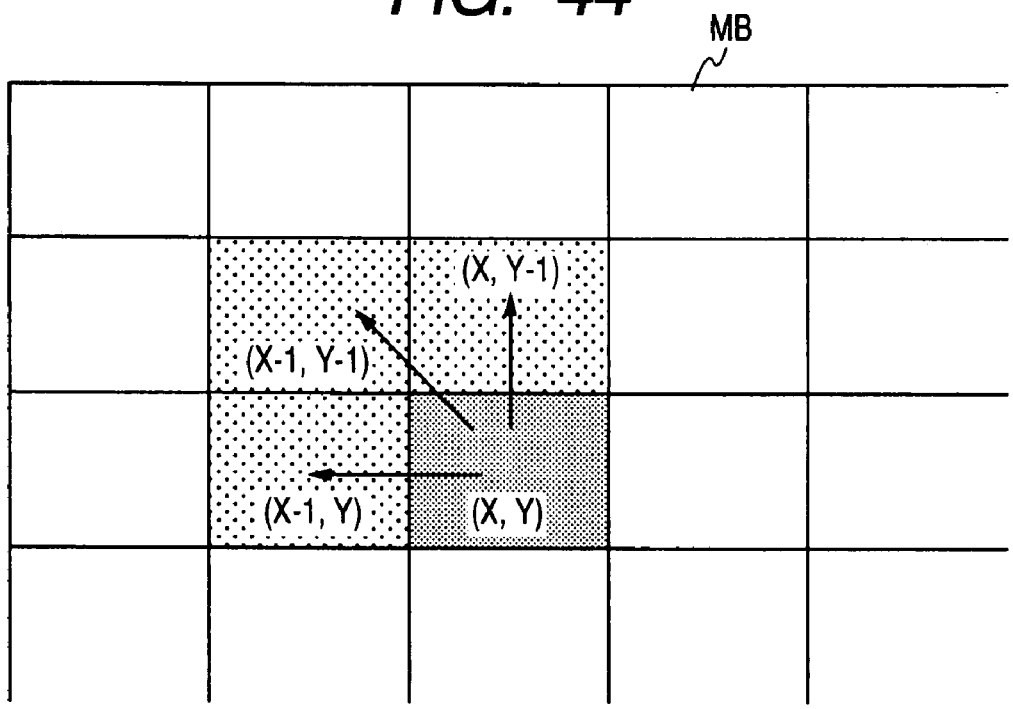
FIG. 44 is a schematic diagram for explanation of reference macroblocks in intra prediction of MPEG-4.

Here, in intra prediction of MPEG-4, as described with respect to FIG. 44, the adjacent macroblock (X−1,Y) at the scan start end side of the same slice, the adjacent macroblock (X,Y−1) directly above of the immediately preceding slice, and the adjacent macroblock (X−1,Y−1) at the scan start end side of the slice containing the adjacent macroblock (X,Y−1) directly above are set as reference macroblocks of the macroblock (X,Y).

Accordingly, in the embodiment, slices are sequentially and cyclically assigned to the respective macroblock processing engines as is the case of the macroblock processing engines 11A to 11N and 41A to 41N in Embodiment 1, and the plural slices respectively assigned are sequentially processed in the order of raster scan. Further, the engines process the macroblocks using the cache memory, respectively, and, in the respective slices, the timing of scan start is set so that the reference macroblocks of the immediately preceding slices and the reference macroblocks of the macroblocks in processing may partly overlap.

More specifically, the macroblock in processing in each slice is set to be the adjacent macroblock at the raster scan start end side relative to the macroblock in processing in the immediately preceding slice in the horizontal view. Therefore, in each macroblock, the reference macroblock directly above overlaps with the reference macroblock of the immediately preceding slice, and the plural arithmetic processing sections simultaneously process the macroblocks in parallel with the cache memory capacity reduced by the overlapping reference macroblocks in the embodiment.

According to the embodiment, the same effect as that of Embodiment 1 can be obtained when the embodiment is applied to the processing of MPEG-4.

Embodiment 5

FIGS. 19 and 20A to 20C are schematic diagrams for explanation of processing of macroblocks in video equipment of Embodiment 5 of the invention in comparison to FIGS. 1 and 11A to 11C. In Embodiment 5, the preprocessing section 12 is configured by plural macroblock processing engines for preprocessing 12A, 12B, and 12C in the encoder and decoder of MPEG-4 of Embodiment 4. The encoder and decoder of the embodiment have the same configurations as those of the encoder and decoder of Embodiment 4 except for the preprocessing section 12 is configured by plural macroblock processing engines for preprocessing 12A, 12B, and 12C.

Here, slices are sequentially and cyclically assigned to the respective macroblock processing engines for preprocessing 12A, 12B, and 12C as is the case of the macroblock processing engines 11A to 11N and 41A to 41N, and the plural slices respectively assigned are sequentially processed in the order of raster scan. Further, the engines execute the processing of motion vector prediction using the cache memory, respectively. Furthermore, the timing of scan start is set so that the reference macroblocks of the immediately preceding slices and the reference macroblocks of the macroblocks in processing may partly overlap.

Figure 45:
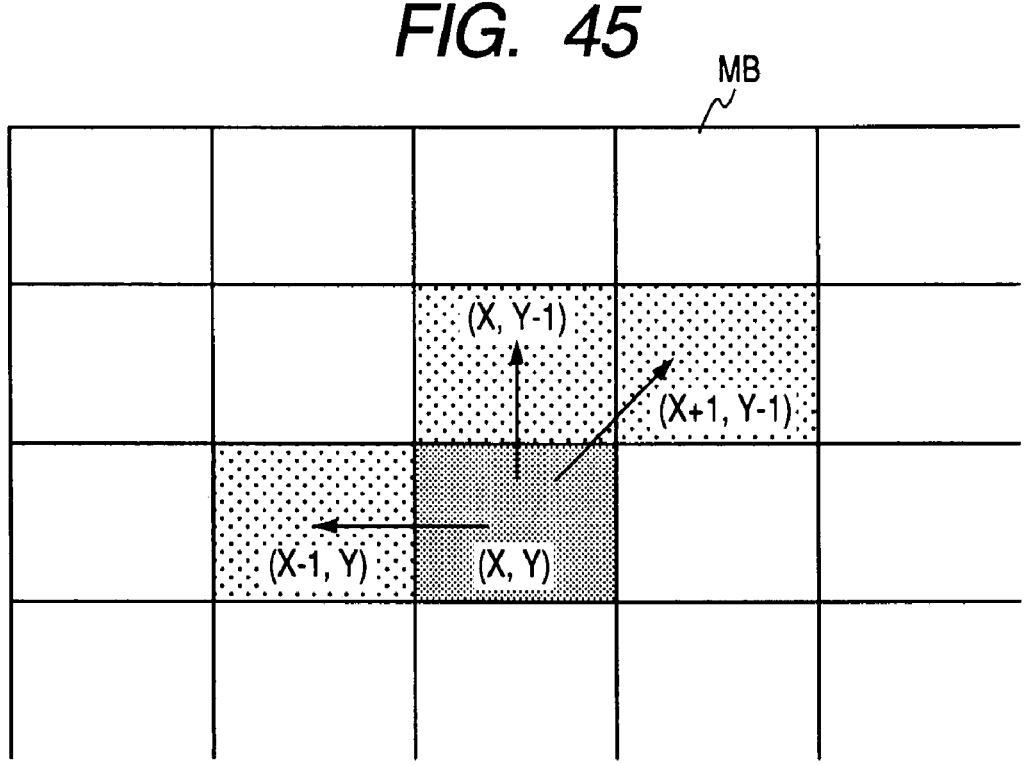
FIG. 45 is a schematic diagram for explanation of reference macroblocks in motion vector prediction of MPEG-4.

Here, in motion vector prediction processing of MPEG-4, as described with respect to FIG. 45, the adjacent macroblock (X−1,Y) at the scan start end side of the same slice, the adjacent macroblock (X,Y−1) directly above of the immediately preceding slice, and the adjacent macroblock (X+1,Y−1) at the scan termination end side of the slice containing the adjacent macroblock (X,Y−1) directly above are set as reference macroblocks of the macroblock (X,Y), and the motion vector of the macroblock (X,Y) is predicted by referring to the motion vector of the macroblock (X−1,Y), (X,Y−1), or (X+1,Y−1).

Accordingly, in the embodiment, the respective macroblock processing engines for preprocessing are set so that the macroblock in processing of each slice may be at the raster scan start end side relative to the macroblock in processing in the immediately preceding slice with one macroblock in between in the horizontal view as is the case of the macroblock processing engines 11A to 11N and 41A to 41N in Embodiment 1. Therefore, in the each macroblock, the reference macroblock subsequent to the reference macroblock directly above overlaps with the reference macroblock in the immediately preceding slice, and the plural arithmetic processing sections simultaneously perform motion vector prediction processing in parallel with the cache memory capacity reduced by the overlapping reference macroblocks in the embodiment.

According to the embodiment, since the plural arithmetic processing devices simultaneously perform processing in parallel also in the motion vector prediction of preprocessing and the reference macroblock in processing in each slice is set to partly overlap with the reference macroblock of the macroblock in processing of the immediately preceding slice, the capacity of the cache memory can be reduced and the image data can be processed at a higher speed.

Embodiment 6

Figure 21:
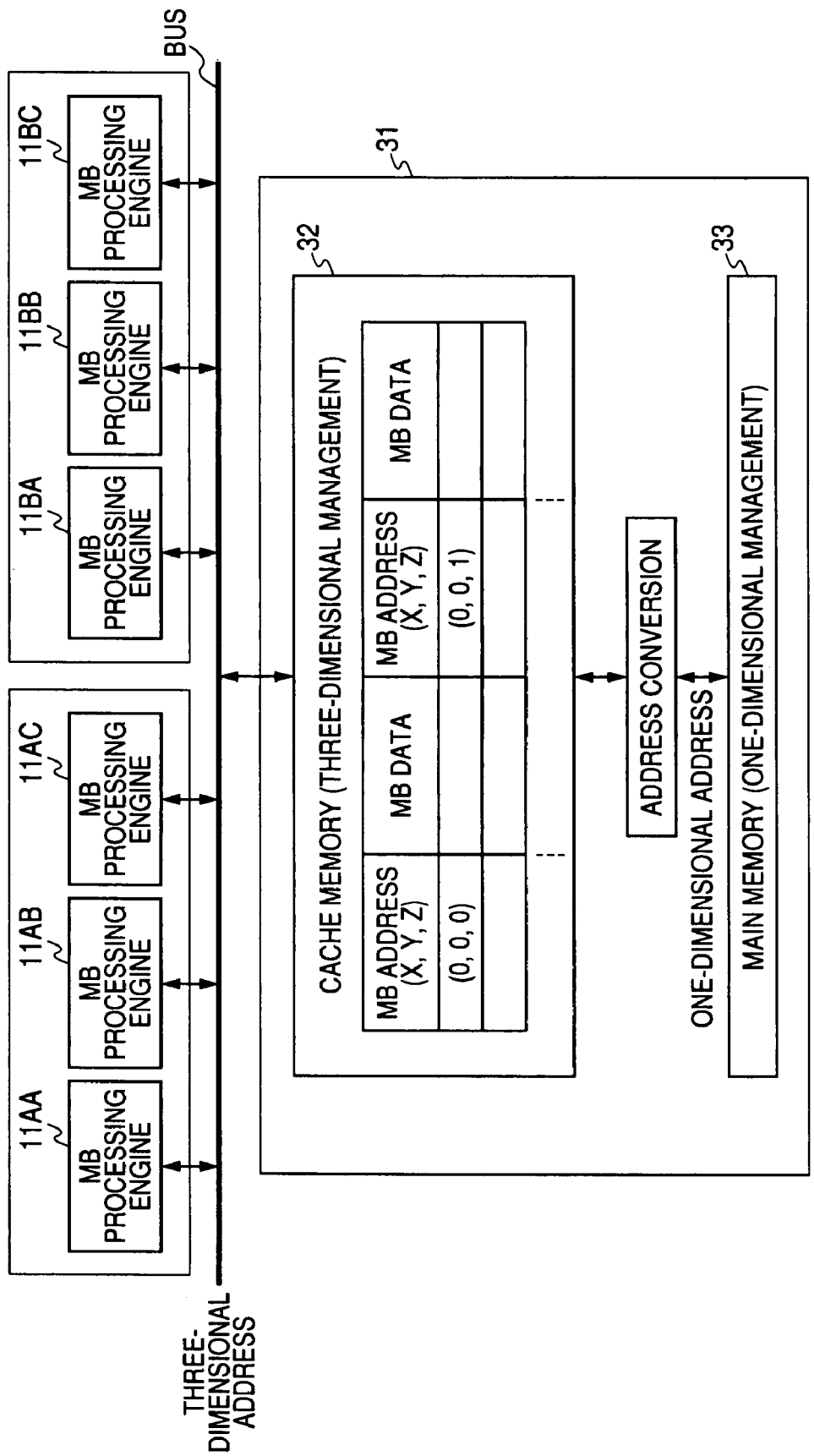
FIG. 21 is a block diagram showing a main part of an encoder of Embodiment 6 of the invention.

FIG. 21 is a block diagram showing a main part of an encoder of Embodiment 6 of the invention in comparison to FIG. 4. In this embodiment, two encoder systems independently configured by multicore processors are provided. Further, each encoder is provided with the preprocessing section 12, the plural macroblock processing engines 11A to 11C, and the post-processing section 13 as described above with respect to Embodiment 1. In the embodiment, the buffer memory 31 is shared by the two systems and two systems of coded data different in bit rate are simultaneously generated in parallel. In FIG. 21, the macroblock processing engines of the first system are shown by signs 11AA to 11AC and the macroblock processing engines of the second system are shown by signs 11BA to 11BC.

Figure 22:
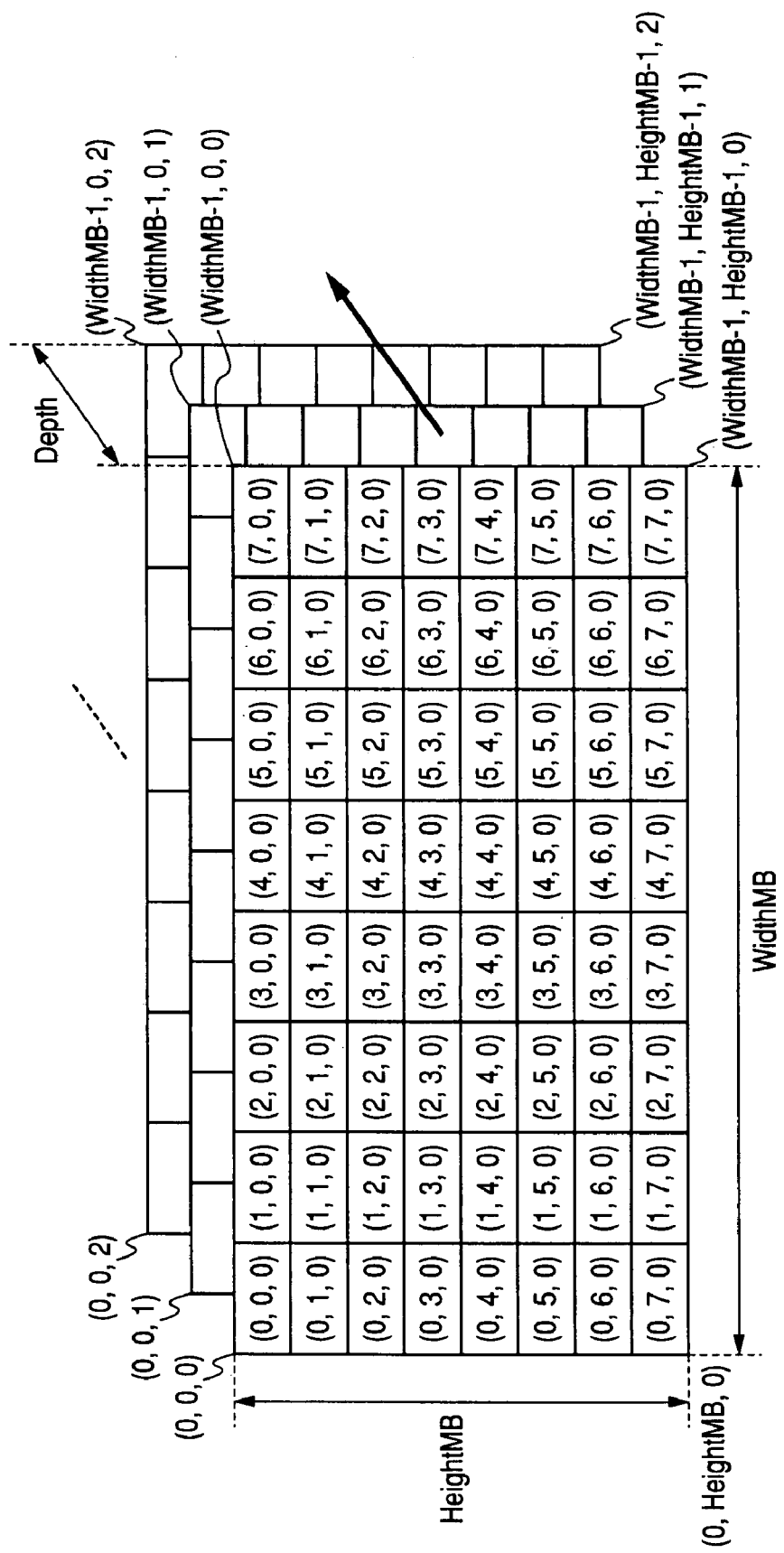
FIG. 22 is a chart showing addresses of macroblocks in the configuration in FIG. 21.
Figure 23:
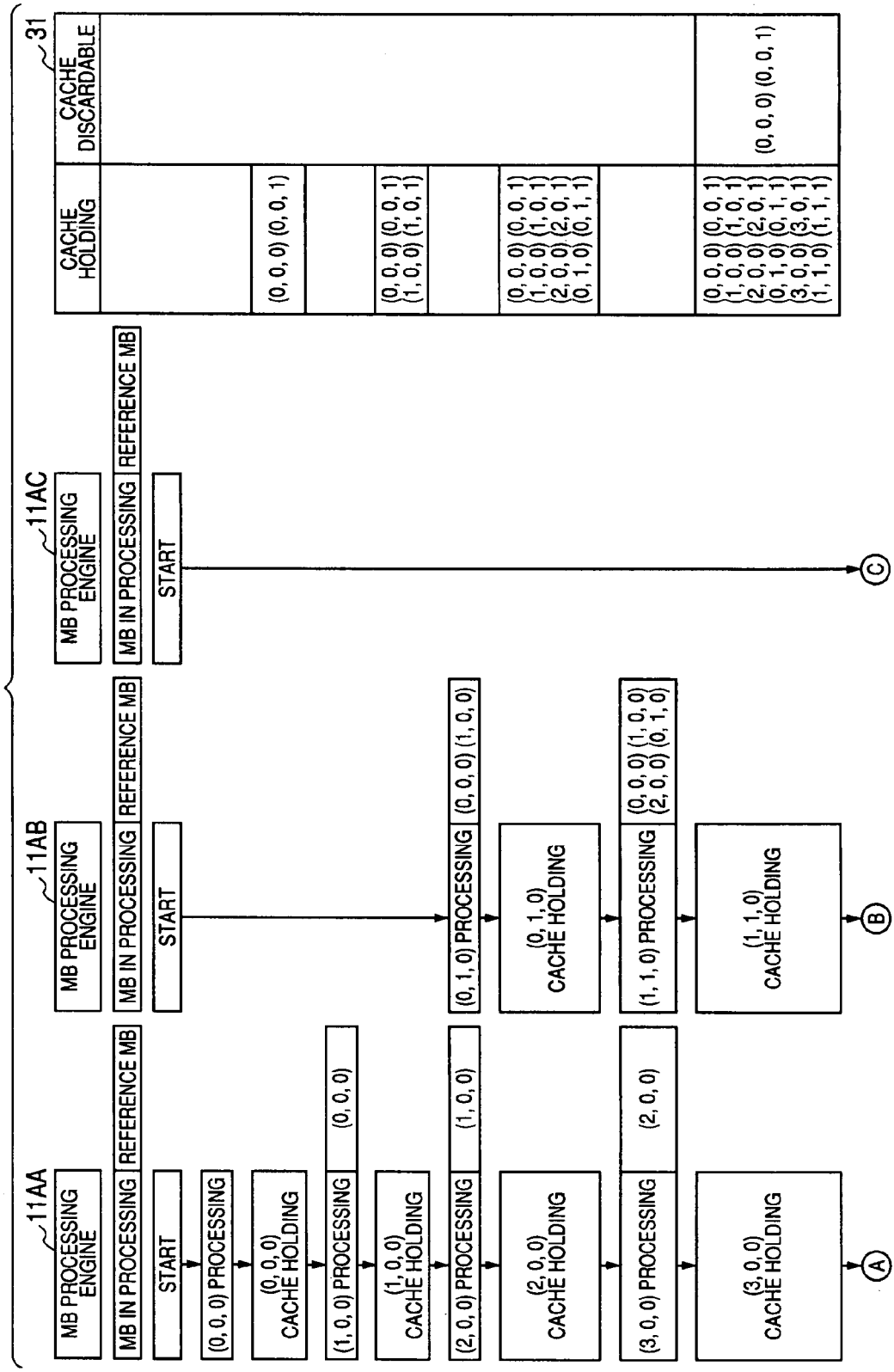
FIG. 23 is a schematic diagram for explanation of processing of macroblocks in the configuration in FIG. 21.
Figure 24:
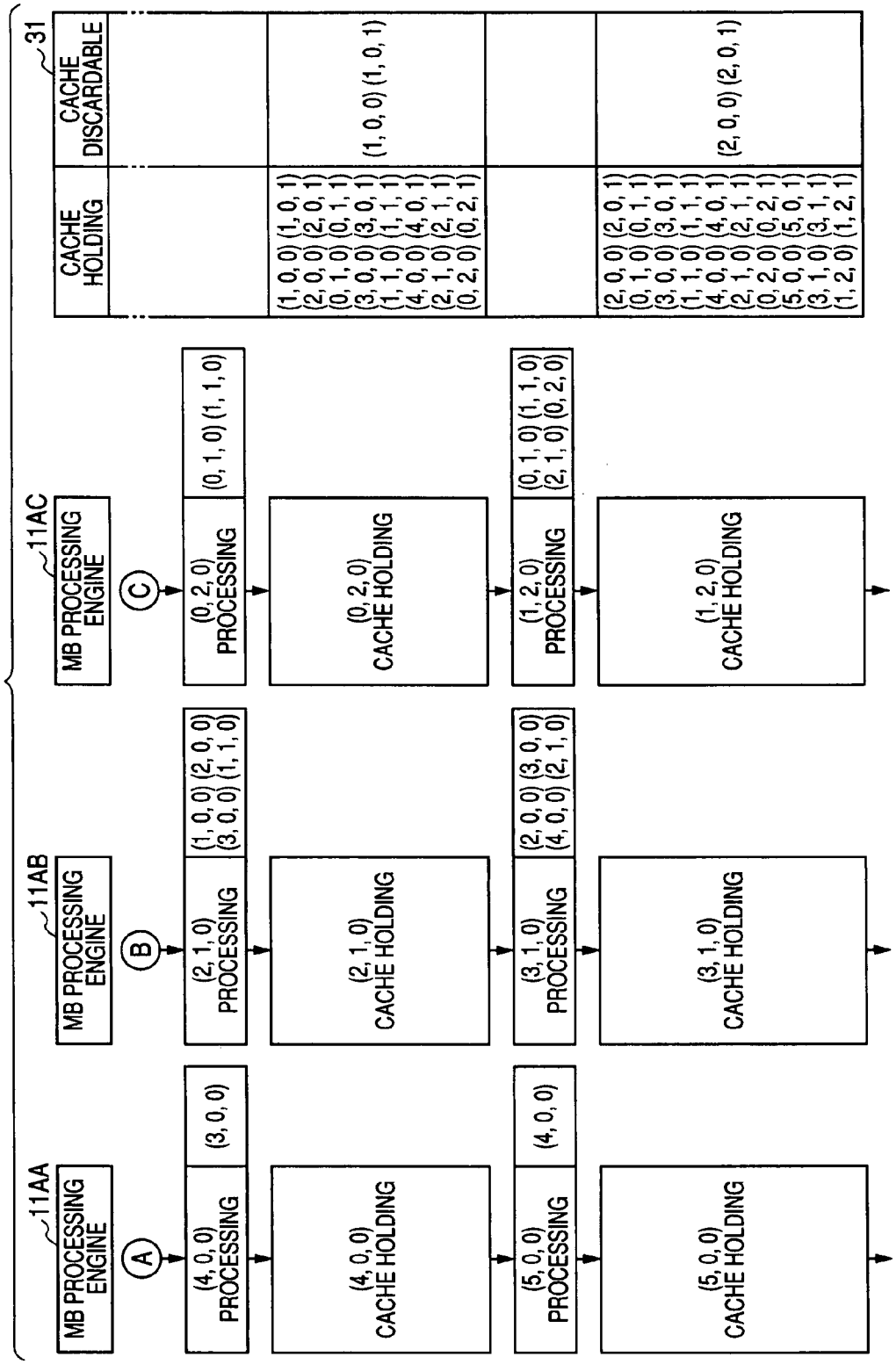
FIG. 24 is a schematic diagram continued from FIG. 23.
Figure 25:
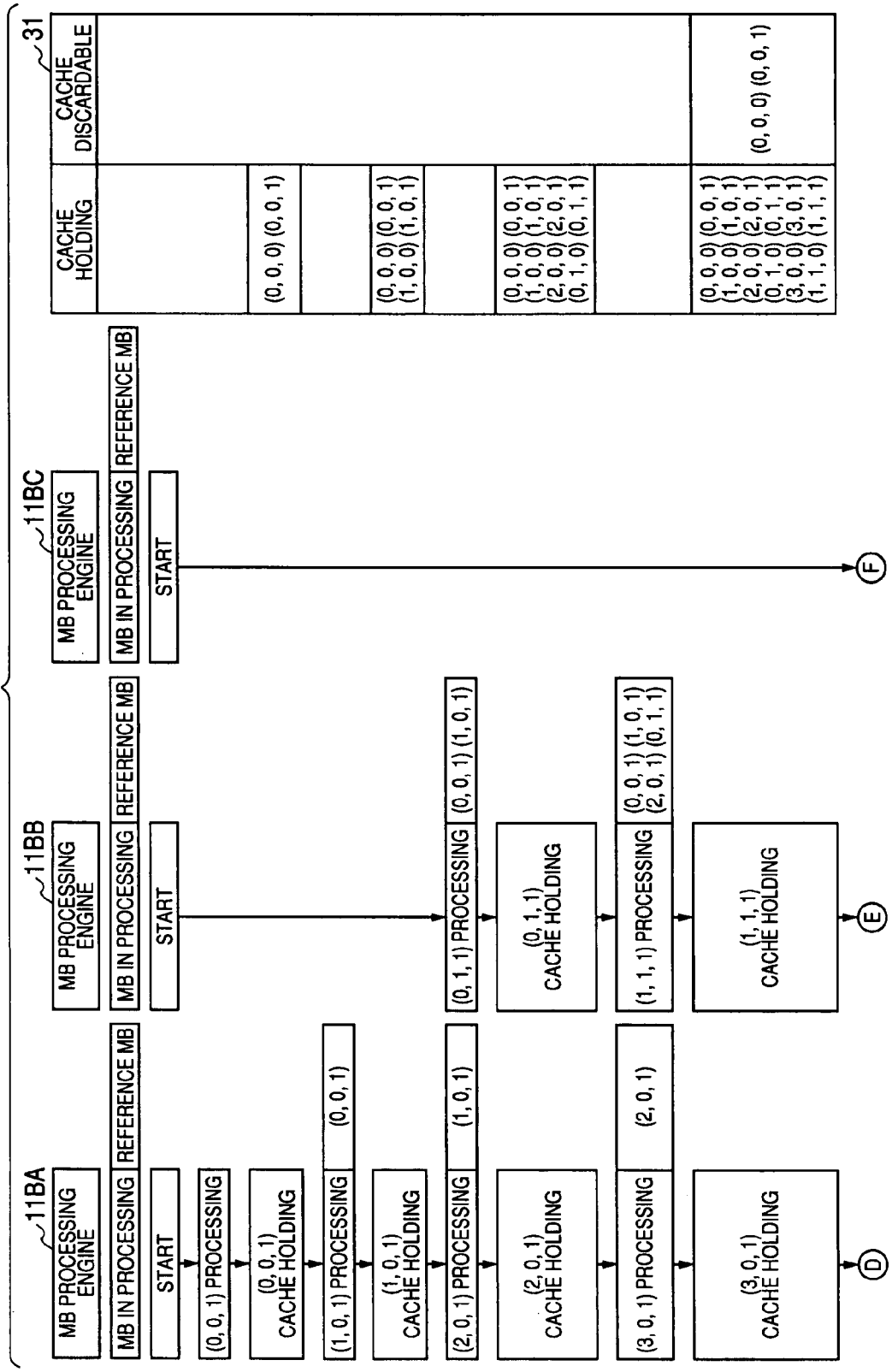
FIG. 25 is a schematic diagram continued from FIGS. 23 and 24.
Figure 26:
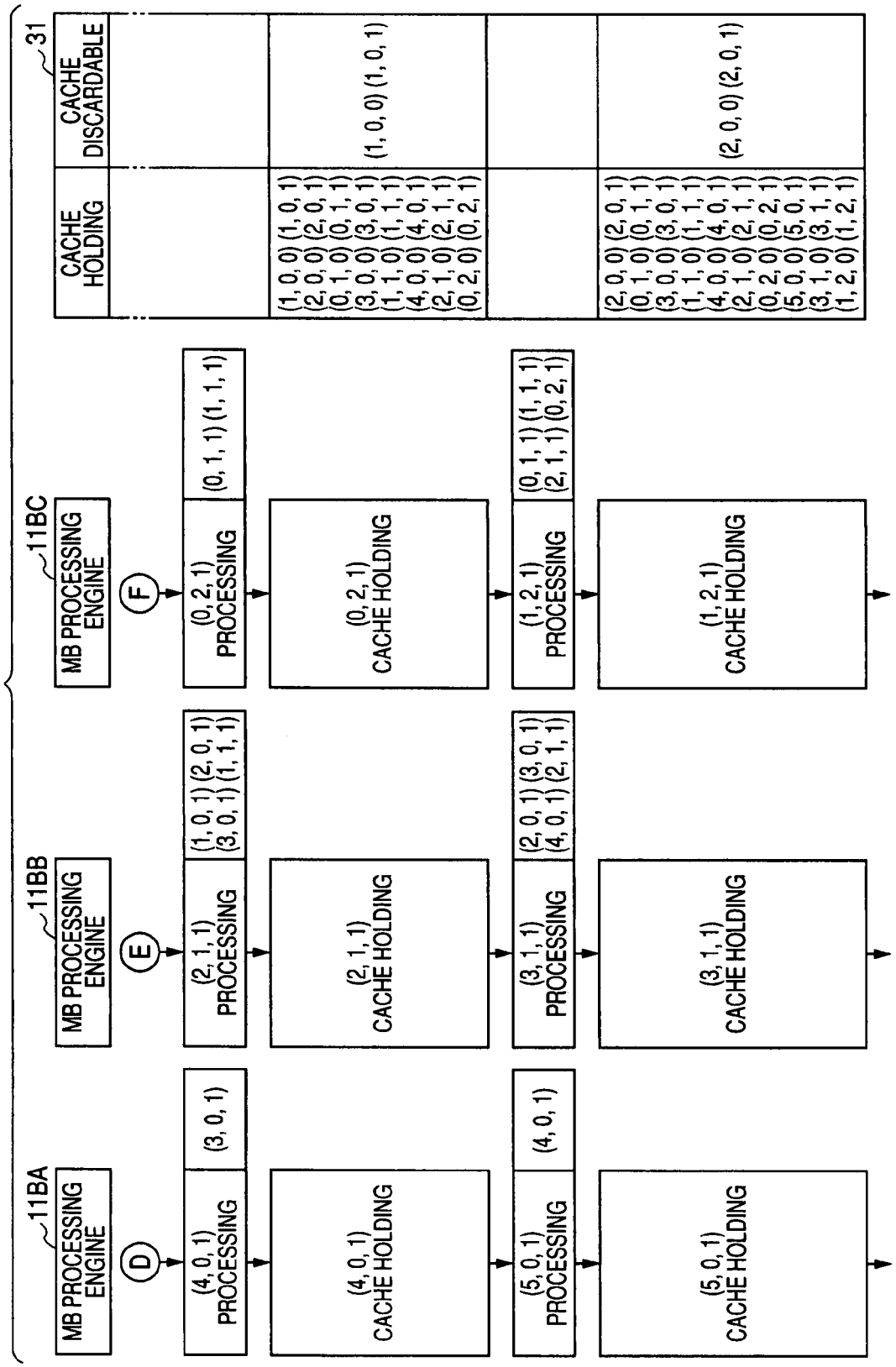
FIG. 26 is a schematic diagram continued from FIGS. 23 to 25.

Here, as shown in FIG. 22 in comparison to FIG. 5, the buffer memory 31 manages image data of the respective macroblocks through address management using three-dimensional addresses (X,Y,Z) formed by adding one-dimensional addresses for identifying the system that performs processing to the two-dimensional addresses (X,Y) as described above with respect to Embodiment 1. Accordingly, when the main memory 33 is accessed, the three-dimensional addresses (X,Y,Z) are address transformed into one-dimensional addresses in the embodiment.

As shown FIGS. 23 to 26, the macroblock processing engines 11AA to 11AC and 11BA to 11BC of the respective systems simultaneously process plural slices that have been assigned thereto in parallel, respectively, so that, within the respective systems, as is the case of the respective macroblock processing engines 11A to 11C described above with respect to Embodiment 1, the reference macroblock of the macroblock in processing in each slice and the reference macroblock of the macroblock in processing in the immediately preceding slice may partly overlap. Further, in the preprocessing sections and the post-processing sections of the respective systems, image data is sequentially processed in response to the processing of the macroblock processing engines 11AA to 11AC and 11BA to 11BC, as is the case of the respective macroblock processing engines 11A to 11C described above with respect to Embodiment 1.

In the embodiment, the same effect as that of Embodiment 1 can be obtained when the invention is applied to the case of performing processing by plural systems.

Embodiment 7

Figure 27:
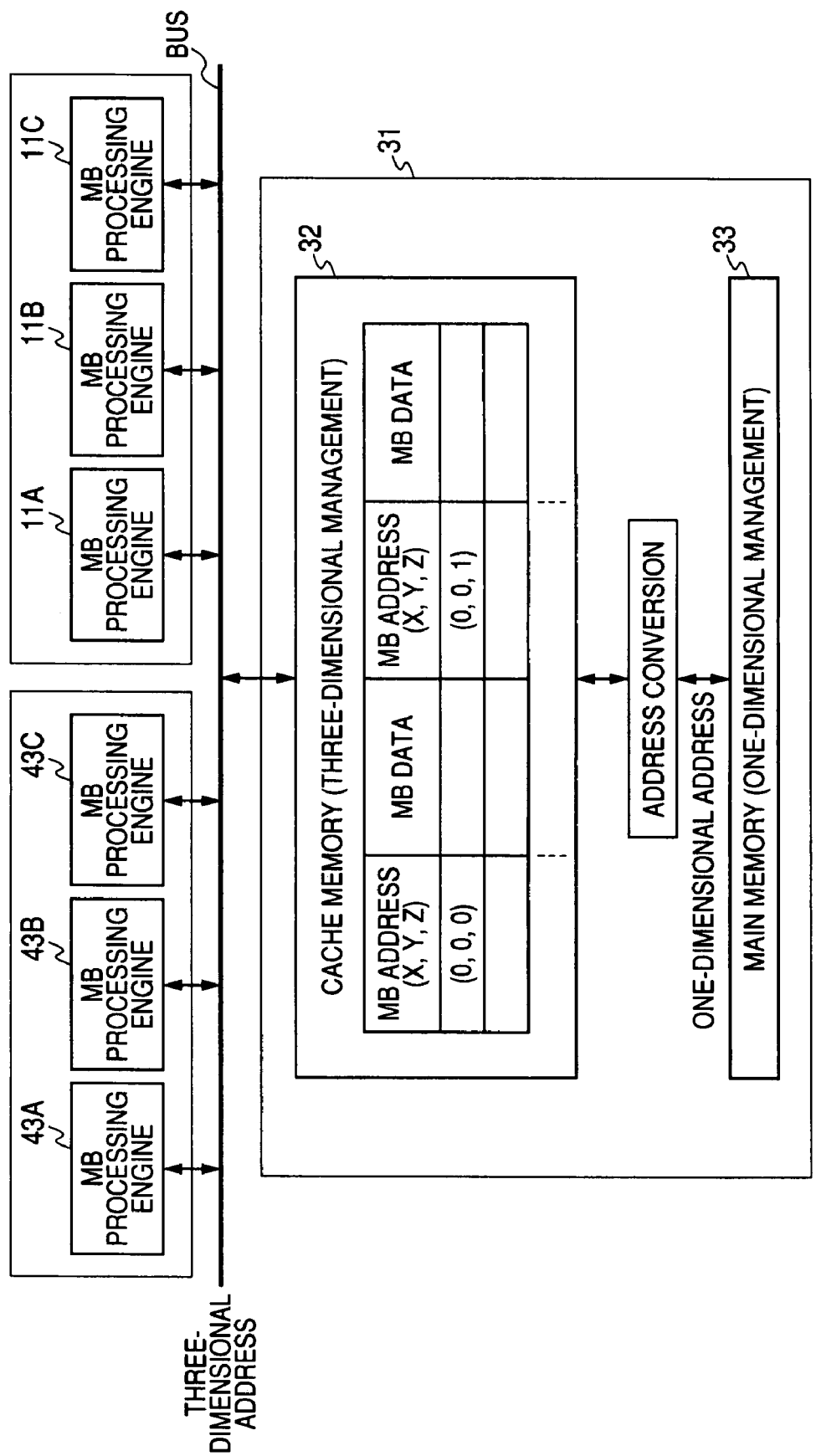
FIG. 27 is a block diagram showing a main part of an encoder and a decoder of Embodiment 7 of the invention.
Figure 28:
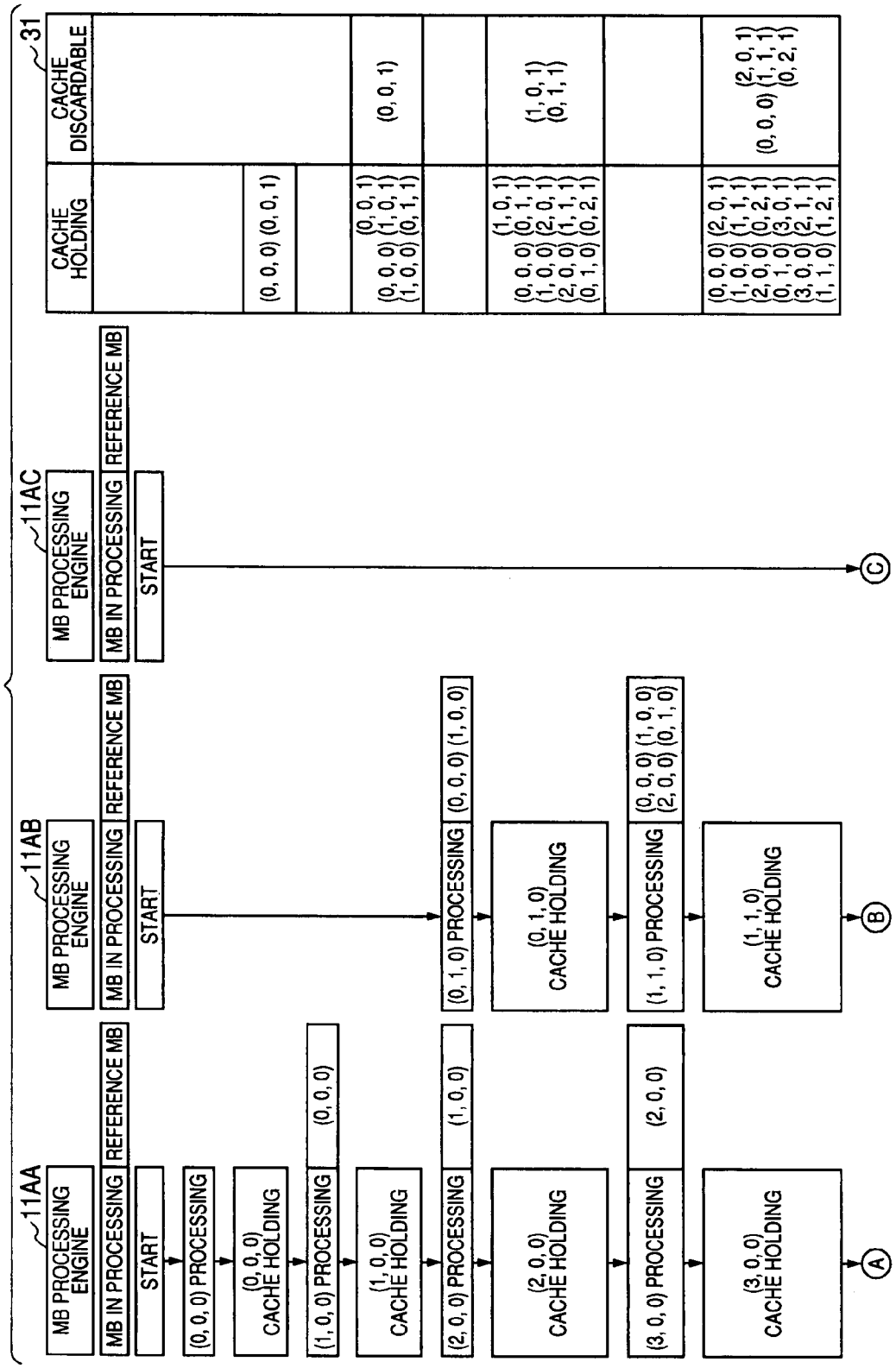
FIG. 28 is a schematic diagram for explanation of processing of macroblocks in the configuration in FIG. 27.
Figure 29:
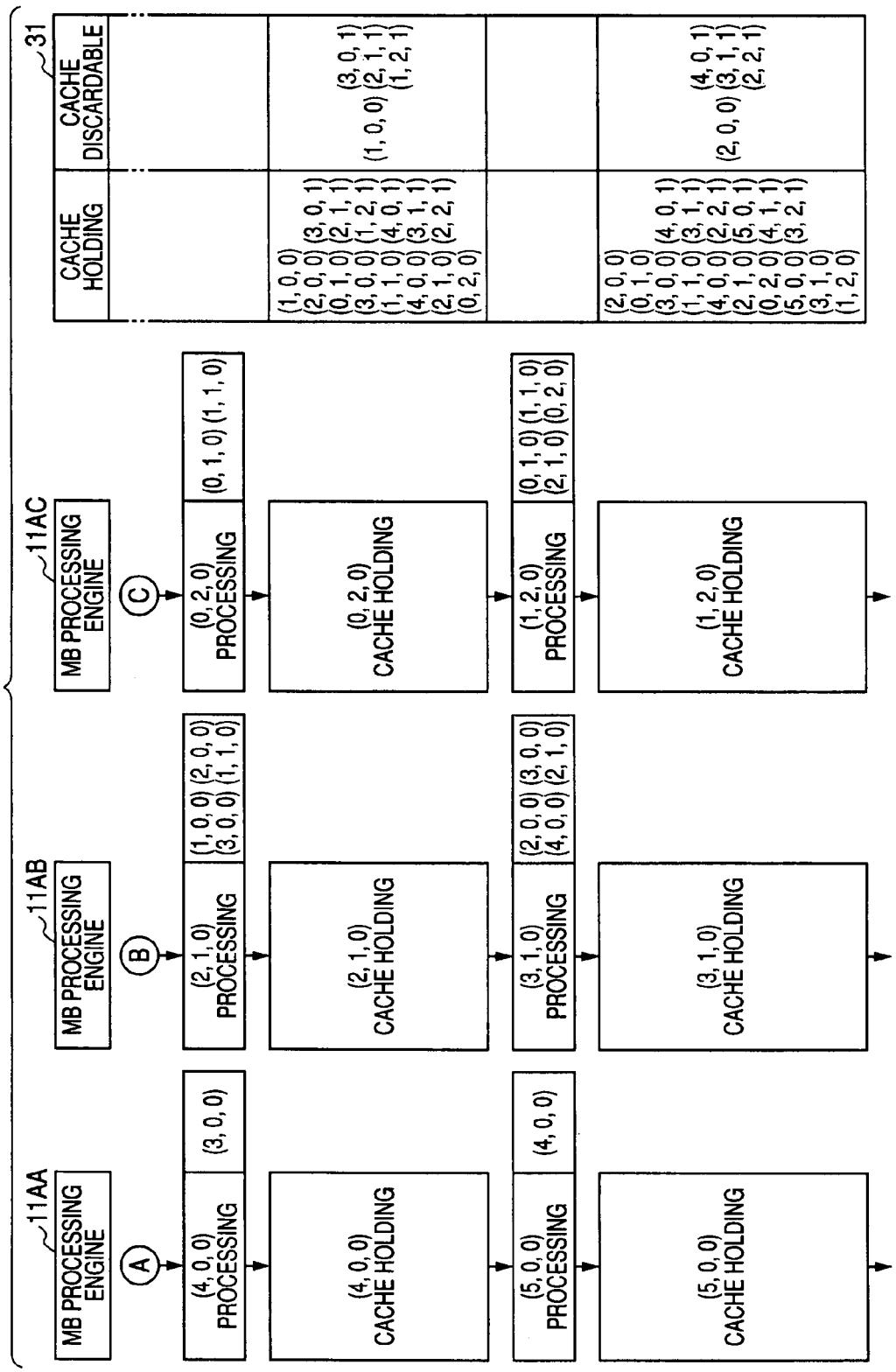
FIG. 29 is a schematic diagram continued from FIG. 28.
Figure 30:
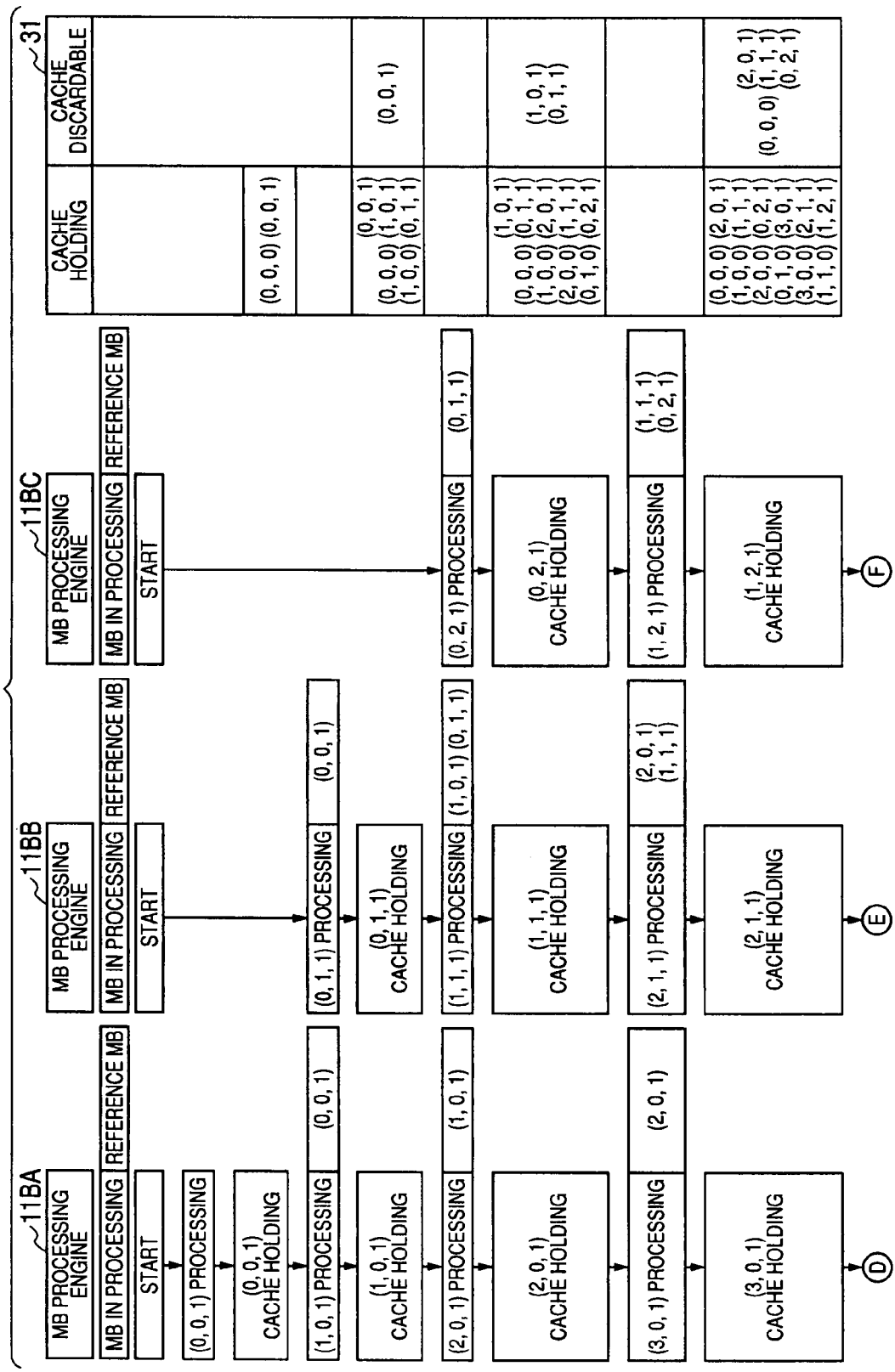
FIG. 30 is a schematic diagram continued from FIGS. 28 and 29.
Figure 31:
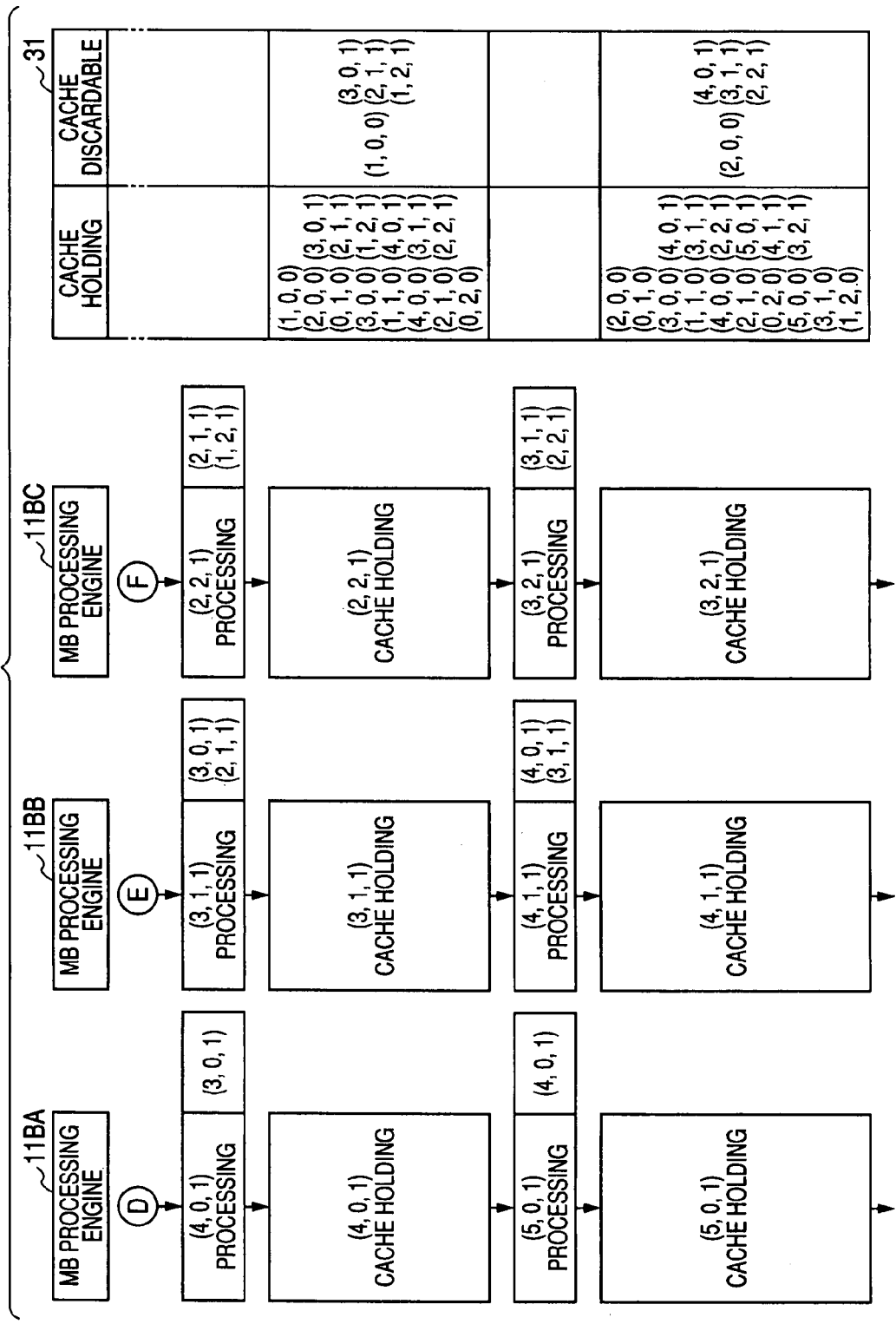
FIG. 31 is a schematic diagram continued from FIGS. 28 to 30.

FIG. 27 is a block diagram showing a main part of an encoder and a decoder of Embodiment 7 of the invention in comparison to FIG. 21. In this embodiment, the encoder and the decoder are configured by independent multicore processors, respectively. Here, the encoder is provided with the preprocessing section 12, the plural macroblock processing engines 11A to 11C, and the post-processing section 13 as described above with respect to Embodiment 1. The decoder is provided with the preprocessing section 42, the plural macroblock processing engines 41A to 41C, and the post-processing section 43, and the post-processing section 43 is formed by plural macroblock processing engines for post-processing 43A to 43C as described above with respect to Embodiment 1. In the embodiment, the buffer memory 31 is shared by the macroblock processing engines 11A to 11C of the encoder and the macroblock processing engines for post-processing 43A to 43C of the decoder, and the coded data of H.264/AVC is decoded and separately input image data is encoded in H.264/AVC.

As shown in FIGS. 28 to 31 in comparison to FIGS. 23 to 26, the macroblock processing engines 11A to 11C simultaneously process plural slices that have been assigned thereto in parallel, respectively, so that, as described above, the reference macroblock of the macroblock in processing in each slice and the reference macroblock of the macroblock in processing in the immediately preceding slice may partly overlap. Further, the macroblock processing engines for post-processing 43A to 43C also simultaneously process plural slices that have been assigned thereto in parallel, respectively, so that, as described above, the reference macroblock of the macroblock in processing in each slice and the reference macroblock of the macroblock in processing in the immediately preceding slice may partly overlap.

In this embodiment, the same effect as that of Embodiment 1 can be obtained when the invention is applied to the case of performing processing by plural encoder and decoder systems.

Embodiment 8

In the embodiment, two encoder systems independently configured by multicore processors are provided. Further, each encoder is provided with the preprocessing section 12, the plural macroblock processing engines 11A to 11C, the post-processing section 13 as described above with respect to Embodiment 1. Furthermore, the preprocessing section 12 is formed by plural macroblock processing engines for preprocessing 12AA to 12AC and 12BA to 12BC. In the embodiment, the buffer memory 31 is shared by the two systems of macroblock processing engines for preprocessing 12AA to 12AC and 12BA to 12BC and the processing of motion vector prediction in the preprocessing of H.264/AVC is executed and two systems of coded data are output.

Figure 32:
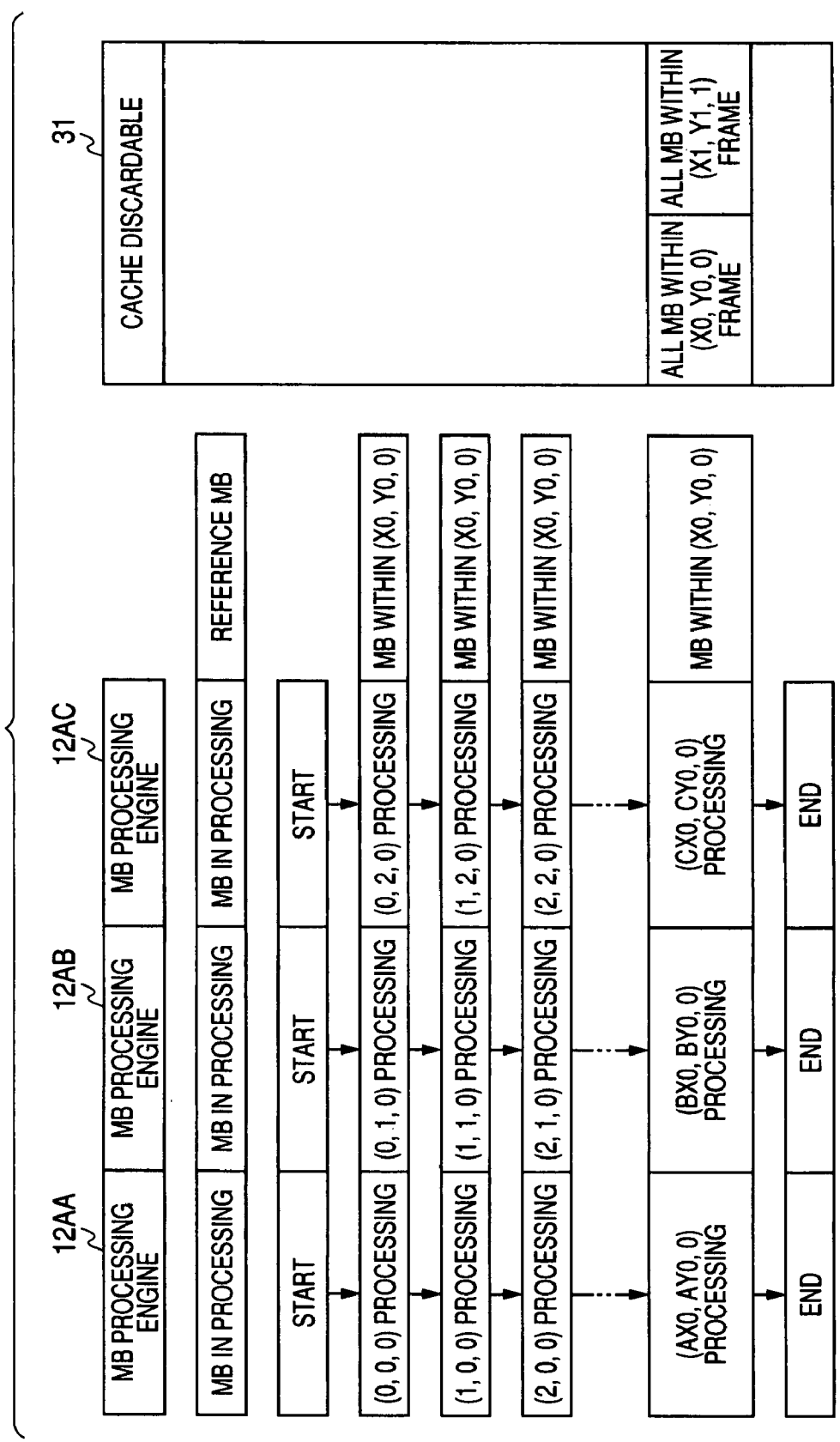
FIG. 32 is a schematic diagram, for explanation of the operation of macroblock processing engines for preprocessing in an encoder of Embodiment 8 of the invention.
Figure 33:
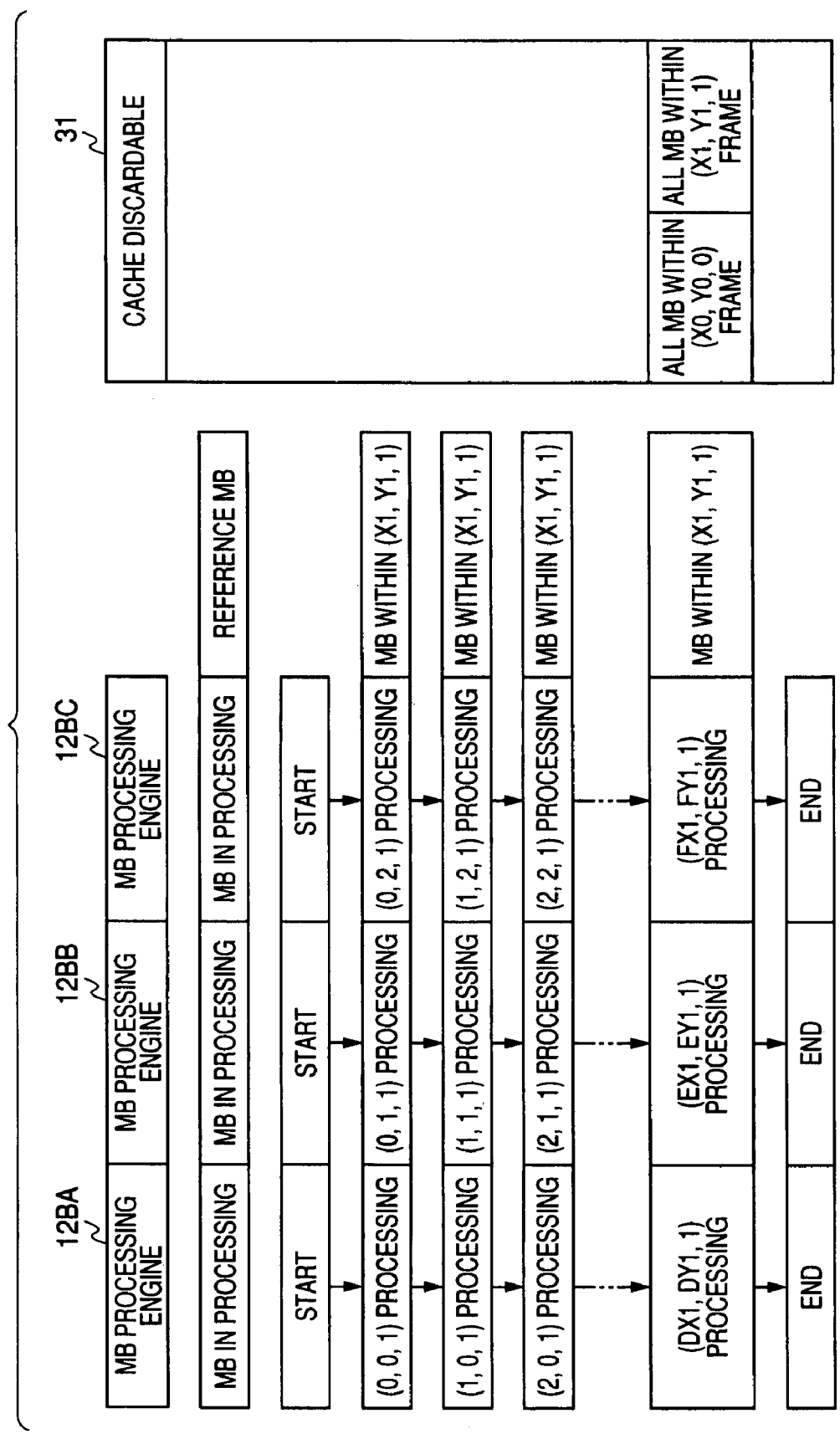
FIG. 33 is a schematic diagram continued from FIG. 32.

FIGS. 32 and 33 are schematic diagrams for explanation of the operation of the two systems of macroblock processing engines for preprocessing 12AA to 12AC and 12BA to 12BC in comparison to FIGS. 28 to 31. In this embodiment, the macroblock processing engines for preprocessing 12AA to 12AC and 12BA to 12BC of the respective systems simultaneously process plural slices that have been assigned thereto in parallel, respectively, so that, within the respective systems, as described above, the reference macroblock of the macroblock in processing in each slice and the reference macroblock of the macroblock in processing in the immediately preceding slice may partly overlap.

According to the embodiment, the same effect as that of Embodiment 1 can be obtained when the invention is applied to the motion vector prediction by two encoder systems.

Embodiment 9

Figure 34:
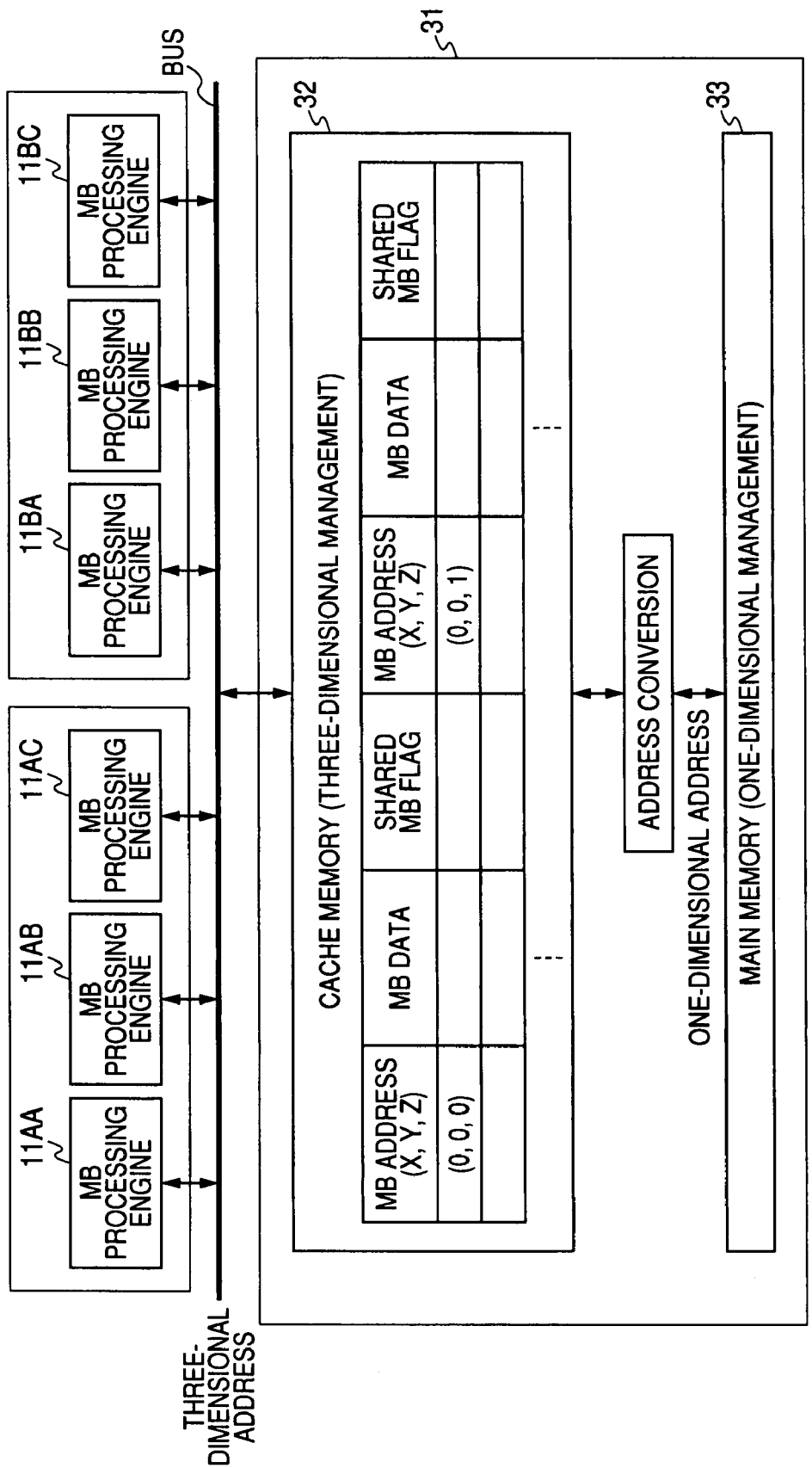
FIG. 34 is a block diagram showing a configuration of a buffer memory in video equipment of Embodiment 9 of the invention.

FIG. 34 is a schematic diagram showing a configuration of a buffer memory in video equipment of Embodiment 9 of the invention in comparison to FIG. 21. In this embodiment, as described above with respect to FIG. 14 in comparison to FIG. 4, shared flags are set to the data of the respective macroblocks stored in the cache memory 32, and the reference macroblocks overlapping among the plural macroblocks in processing are identified by the flags. Further, the access from the plural macroblock processing engines is adjusted with reference to the flags.

The same effect as that of Embodiment 1 can be obtained by controlling the access from the plural arithmetic processing devices when processing is performed by plural systems as in the embodiment.

Embodiment 10

In the embodiment, an encoder and a decoder independently configured by multicore processors are provided. Here, the encoder is provided with the preprocessing section 12, the plural macroblock processing engines 11A to 11C, and the post-processing section 13 as described above with respect to Embodiment 1. Further, the preprocessing section 12 is formed by plural macroblock processing engines for preprocessing 12A to 12C. The decoder is provided with the preprocessing section 42, the plural macroblock processing engines 41A to 41C, and the post-processing section 43 as described above with respect to Embodiment 1, and the post-processing section 43 is formed by plural macroblock processing engines for post-processing 43A to 43C. In the embodiment, the buffer memory 31 is shared by the macroblock processing engines for preprocessing 12A to 12C of the encoder and the macroblock processing engines for post-processing 43A to 43C of the decoder, and the coded data of H.264/AVC is decoded and the decoded image data is encoded in MPEG-4.

Further, in these encoder and decoder, the macroblock processing engines for preprocessing 12A to 12C and the macroblock processing engines for post-processing 43A to 43C simultaneously process plural slices in charge in parallel with timing set for the respective macroblock processing, respectively, so that, as is the case of the above described embodiments, the reference macroblock of the macroblock in processing in each slice and the reference macroblock of the macroblock in processing in the immediately preceding slice may partly overlap.

Figure 35:
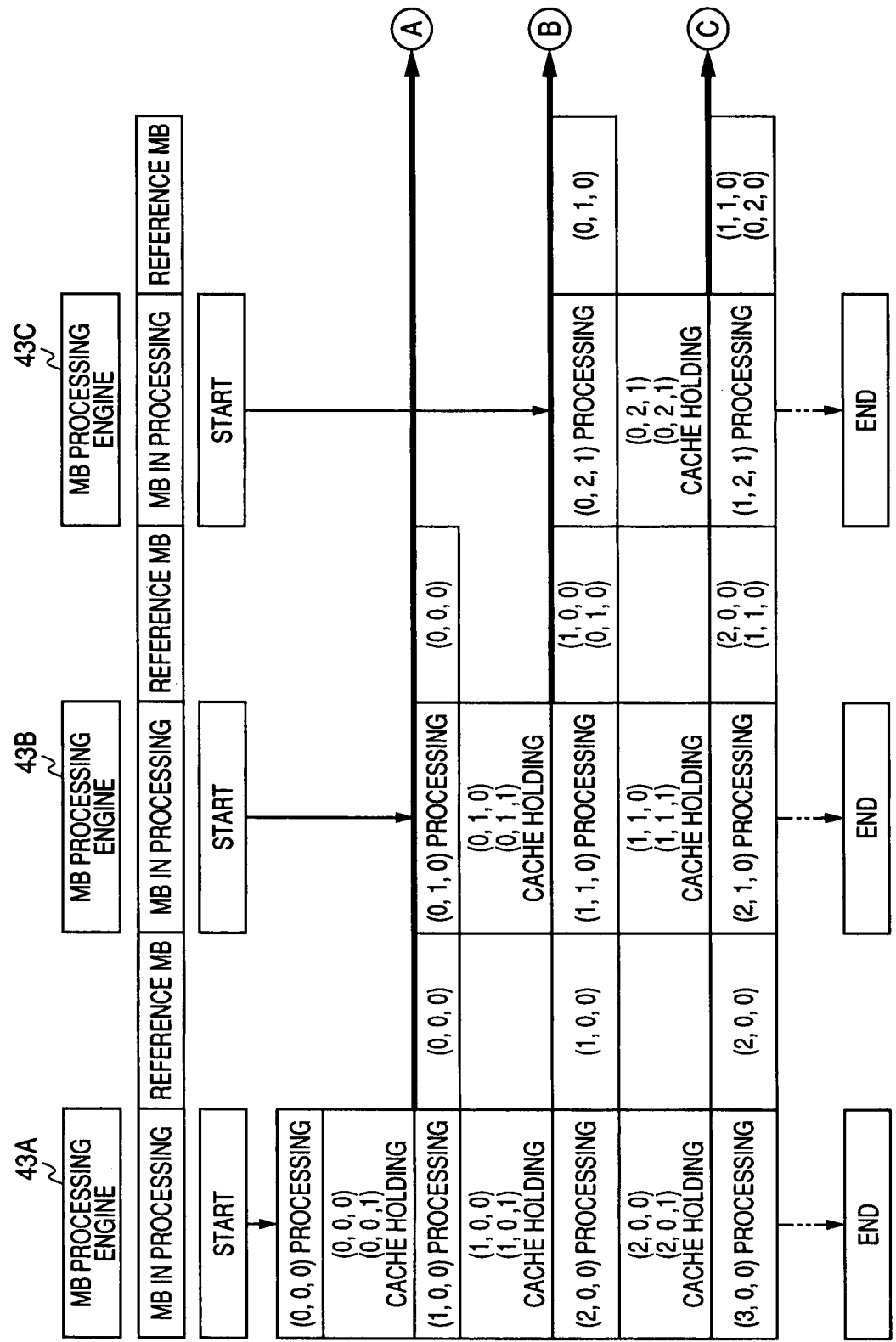
FIG. 35 is a schematic diagram for explanation of the operation of macroblock processing engines for preprocessing in an encoder of Embodiment 10 of the invention.
Figure 36:
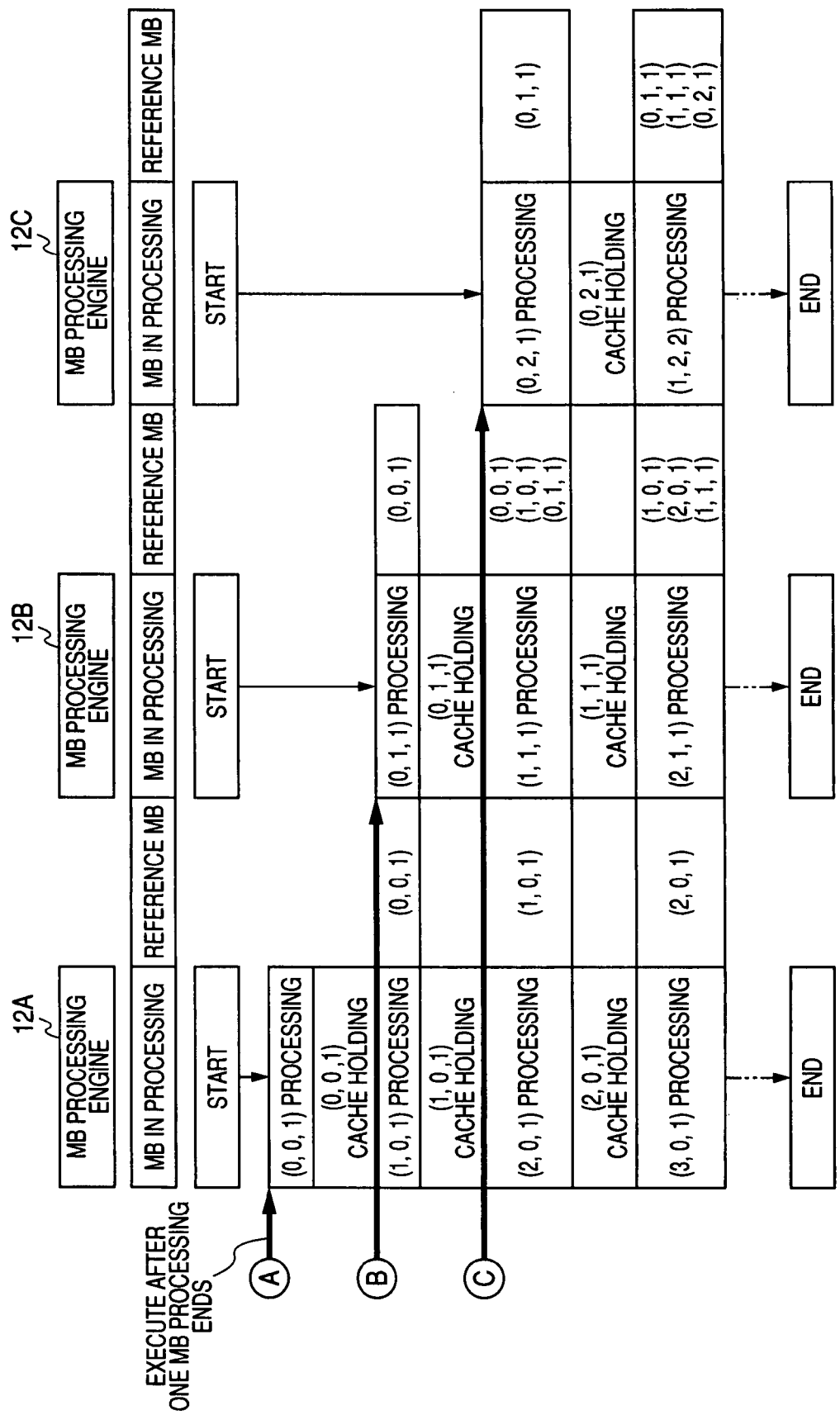
FIG. 36 is a schematic diagram continued from FIG. 35.

Furthermore, in the embodiment, as shown in FIGS. 35 and 36, the encoder and the decoder are operated in synchronization and the decoded processing results are held in the cache memory 32. The processing results of the decoder held in the cache memory 32 are processed in processing cycles of the macroblocks as shown by signs A, B, C, . . . just after they are held in the cache memory 32.

In the embodiment, since the cache memory is used in the buffer memory for inputting decoded image data to the encoder, the entire memory capacity can be further reduced.

Embodiment 11

Figure 37:
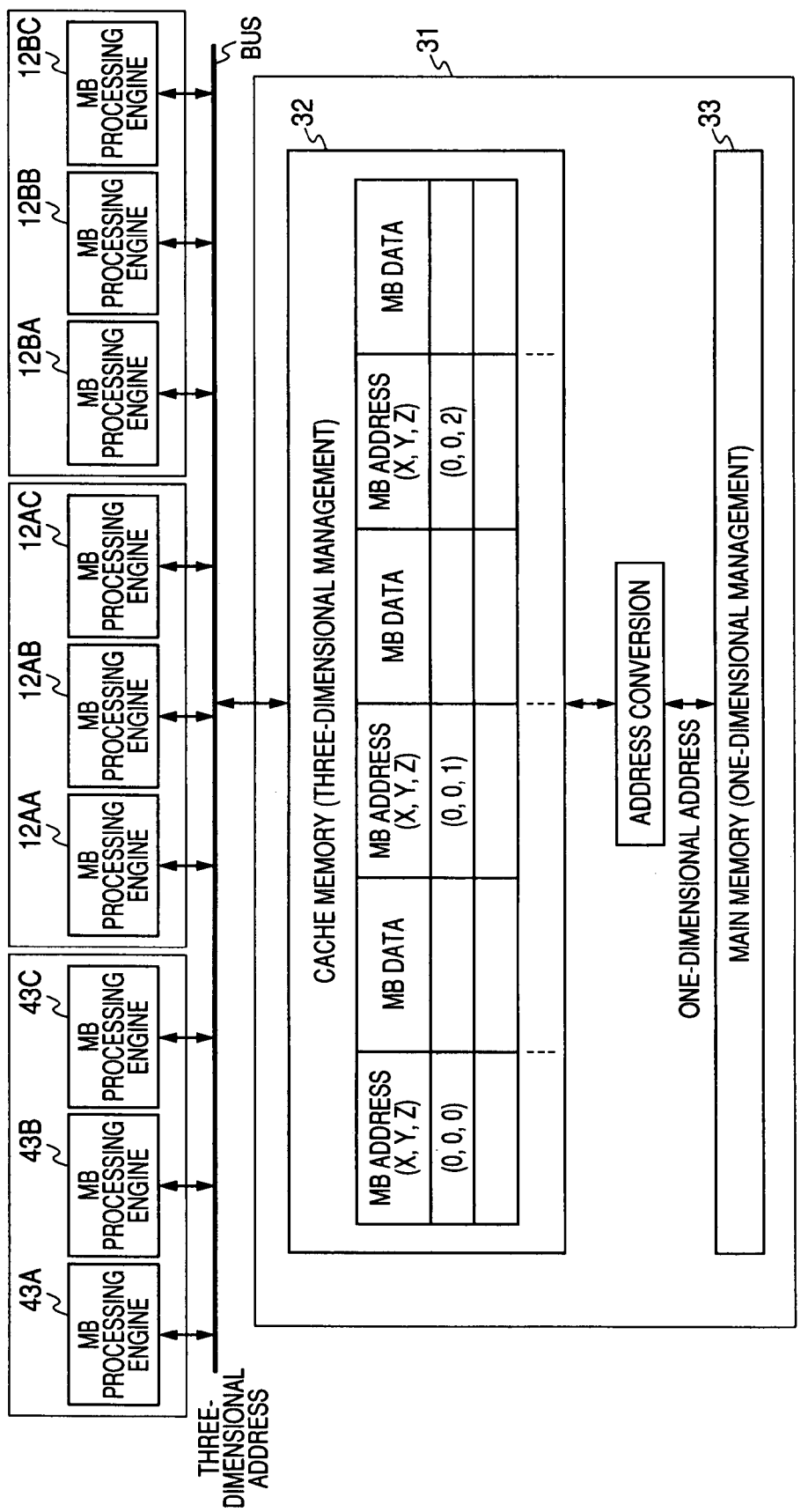
FIG. 37 is a block diagram showing a main part of an encoder and a decoder of Embodiment 11 of the invention.

FIG. 37 is a block diagram of a main part of an encoder and a decoder of Embodiment 11 of the invention in comparison to FIG. 21. Here, the encoder is provided with the preprocessing section 12, the plural macroblock processing engines 11A to 11C, and the post-processing section 13 as described above with respect to Embodiment 1. Further, the preprocessing section 12 is formed by plural macroblock processing engines for motion vector detection 12AA to 12AC for respectively detecting motion vectors and plural macroblock processing engines for motion vector prediction 12BA to 12BC for respectively executing processing of motion vector prediction. The decoder is provided with the preprocessing section 42, the plural macroblock processing engines 41A to 41C, and the post-processing section 43 as described above with respect to Embodiment 1, and the post-processing section 43 is formed by plural macroblock processing engines for post-processing 43A to 43C. In the embodiment, the buffer memory 31 is shared by the macroblock processing engines 12AA to 12AC and 12BA to 12BC of the encoder and the macroblock processing engines for post-processing 43A to 43C of the decoder, and the coded data of H.264/AVC is decoded and the decoded image data is encoded in MPEG-4.

Further, in these encoder and decoder, the macroblock processing engines for motion vector detection 12AA to 12AC, the macroblock processing engines for motion vector prediction 12BA to 12BC, and the macroblock processing engines for post-processing 43A to 43C simultaneously process plural slices in charge in parallel with timing set for the respective macroblock processing, respectively, so that, as is the case of the above described embodiments, the reference macroblock of the macroblock in processing in each slice and the reference macroblock of the macroblock in processing in the immediately preceding slice may partly overlap.

Figure 38:
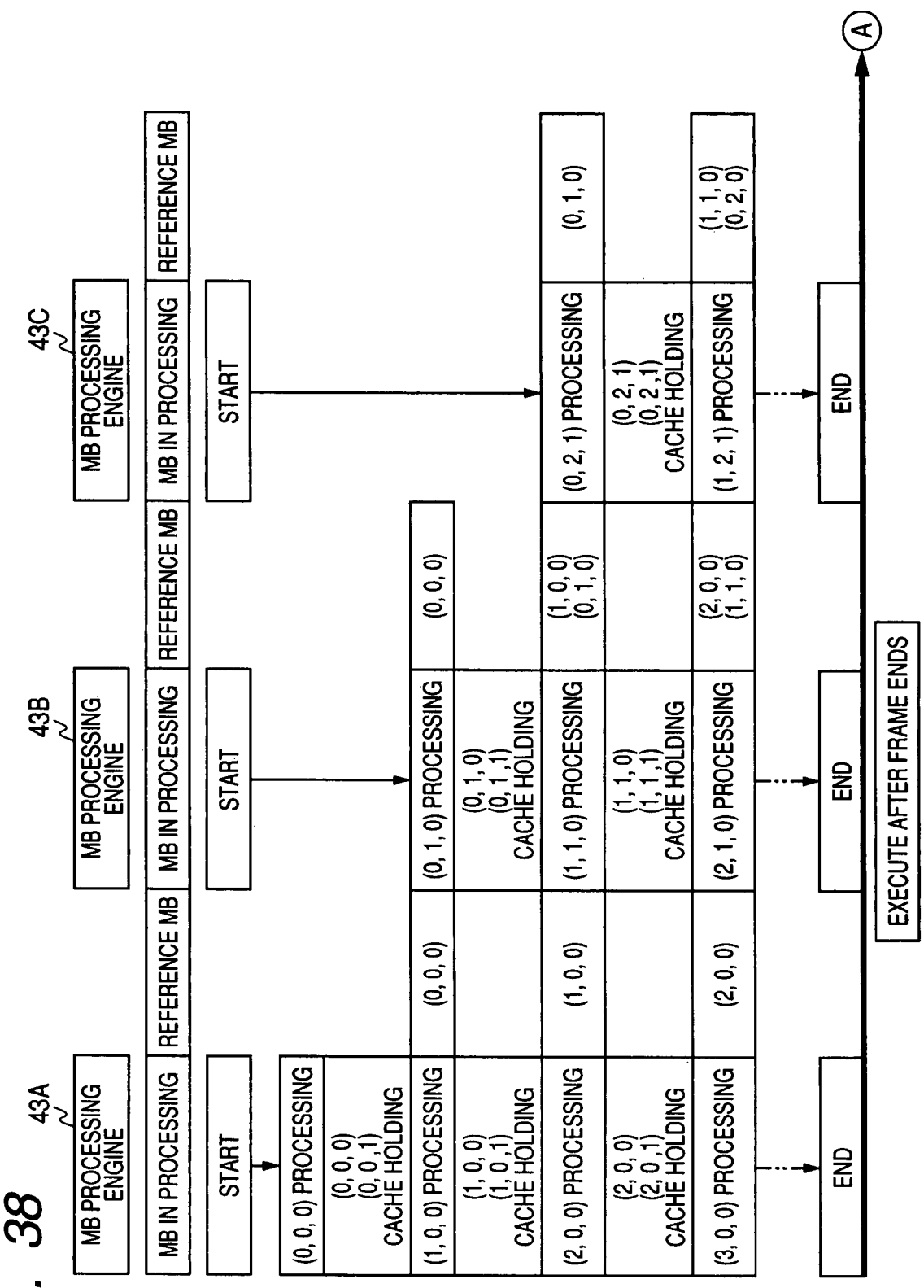
FIG. 38 is a schematic diagram for explanation of the operation of macroblock processing engines for preprocessing in the encoder in FIG. 37.
Figure 39:
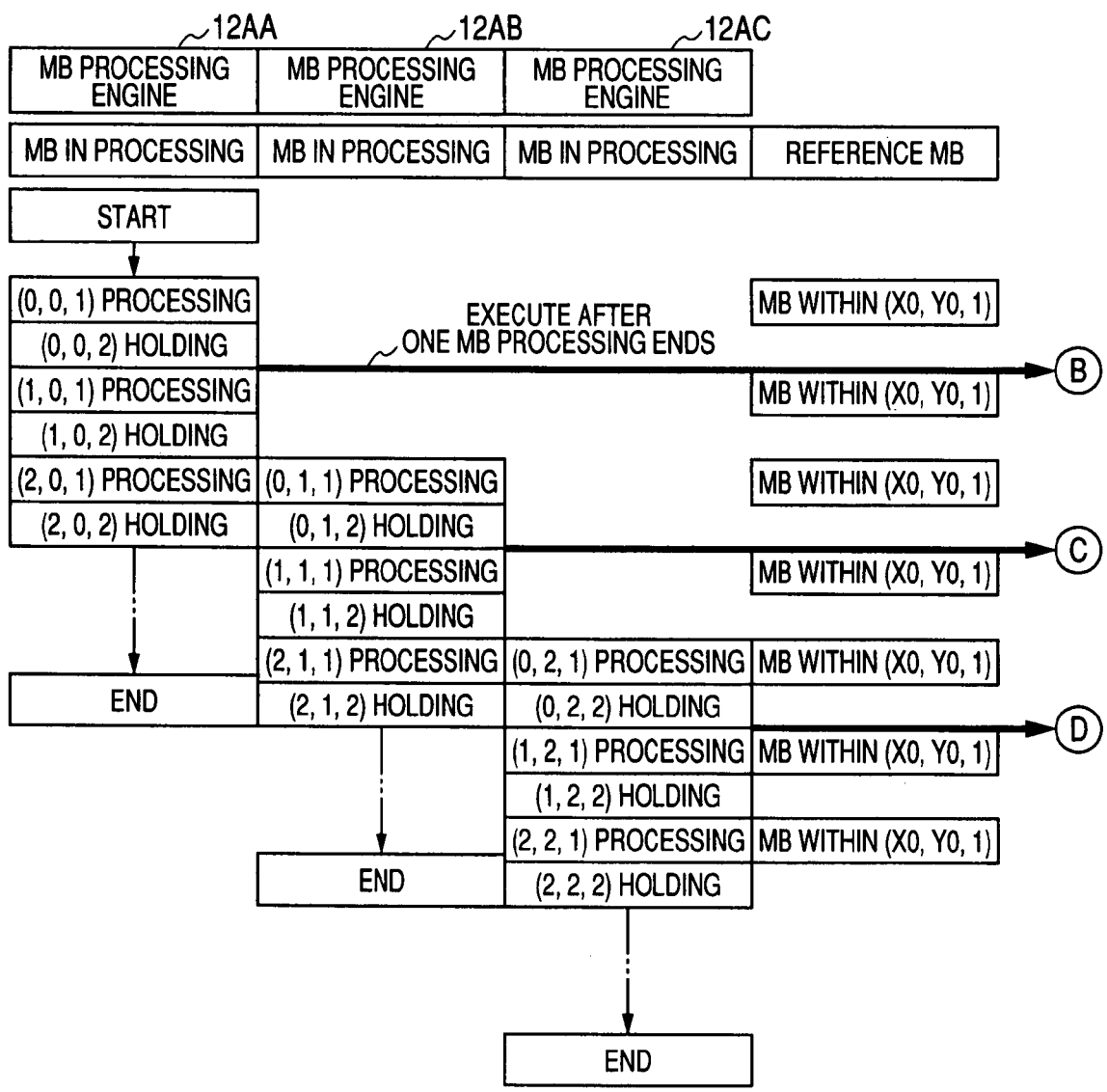
FIG. 39 is a schematic diagram continued from FIG. 38.
Figure 40:
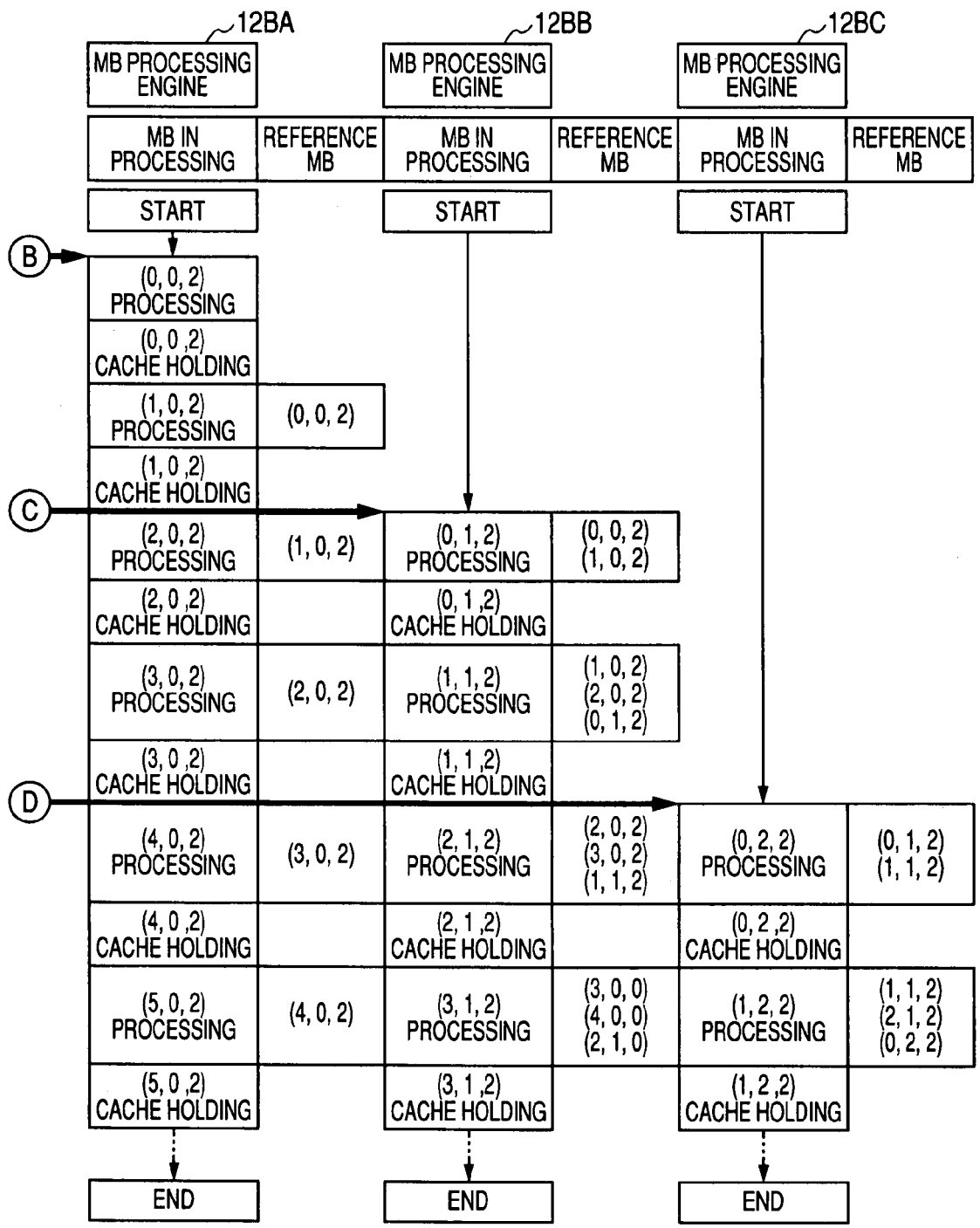
FIG. 40 is a schematic diagram continued from FIG. 39.
Figure 41D:
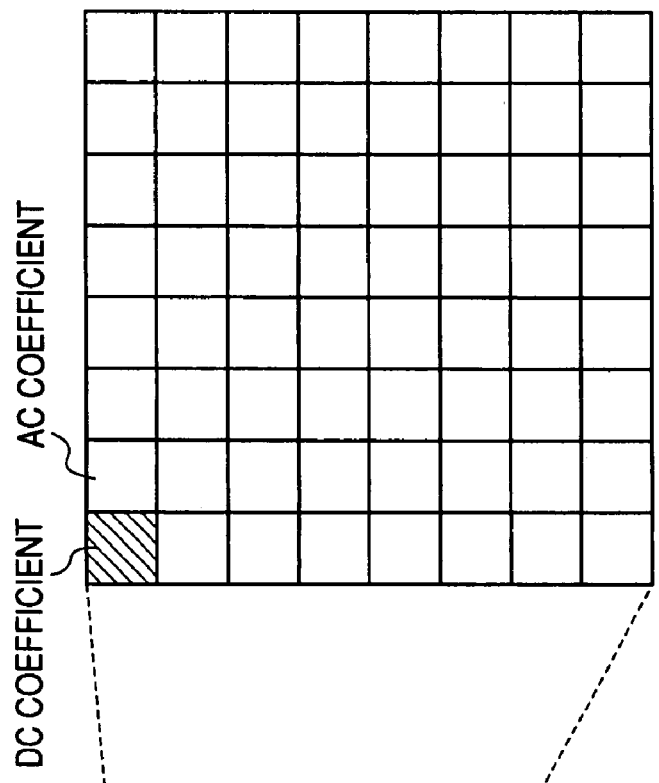
FIGS. 41A to 41D are schematic diagrams for explanation of macroblocks.
Figure 41A:
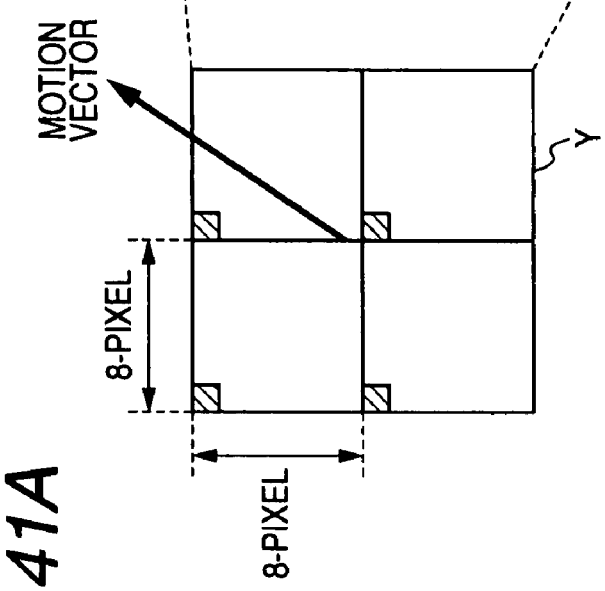
Figure 41B:
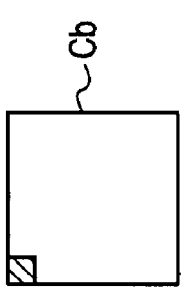
Figure 41C:
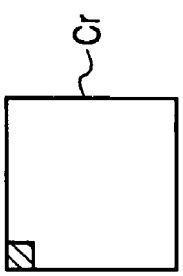
Figure 42B:
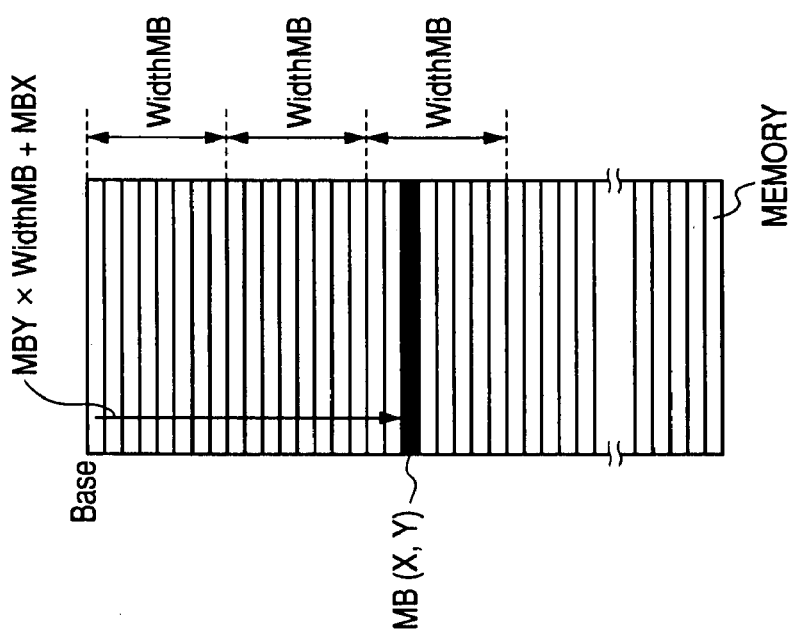
FIGS. 42A and 42B are schematic diagrams for explanation of addresses of macroblocks.
Figure 42A:
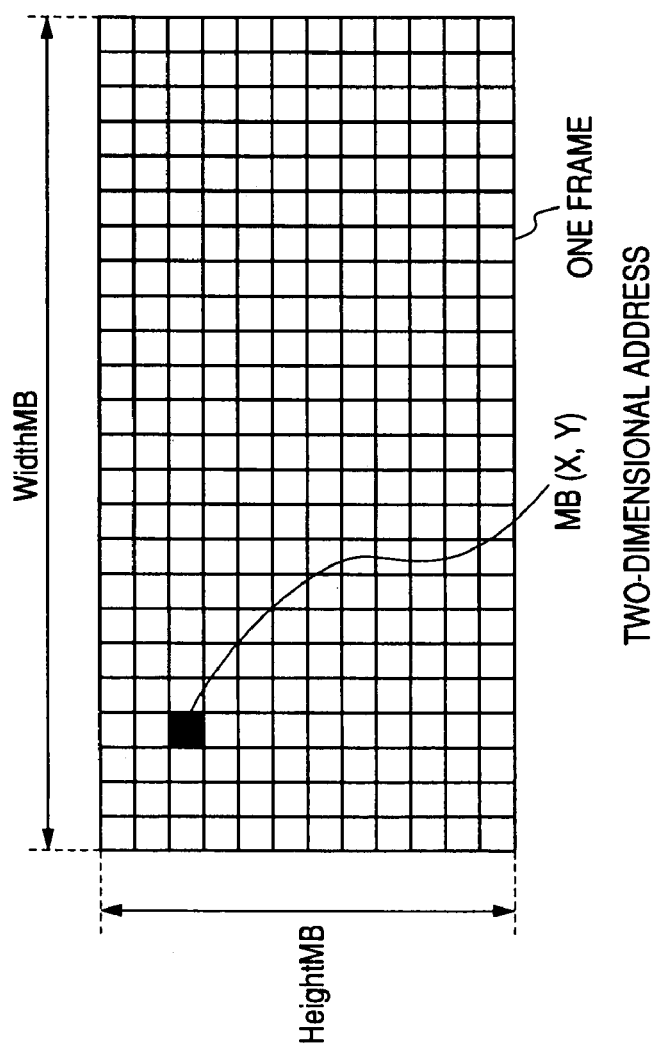

Furthermore, in the embodiment, as shown in FIGS. 38 to 40, the encoder and the decoder are operated in synchronization and the decoded processing results are held in the cache memory 32. The processing results of the decoder held in the cache memory 32 are passed to the subsequent encoding processing in processing cycles of the macroblocks as shown by signs A to D just after they are held in the cache memory 32.

As in the embodiment, the same effect as that in Embodiment 9 can be obtained when the invention is applied to three continuous decoding and encoding processes.

Embodiment 12

In the above described embodiments, the case where the image data is encoded and decoded by the fixed functional blocks that have been set in advance is described, however, not limited to that, the invention is widely applicable even when the functional blocks are dynamically changed according to the format of the image data to be processed, loads of the respective processes, etc. In this case, it is necessary to set the number of arithmetic processing sections of the respective functional blocks so that the capacity of the cache memory may be the capacity corresponding to the number of macroblocks obtained by multiplying the sum of the number of reference macroblocks of one macroblock and the value "1" by the number of the plural arithmetic processing sections, and then, subtracting the number of the partly overlapping reference macroblocks from the multiplication value.

Further, in the above described embodiments, the case where processing of intra prediction etc. is simultaneously executed in parallel with plural arithmetic processing devices is described, however, not limited to that, the invention is widely applicable to the case of performing prefilter processing, post-filter processing, etc. together. Further, the invention may be applied to transmission of motion vector, macroblock type, etc.

Furthermore, in the above described embodiments, the case of performing encoding processing and decoding processing on image data according to H.264/AVC is described, however, not limited to that, the invention is widely applicable to the case of performing encoding processing and decoding processing according to other various encoding methods.

Moreover, in the above described embodiments, the case where plural arithmetic processing sections that simultaneously process image data in parallel are configured by plural central processing units is described, however, not limited to that, the invention is widely applicable to the case where the plural arithmetic processing sections that simultaneously process image data in parallel are configured by software and the like. In this case, the software programs may be provided by installing them in advance, or may be provided by recording them in a recording medium such as an optical disk, magnetic disk, and memory card, and further, may be provided via a network such as Internet.

The invention may be applied to the case where video data is encoded and decoded according to H.264/MPEG-4AVC (ITU-T Rec. H.264 ISO/IEC 14496-10 AVC) standard, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An image data processing apparatus comprising:
    plural arithmetic processing sections that encode or decode image data in units of macroblocks, respectively;
    a main memory that accumulates and holds data used for processing of the plural arithmetic processing sections; and
    a cache memory of the plural arithmetic processing sections that hold part of the data held in the main memory,
    wherein slices of the image data are sequentially and cyclically assigned to the plural arithmetic processing sections and plural slices are set as objects of processing, respectively, the plural arithmetic processing sections process the data held in the cache memory and simultaneously encode or decode the image data in parallel in a sequence of processing macroblocks of the plural slices as the objects of processing in the order of raster scan to establish a consistent relationship of the processing of each slice with processing of the immediately preceding slice, and the consistent relationship is a relationship in which the current slice and the immediately preceding slice is simultaneously processed in parallel and the macroblock in processing in the current slice has a number of reference macroblocks and is at the raster scan start end side by a predetermined number of macroblocks from the macroblock in processing in the immediately preceding slice so that a particular reference macroblock of the macroblock in processing in the current slice partly overlaps with a reference macroblock of the macroblock in processing in the immediately preceding slice.

2. The image data processing apparatus according to claim 1, wherein a capacity of the cache memory is a capacity corresponding to the number of macroblocks obtained by multiplying the sum of (the number of macroblocks in processing in the current slice plus the number of reference macroblocks of the macroblock in processing in the current slice) times (the of the plural arithmetic processing sections), and subtracting the number of the partly overlapping reference macroblocks from the multiplication value.

3. The image data processing apparatus according to claim 1, wherein the number of the plural arithmetic processing sections is set so that a capacity of the cache memory is a capacity corresponding to the number of macroblocks obtained by multiplying (the sum of the number of reference macroblocks of the macroblock in processing in the current slice plus 1) times (the number of the plural arithmetic processing sections), and subtracting the number of the partly overlapping reference macroblocks from the multiplication value.

4. The image data processing apparatus according to claim 1, further comprising plural systems of processing systems of the plural arithmetic processing sections, wherein the cache memory is shared by the plural systems of the plural arithmetic processing sections.

5. An image data processing method of encoding or decoding image data in units of macroblocks, comprising the steps of:
   storing data in a main memory of storing data necessary for the encoding and decoding in a main memory;
   storing data in a cache memory of storing the data stored in the main memory in the cache memory; and
   simultaneously parallel processing of encoding or decoding the image data with plural arithmetic processing means using the data held in the cache memory to simultaneously process plural objects of processing set by sequentially and cyclically assigning slices of the image data in parallel in units of the macroblocks, respectively,
   wherein slices of the image data are sequentially and cyclically assigned to the plural arithmetic processing sections and plural slices are set as objects of processing, respectively, the plural arithmetic processing sections process the data held in the cache memory and simultaneously encode or decode the image data in parallel in a sequence of processing macroblocks of the plural slices as the objects of processing in the order of raster scan to establish a consistent relationship of the processing of each slice with processing of the immediately preceding slice, and the consistent relationship is a relationship in which the current slice and the immediately preceding slice is simultaneously processed in parallel and the macroblock in processing in the current slice has a number of reference macroblocks and is at the raster scan start end side by a predetermined number of macroblocks from the macroblock in processing in the immediately preceding slice so that a particular reference macroblock of the macroblock in processing in the current slice partly overlaps with a reference macroblock of the macroblock in processing in the immediately preceding slice.

6. A non-transitory tangible computer-readable storage medium having stored thereon a program for an image data processing method of encoding or decoding image data in units of macroblocks through execution by arithmetic processing means, the program comprising the steps of:
   storing data in a main memory of storing data necessary for the encoding and decoding in a main memory;
   storing data in a cache memory of storing the data stored in the main memory in the cache memory; and
   wherein slices of the image data are sequentially and cyclically assigned to the plural arithmetic processing sections and plural slices are set as objects of processing, respectively, the plural arithmetic processing sections process the data held in the cache memory and simultaneously encode or decode the image data in parallel in a sequence of processing macroblocks of the plural slices as the objects of processing in the order of raster scan to establish a consistent relationship of the processing of each slice with processing of the immediately preceding slice, and the consistent relationship is a relationship in which the current slice and the immediately preceding slice is simultaneously processed in parallel and the macroblock in processing in the current slice has a number of reference macroblocks and is at the raster scan start end side by a predetermined number of macroblocks from the macroblock in processing in the immediately preceding slice so that a particular reference macroblock of the macroblock in processing in the current slice partly overlaps with a reference macroblock of the macroblock in processing in the immediately preceding slice.

* * * * *